US007187992B2

(12) United States Patent
Tuszynski

(10) Patent No.: US 7,187,992 B2
(45) Date of Patent: Mar. 6, 2007

(54) MANUFACTURING DESIGN AND PROCESS ANALYSIS SYSTEM

(76) Inventor: Steve W. Tuszynski, 750 S. Bundy Dr. #304, Los Angeles, CA (US) 90049

( * ) Notice: Subject to any disclaimer, the term of this patent is extended or adjusted under 35 U.S.C. 154(b) by 450 days.

(21) Appl. No.: 10/752,843

(22) Filed: Jan. 7, 2004

(65) Prior Publication Data
US 2004/0167648 A1   Aug. 26, 2004

Related U.S. Application Data

(63) Continuation of application No. 10/357,690, filed on Feb. 4, 2003, now Pat. No. 6,687,558, which is a continuation-in-part of application No. 10/067,704, filed on Feb. 4, 2002, now Pat. No. 7,072,808.

(51) Int. Cl.
G06F 19/00 (2006.01)
(52) U.S. Cl. .............................. 700/97; 703/2
(58) Field of Classification Search ............ 703/2; 705/7; 700/33, 97
See application file for complete search history.

(56) References Cited

U.S. PATENT DOCUMENTS

| | | | |
|---|---|---|---|
| 5,136,686 A | 8/1992 | Koxa | |
| 5,546,312 A | 8/1996 | Mozumder et al. | |
| 5,661,669 A | 8/1997 | Mozumder et al. | |
| 5,850,339 A | 12/1998 | Giles | |
| 6,311,096 B1 | 10/2001 | Saxena et al. | |
| 6,326,160 B1 | 12/2001 | Dunn et al. | |
| 6,370,437 B1 | 4/2002 | Carter et al. | |
| 6,397,114 B1 | 5/2002 | Erurek et al. | |
| 6,424,876 B1 | 7/2002 | Cusson et al. | |
| 6,442,445 B1 | 8/2002 | Bunkofske et al. | |
| 6,567,752 B2 | 5/2003 | Cusumano et al. | |
| 6,616,759 B2 | 9/2003 | Tanaka et al. | |
| 6,687,558 B2 | 2/2004 | Tuszynski | |
| 6,760,632 B1 | 7/2004 | Heching et al. | |
| 7,072,808 B2 | 7/2006 | Tuszynski | |
| 2003/0176938 A1* | 9/2003 | Tuszynski | 700/97 |
| 2005/0055110 A1 | 3/2005 | Tuszynski | |
| 2005/0246149 A1 | 11/2005 | Tuszynski | |

OTHER PUBLICATIONS

U.S. Appl. No. 11/384,749, filed Mar. 20, 2006, Tuszynski.
Dr. Werner Stahel: "Statistiche Datenanalyse," Dec. 31, 2000, Friedr. Viewg & Sohn Verlagsgesellscheft, Braunschweig/Wiesbaden, XP002325712, pp. 260-294, Translation included with this IDS.

* cited by examiner

Primary Examiner—Albert W. Paladini
(74) Attorney, Agent, or Firm—Mark J. Spolyar

(57) ABSTRACT

Methods, apparatuses and systems that facilitate the design, production and/or measurement tasks associated with manufacturing and other processes. In one embodiment, the present invention relates to decision-making and logic structures, implemented in a computer software application, facilitating all phases of the design, development, tooling, pre-production, qualification, certification, and production process of any part or other article that is produced to specification. In one embodiment, the present invention provides knowledge of how the multiple characteristics of a given process output are related to each other, to specification limits and to pre-process inputs. This knowledge facilitates a reduction in measurement, analysis and reporting costs both prior to and during production. It also determines the changes needed to pre-process inputs in order to achieve production at design targets. It provides a prioritized order for relaxing design tolerances. It assesses the feasibility of producing parts that meet specification limits. It assesses the trade-off between performance and producibility and provides design targets that improve-producibility. It provides a determination of when process variability needs reduction. It facilitates material comparison and selection. It provides process engineers and operators with improved operating guidelines.

76 Claims, 47 Drawing Sheets

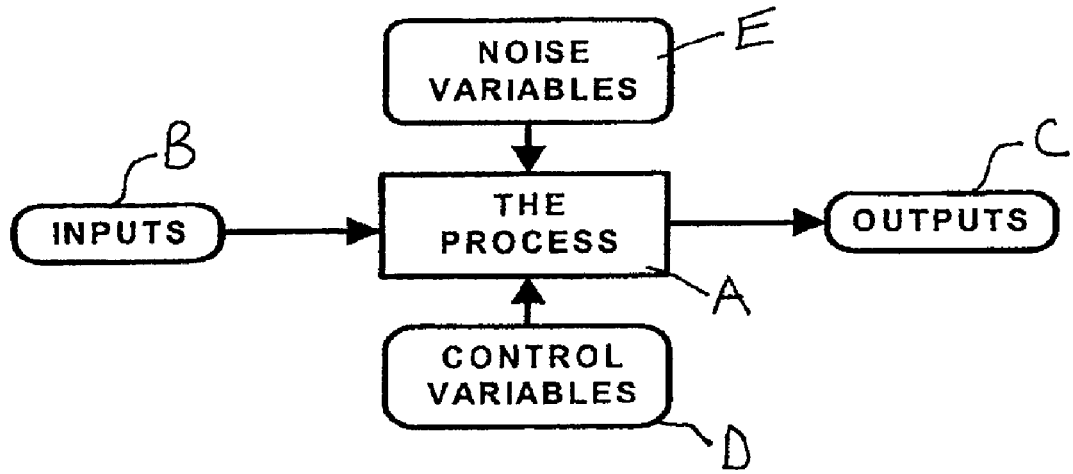
Fig._1
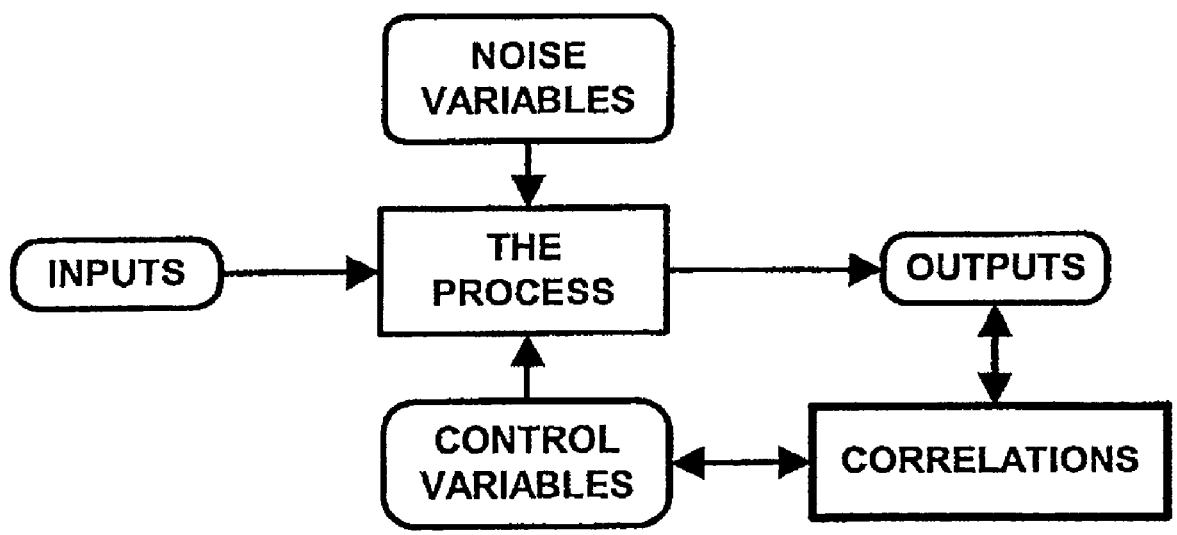
Fig._2

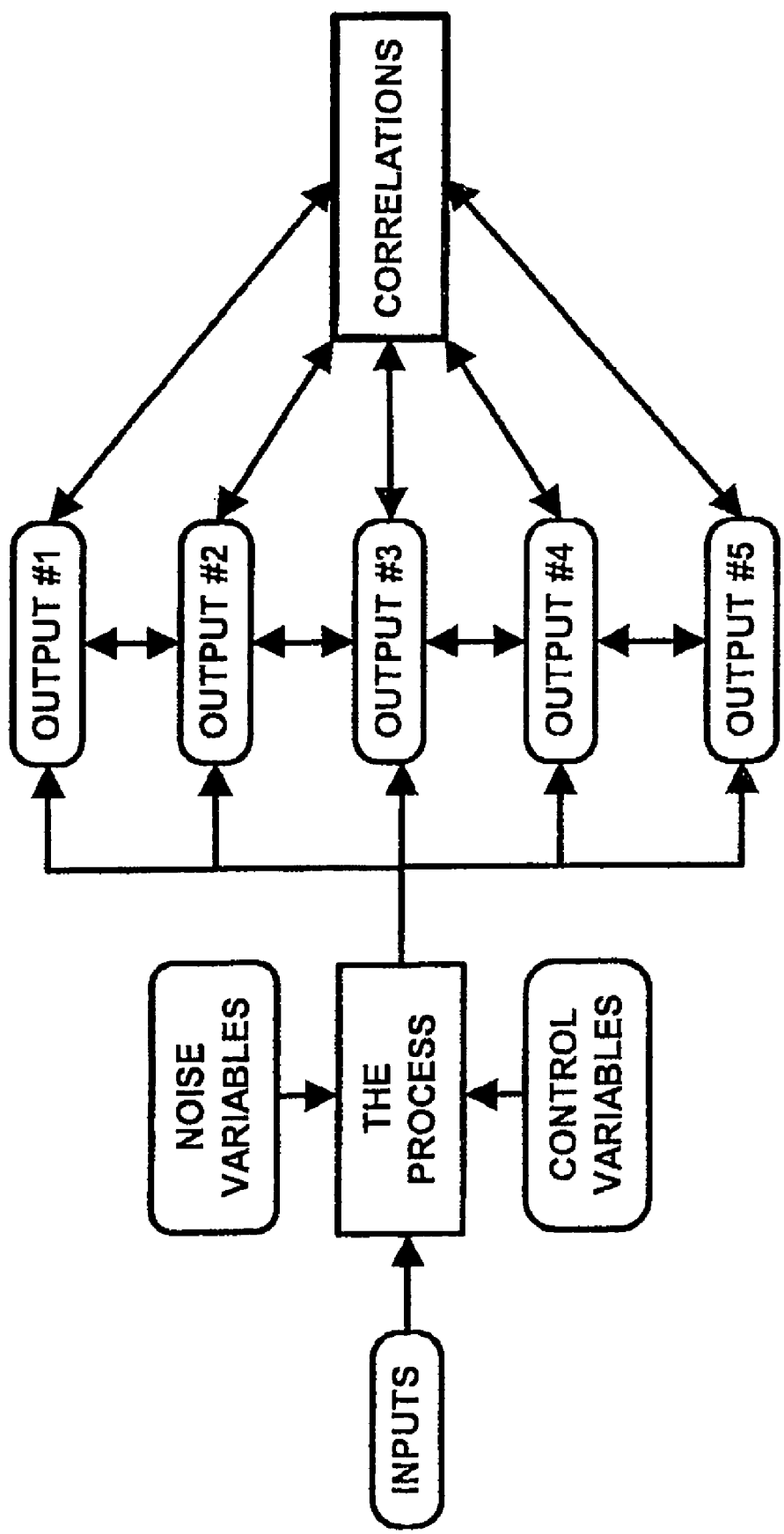
Fig._3

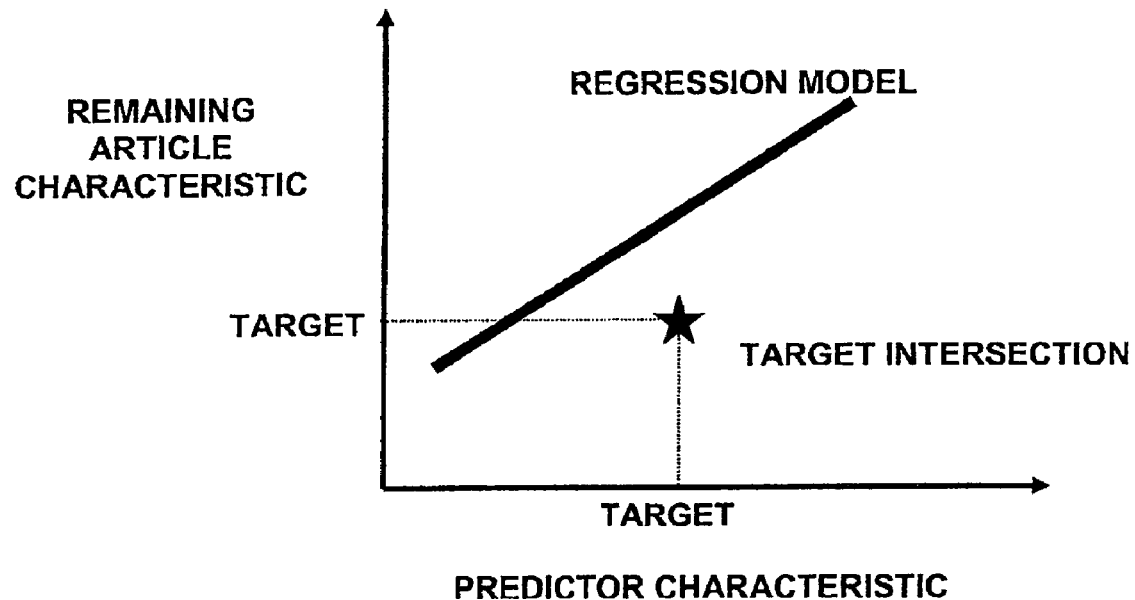
FIG._4
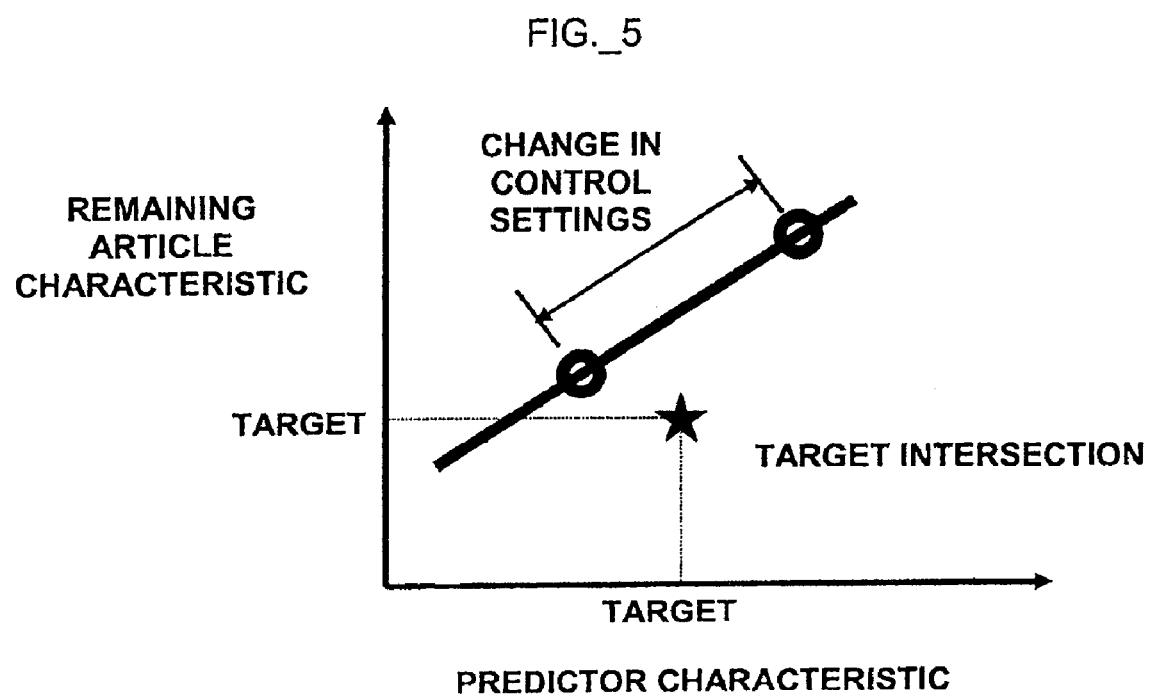
FIG._5

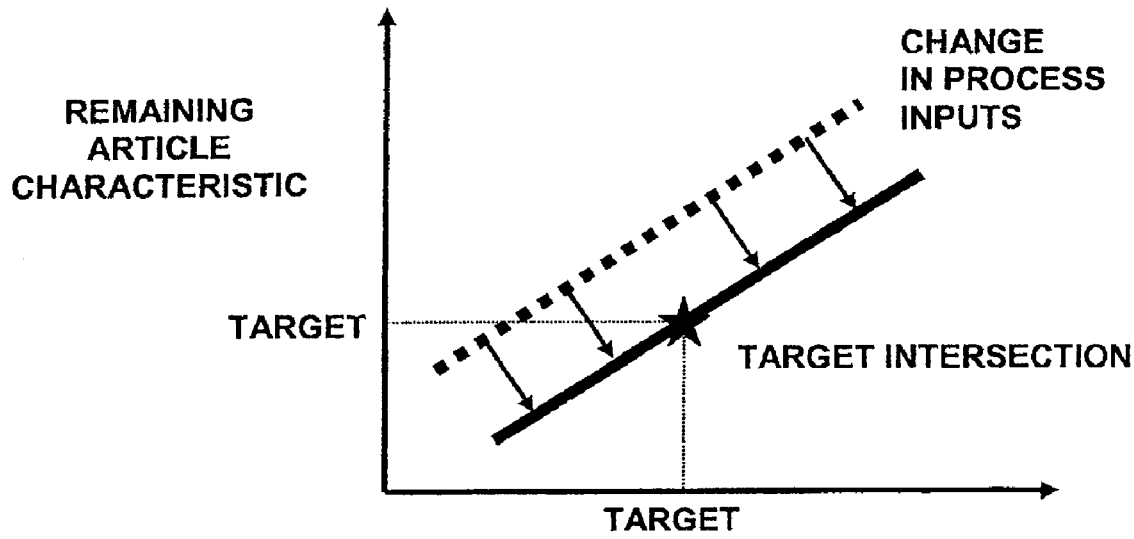
FIG._6
FIG._7
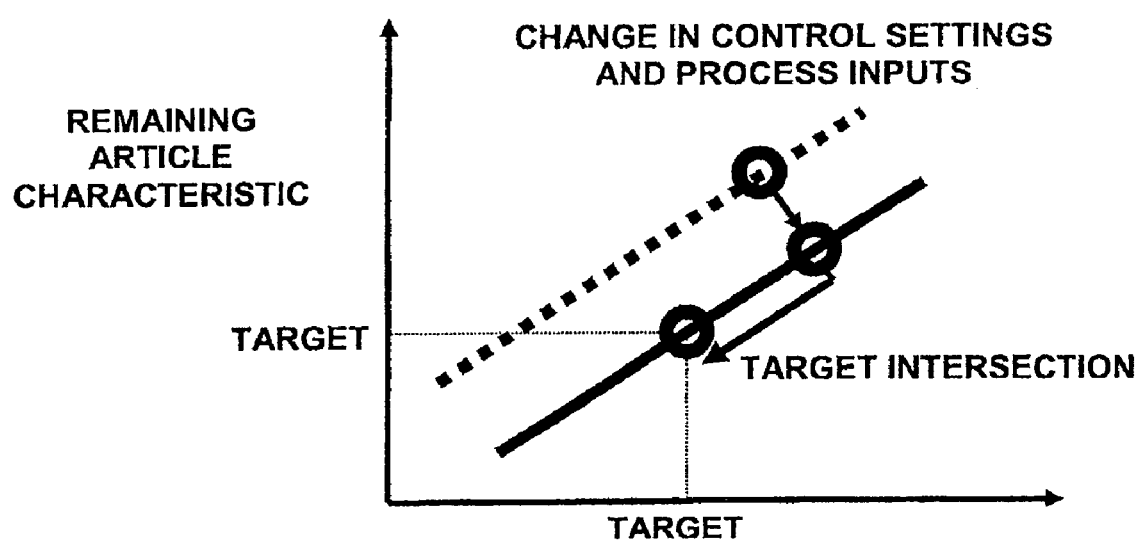

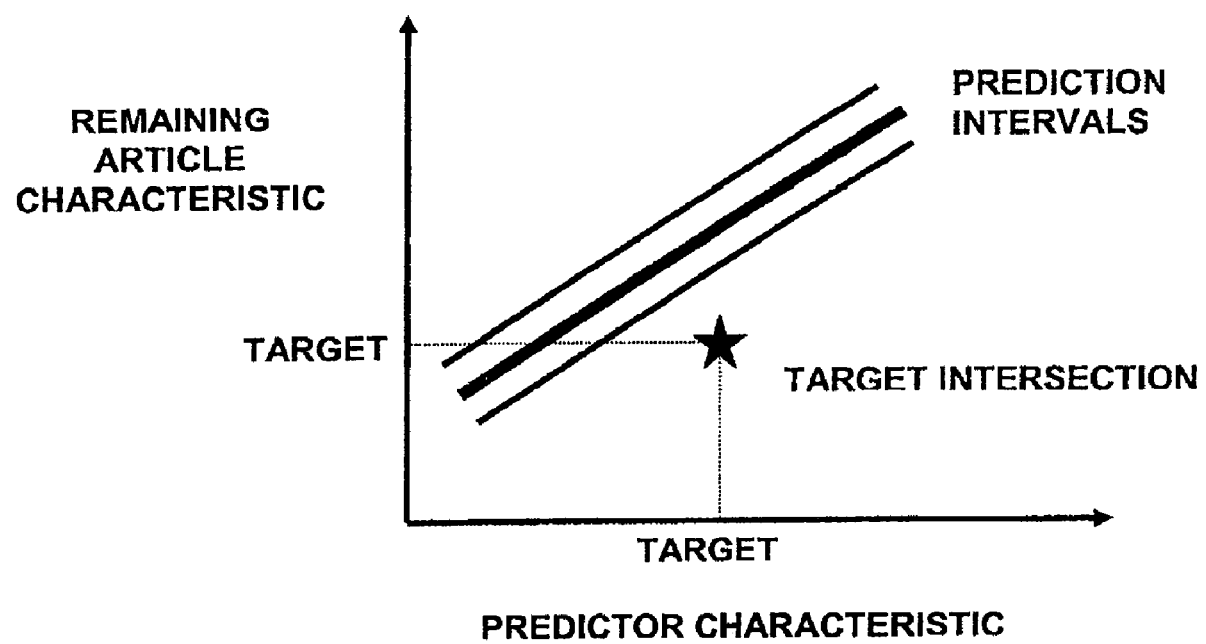
FIG._8

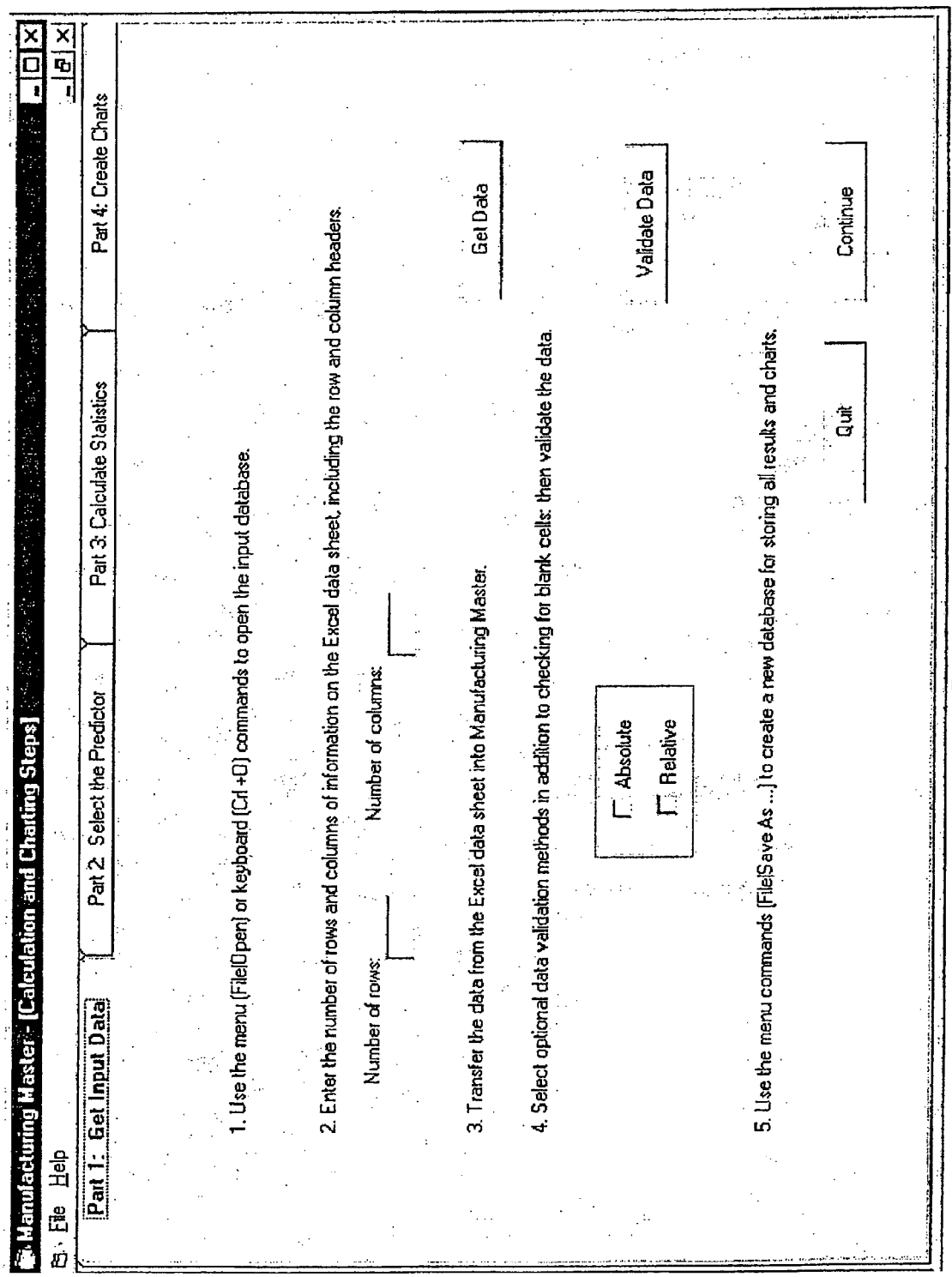
FIG_9

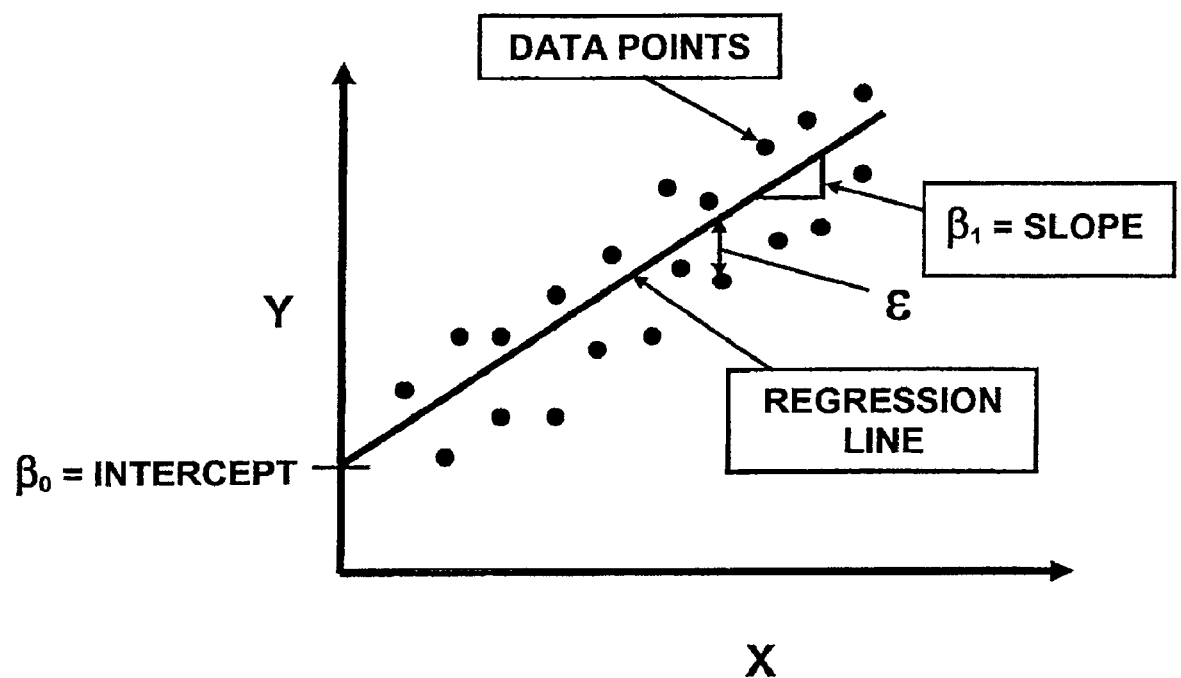
FIG._10

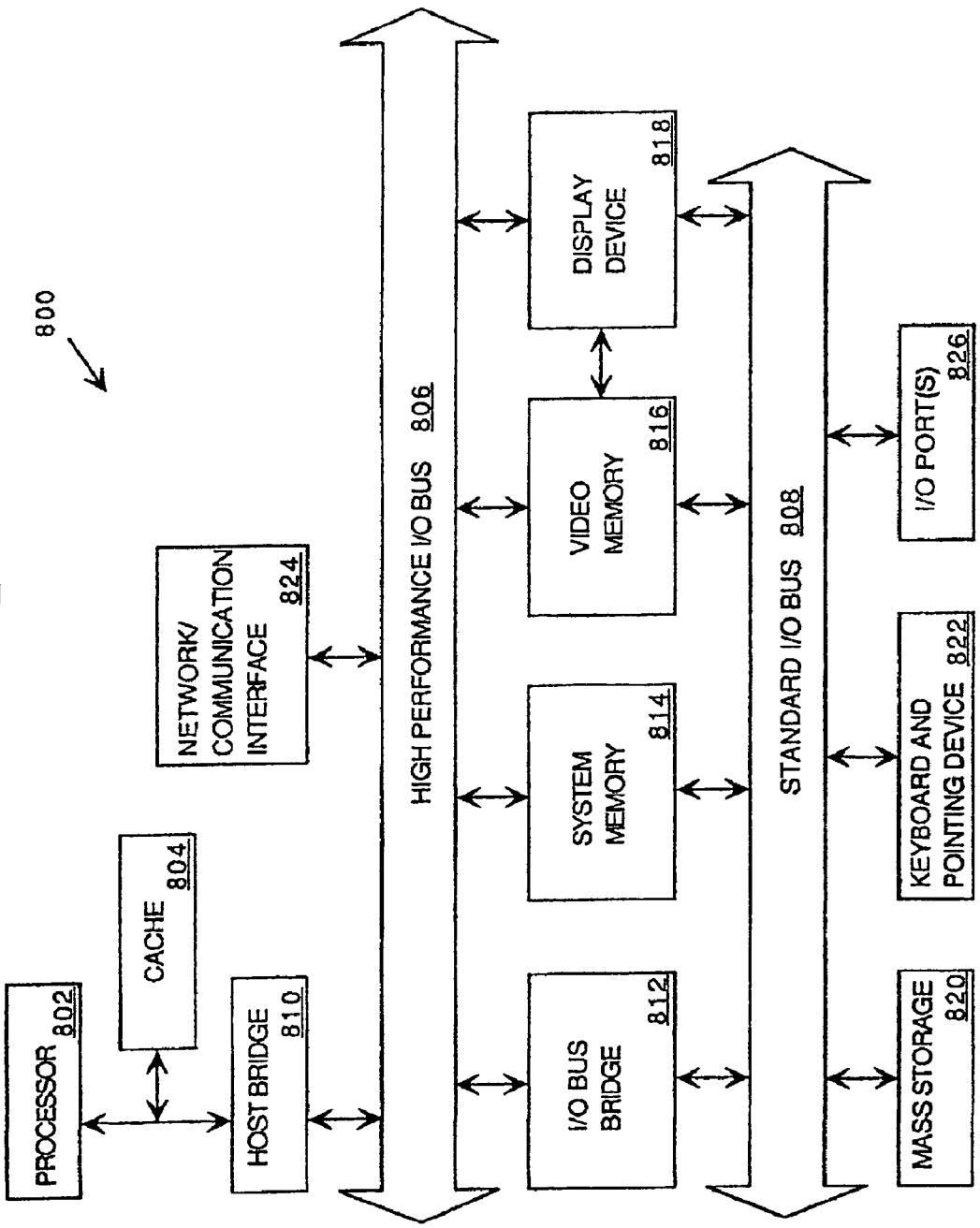

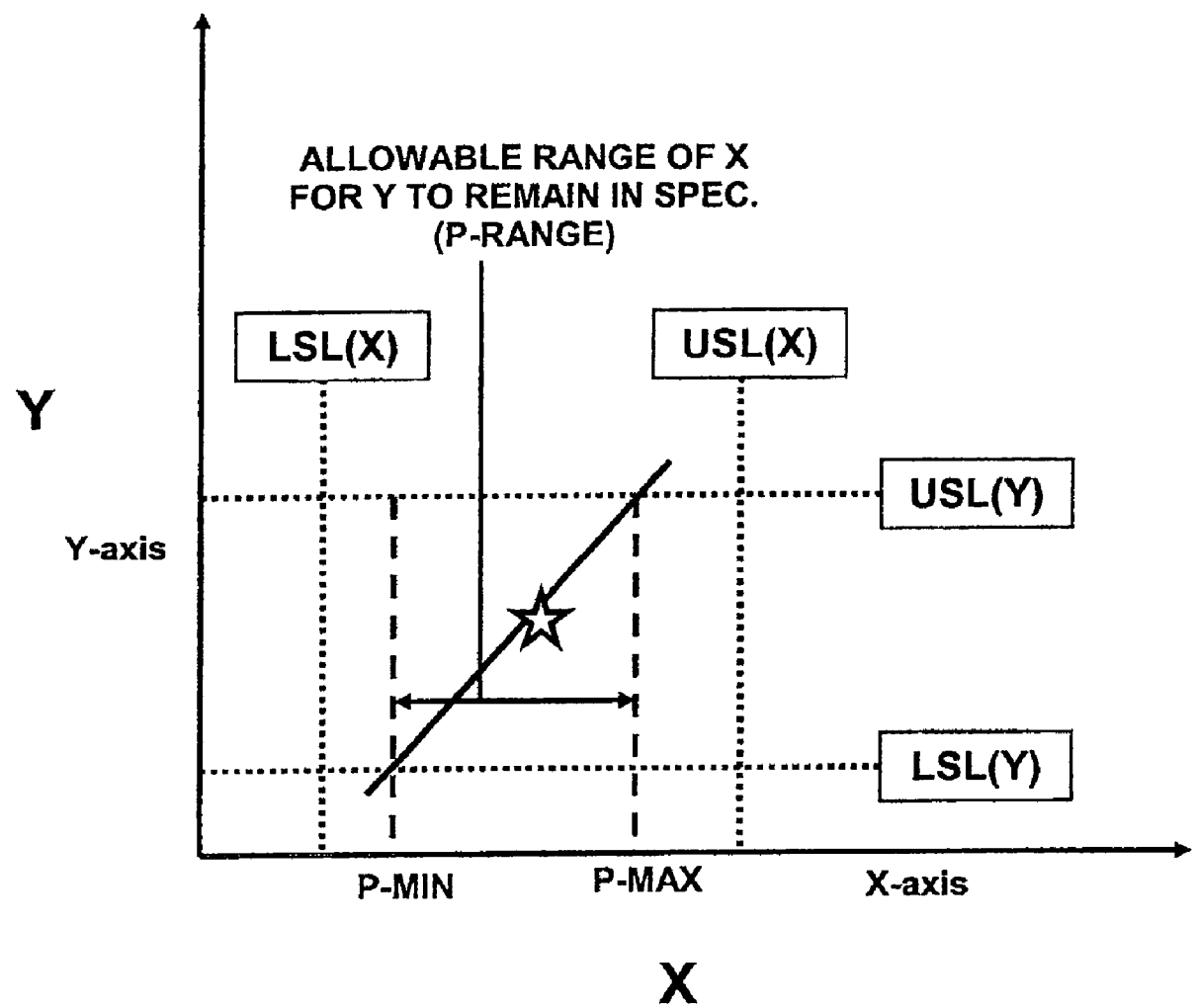
FIG._12

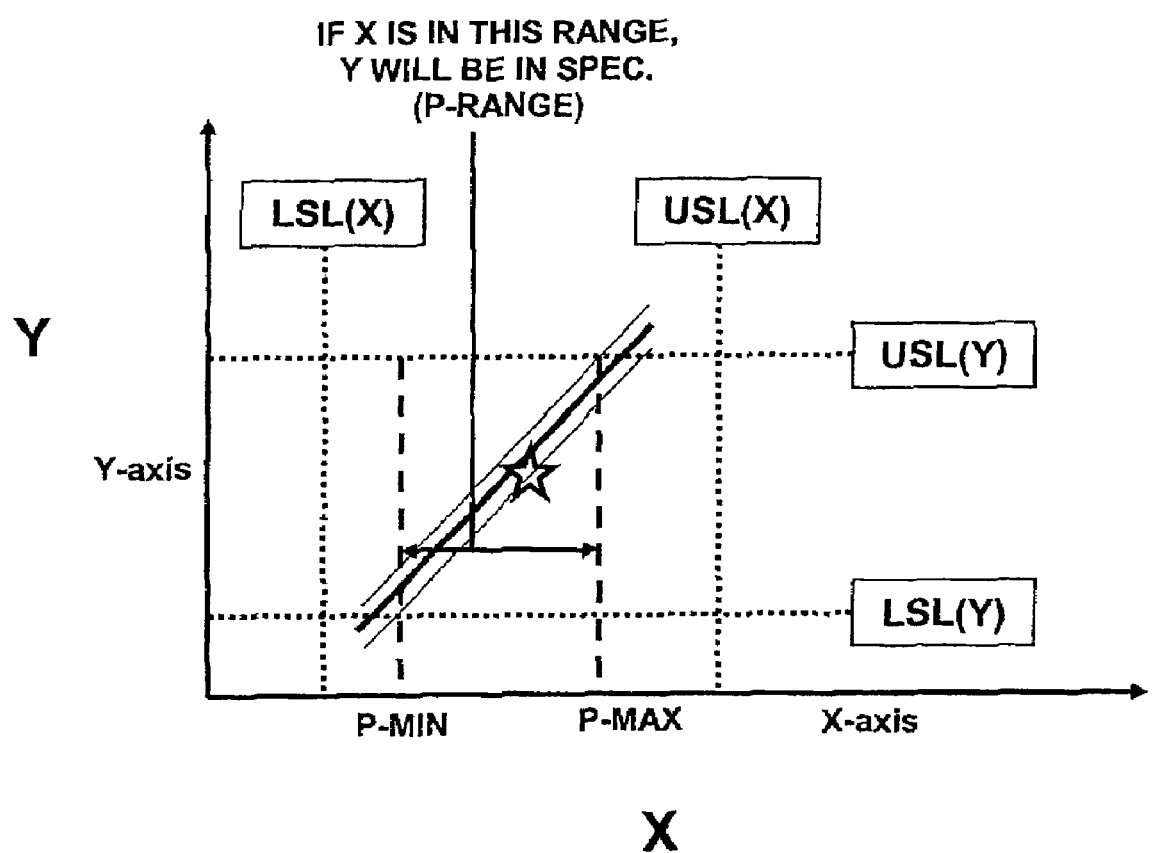
FIG._13

| | 2 | 3 | 4 | 5 | 6 | 7 | 8 |
|---|---|---|---|---|---|---|---|
| 1 | | | | | | | |
| 2 | Row/Col. | Var1 | Var2 | Var3 | Var4 | Var5 | Var6 |
| 3 | 1 | 1 | 2 | 3 | 4 | 5 | 6 |
| 4 | 2 | 2 | 2.9 | 3.8 | 4.7 | 5.6 | 7 |
| 5 | 3 | 3 | 4 | 5 | 6 | 7 | 8 |
| 6 | 4 | 4 | 5.1 | 6.2 | 7.3 | 8.4 | 9 |
| 7 | 5 | 5 | 6 | 7 | 8 | 9 | 10 |
| 8 | | | | | | | |
| 9 | Correlation | 0.999232 | 0.999232 | 0.997054 | 0.993653 | 0.989203 | 1.000000 |
| 10 | Correlation | 0.997054 | 0.999294 | 0.999294 | 0.997298 | 0.994186 | 0.999232 |
| 11 | Correlation | 0.993653 | 0.997298 | 0.999354 | 0.999354 | 0.997530 | 0.997054 |
| 12 | Correlation | 0.989203 | 0.994186 | 0.997530 | 0.999410 | 0.999410 | 0.993653 |
| 13 | Correlation | 1.000000 | 0.999232 | 0.997054 | 0.993653 | 0.989203 | 0.989203 |
| 14 | | | | | | | |
| 15 | Average | 0.995829 | 0.997848 | 0.998057 | 0.996673 | 0.993907 | 0.995829 |

FIG._19

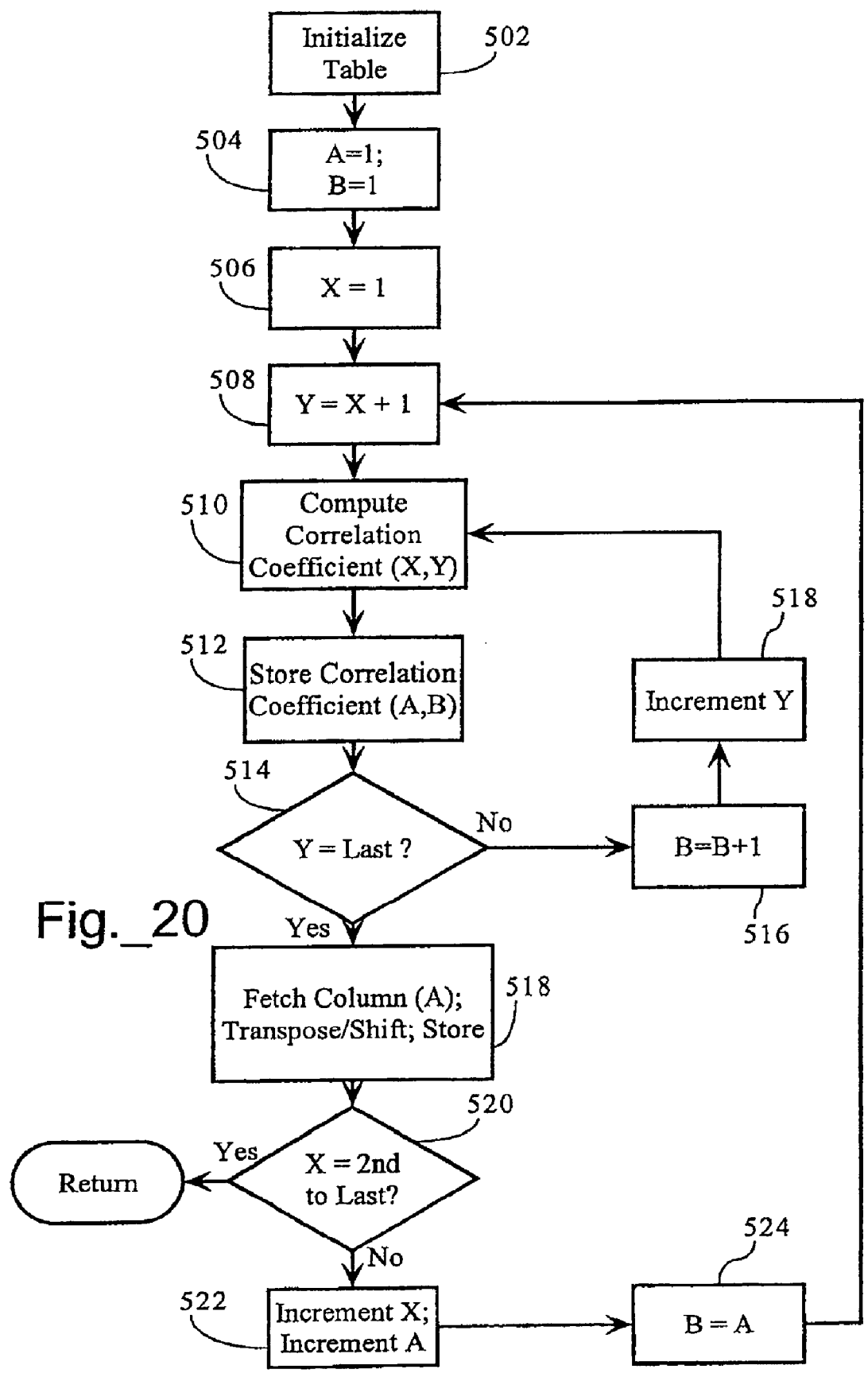
Fig._20

| CAVITY | END | DIM. | P-MIN | P-MAX |
|---|---|---|---|---|
| 1 | LONG | 1.785 | NONE | 1.932 |
| | | 1.925 | 1.924 | 1.934 |
| | | 1.970 | NONE | NONE |
| | | 2.065 | 1.920 | 1.929 |
| 1 | SHORT | 1.785 | NONE | NONE |
| | | 1.925 | 1.921 | 1.938 |
| | | 1.970 | NONE | NONE |
| | | 2.065 | NONE | NONE |
| 2 | LONG | 1.785 | NONE | 1.938 |
| | | 1.925 | 1.921 | 1.938 |
| | | 1.970 | NONE | NONE |
| | | 2.065 | NONE | 1.931 |
| 2 | SHORT | 1.785 | NONE | 1.937 |
| | | 1.925 | 1.923 | NONE |
| | | 1.970 | NONE | NONE |
| | | 2.065 | NONE | NONE |

FIG. 22

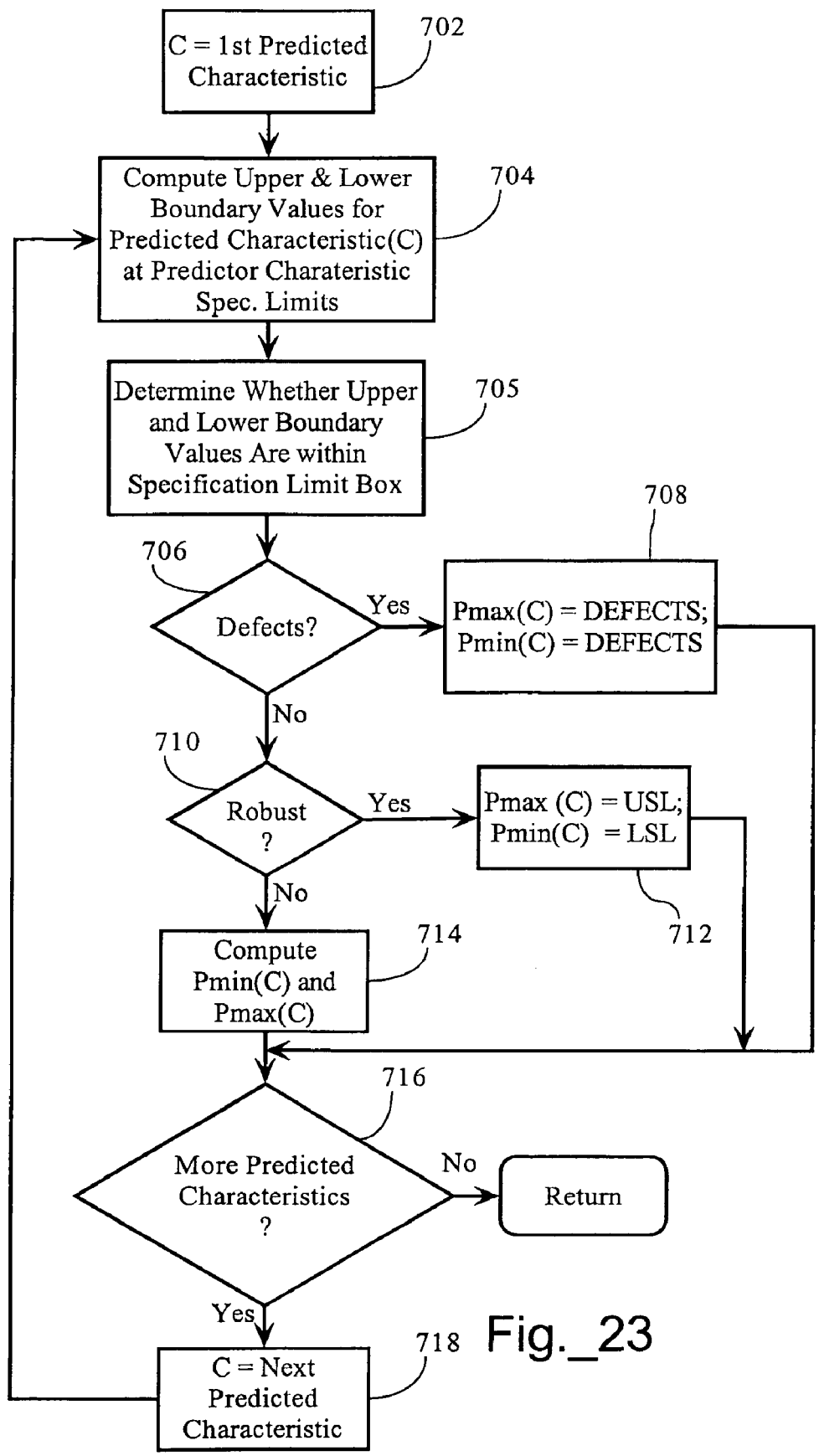
Fig._23

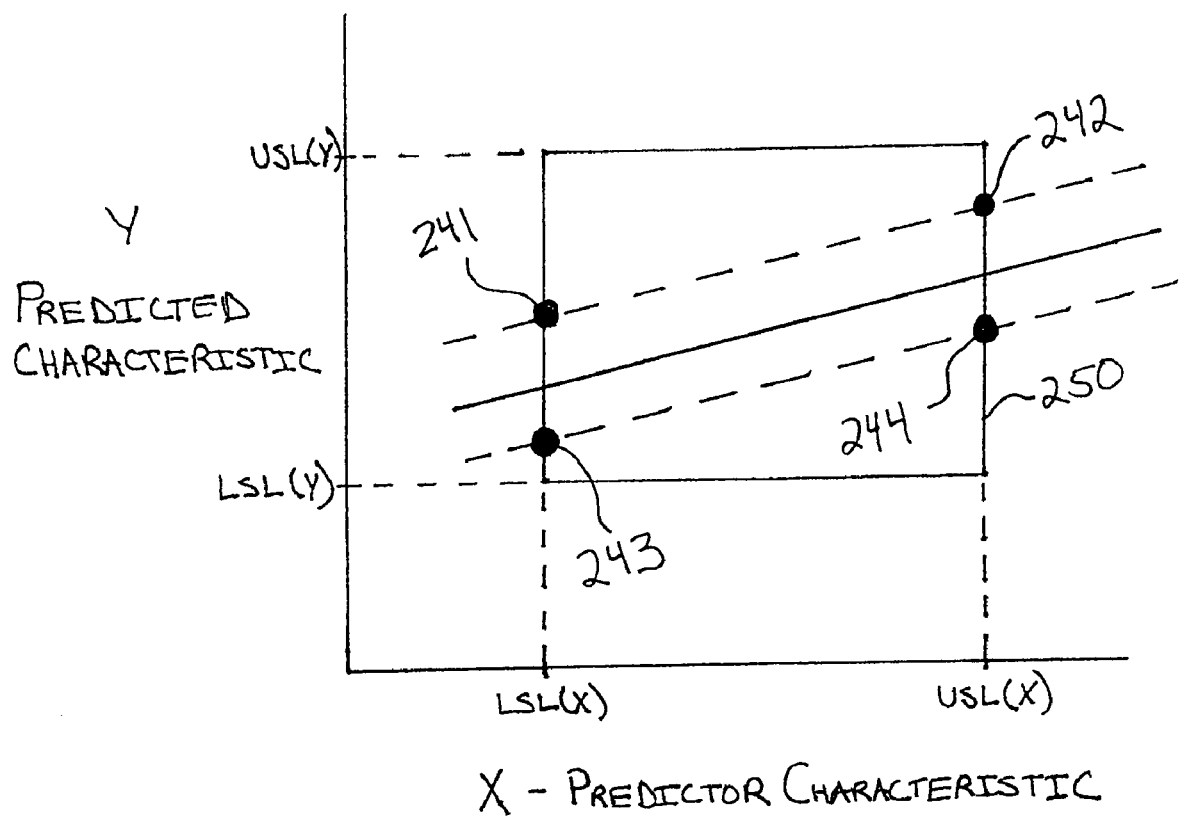
FIG._24

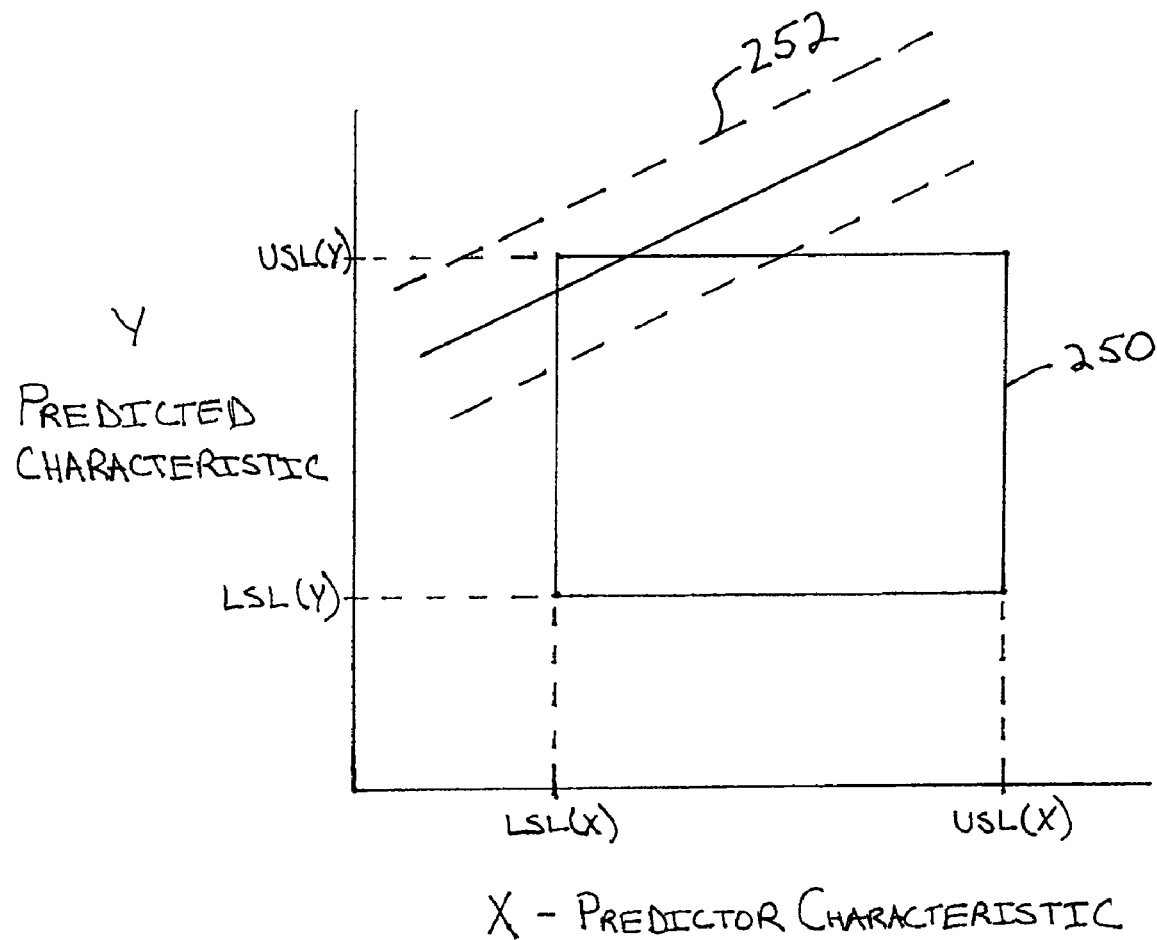
FIG. _ 25A

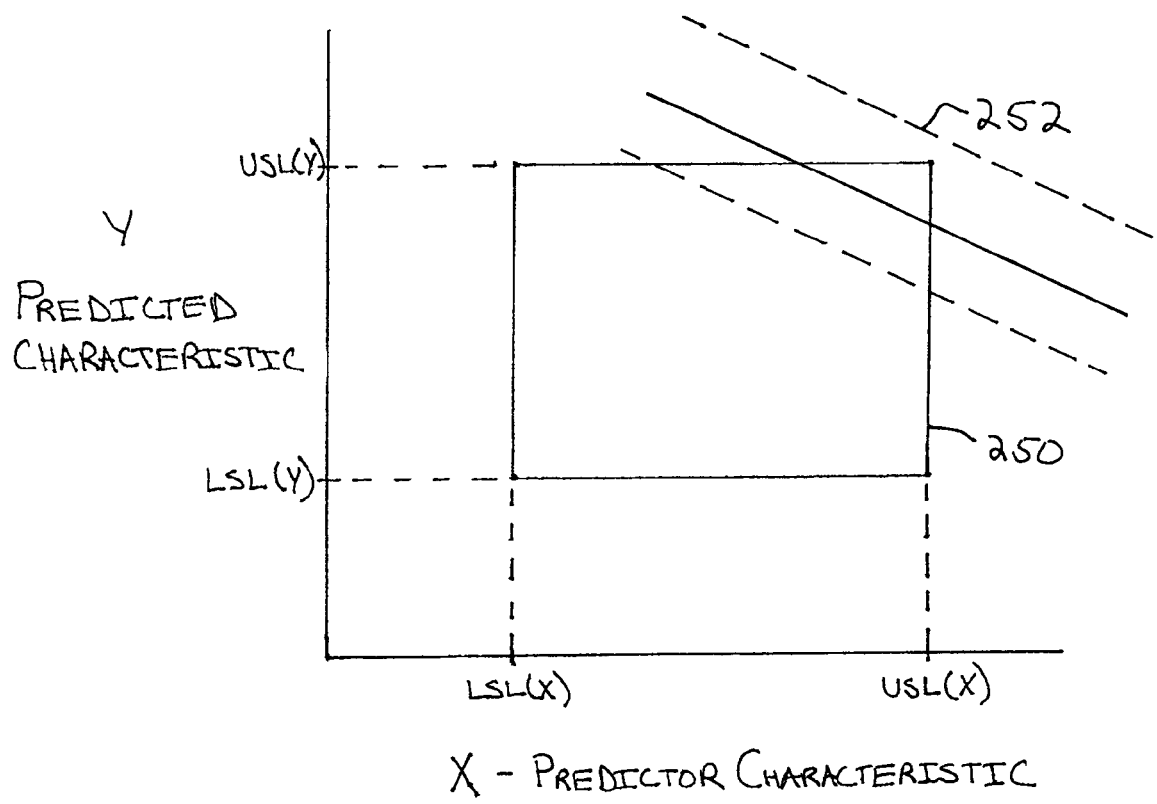
FIG._25B

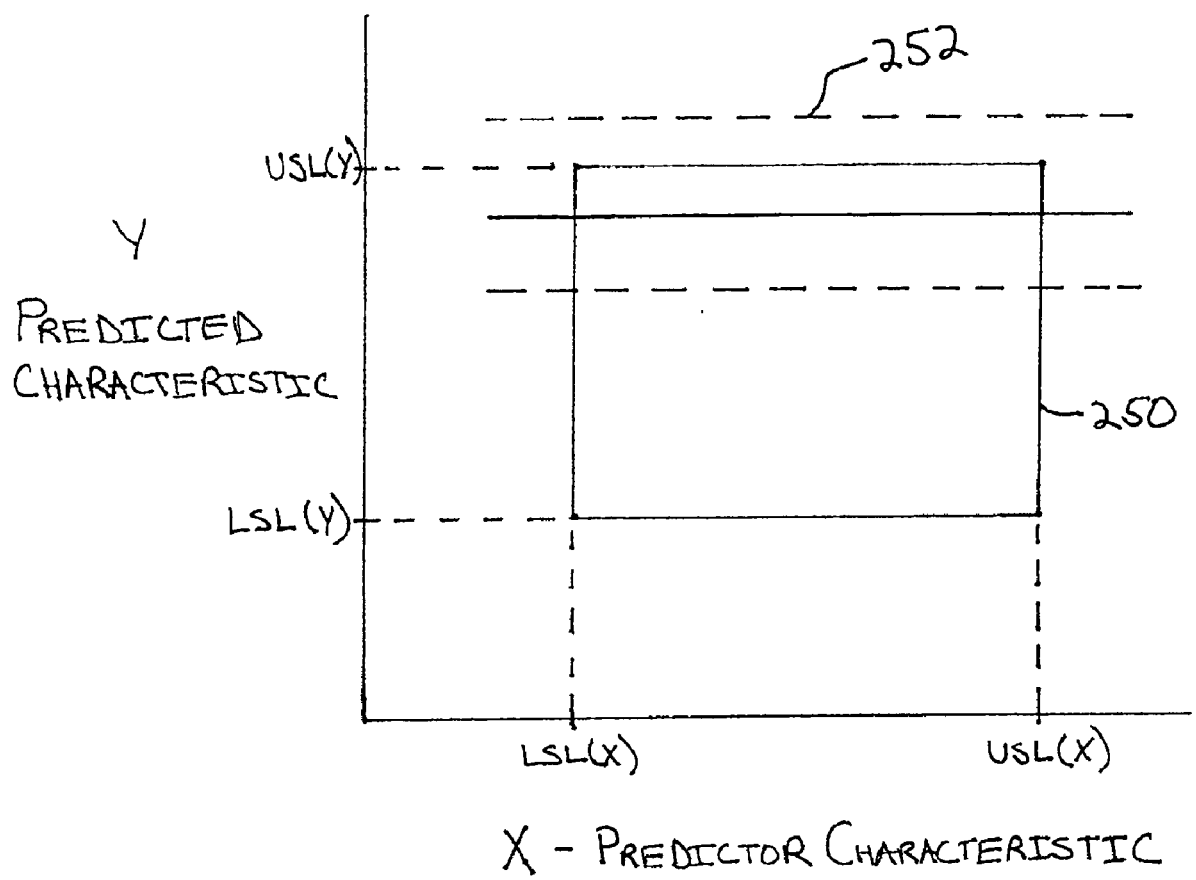
FIG. _ 25C

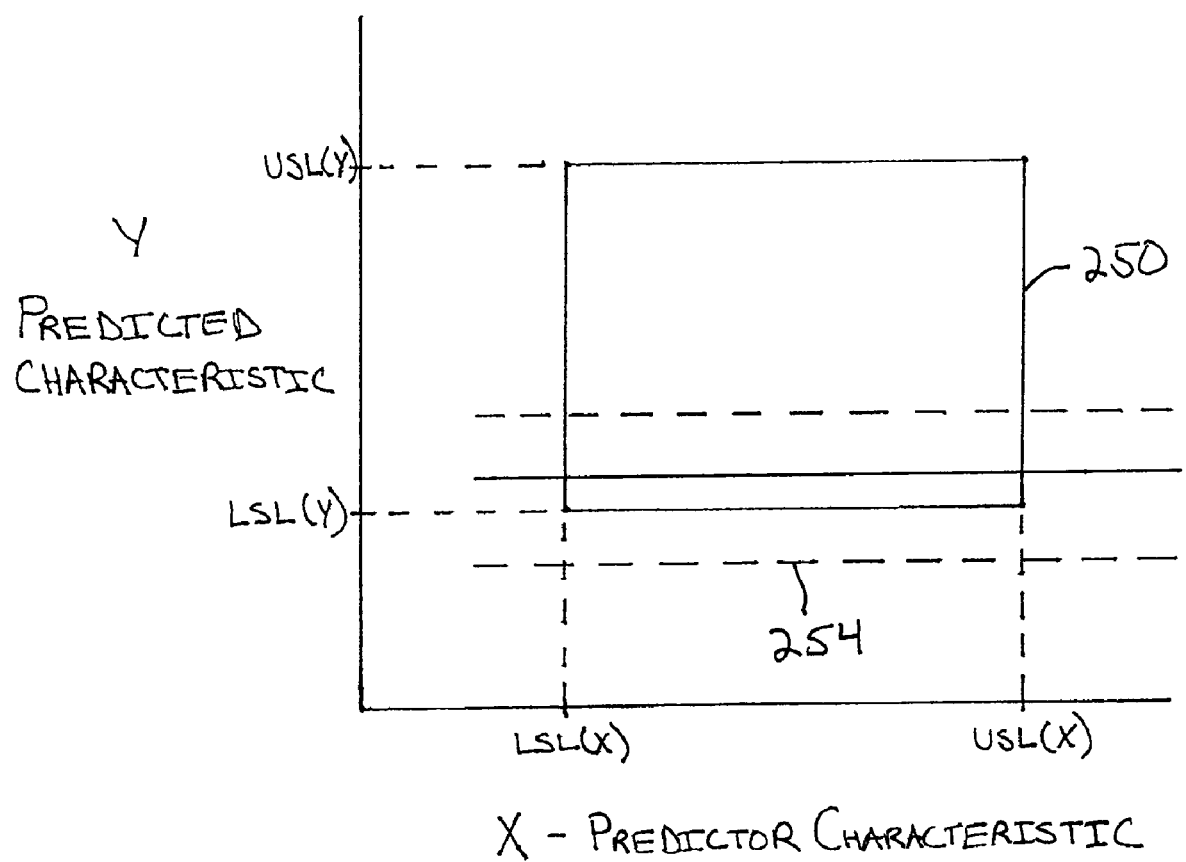
FIG._25D

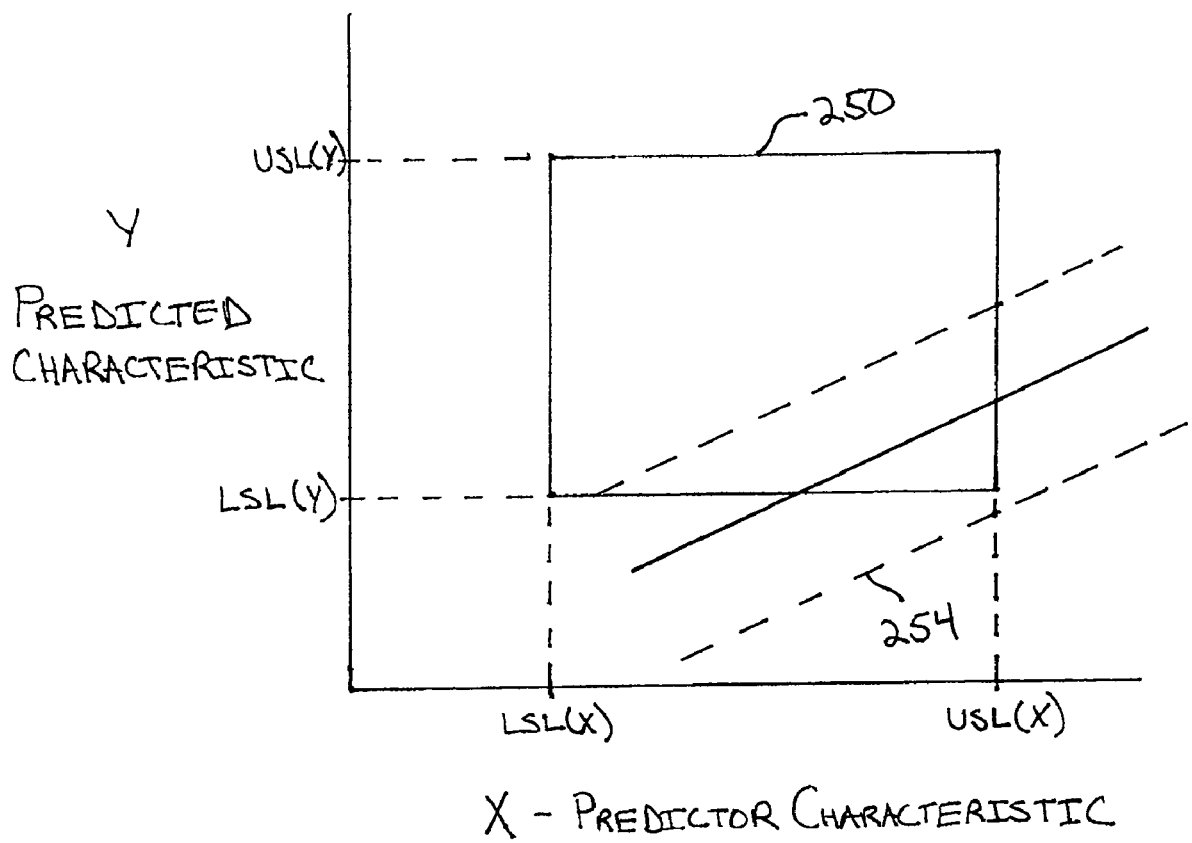
FIG. _ 25E

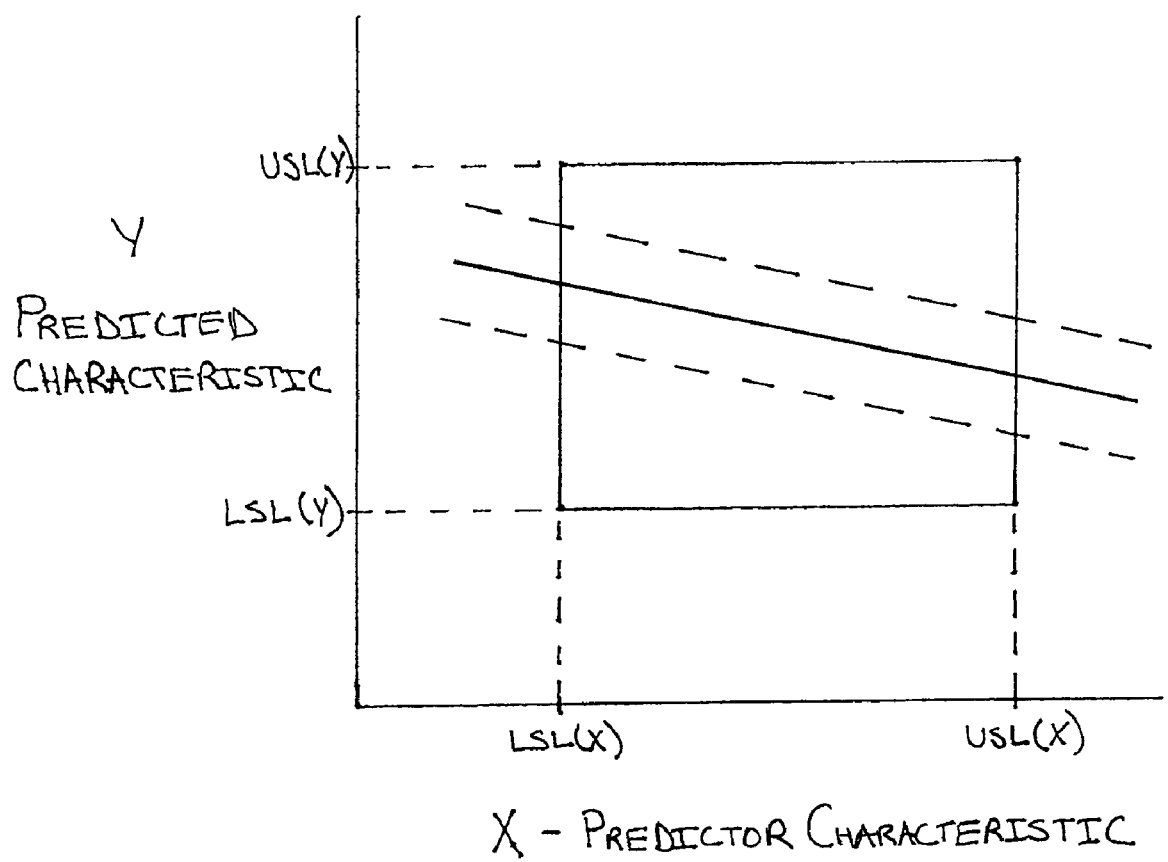
FIG. _ 26B

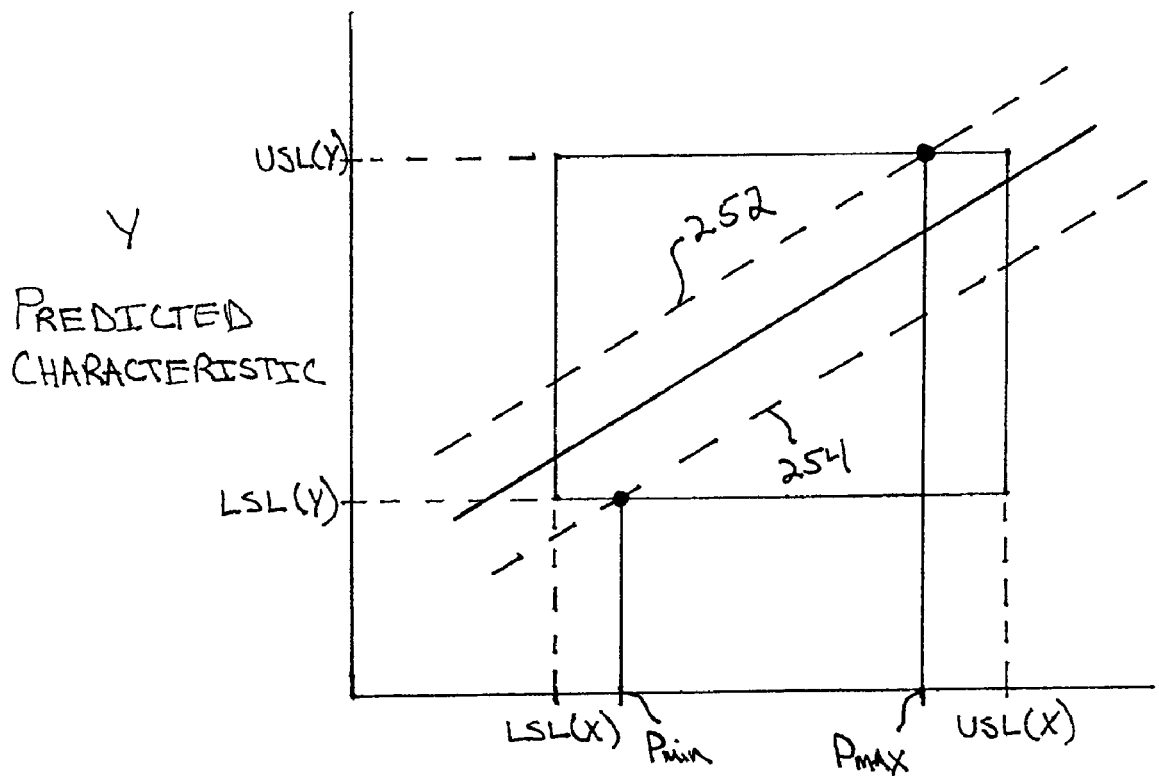
FIG._27A

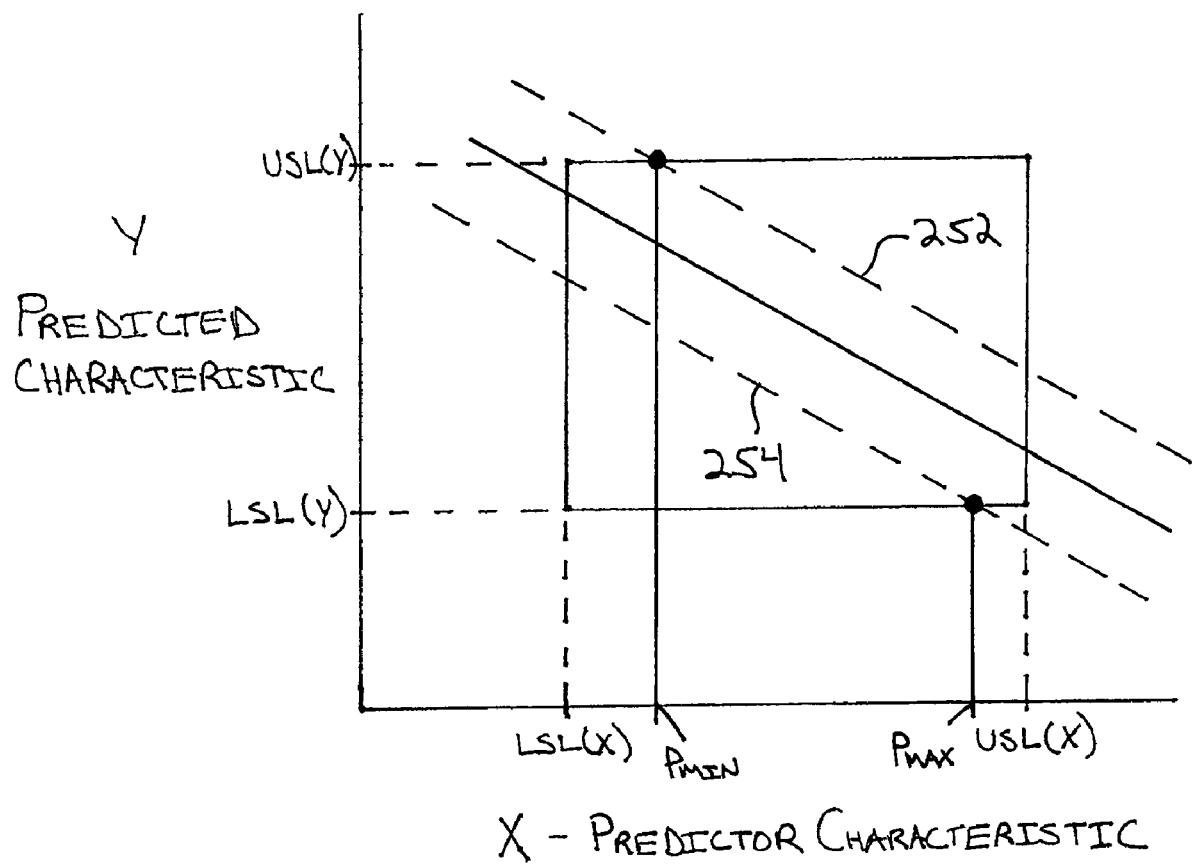
FIG. _ 27B

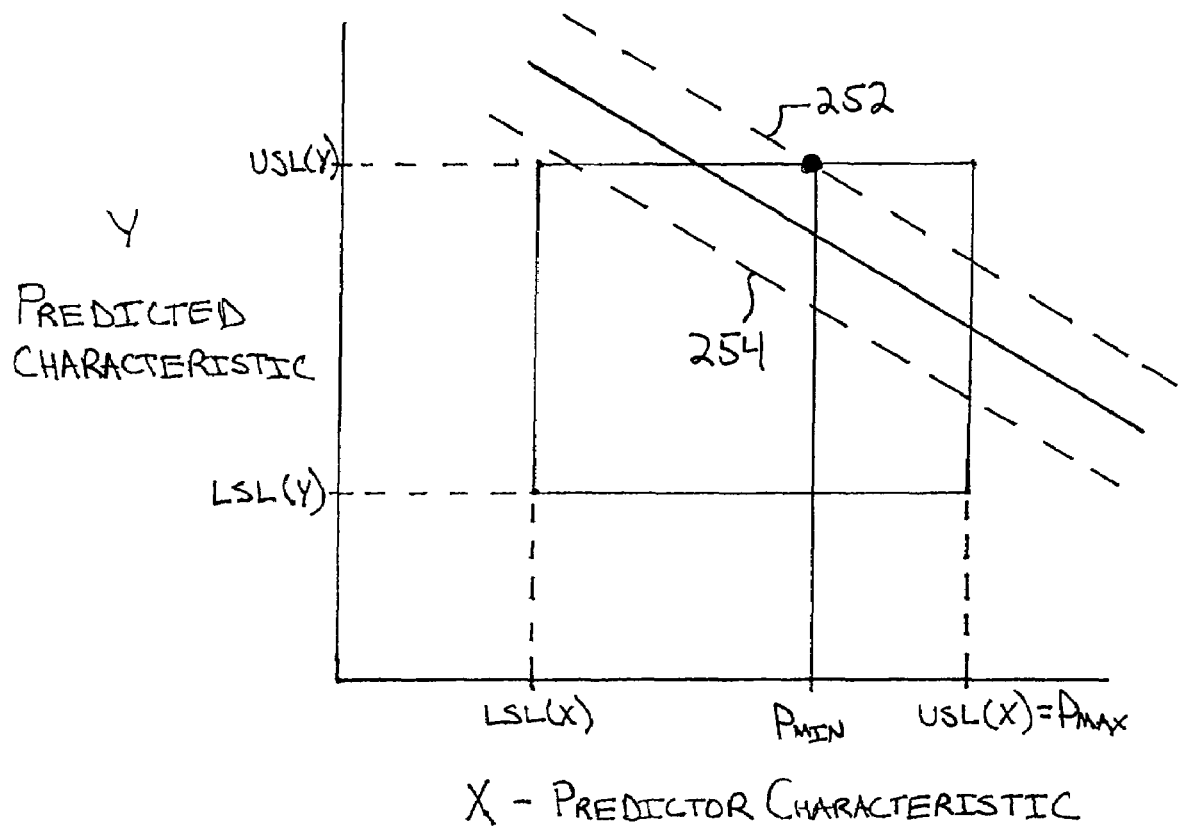
FIG._27D

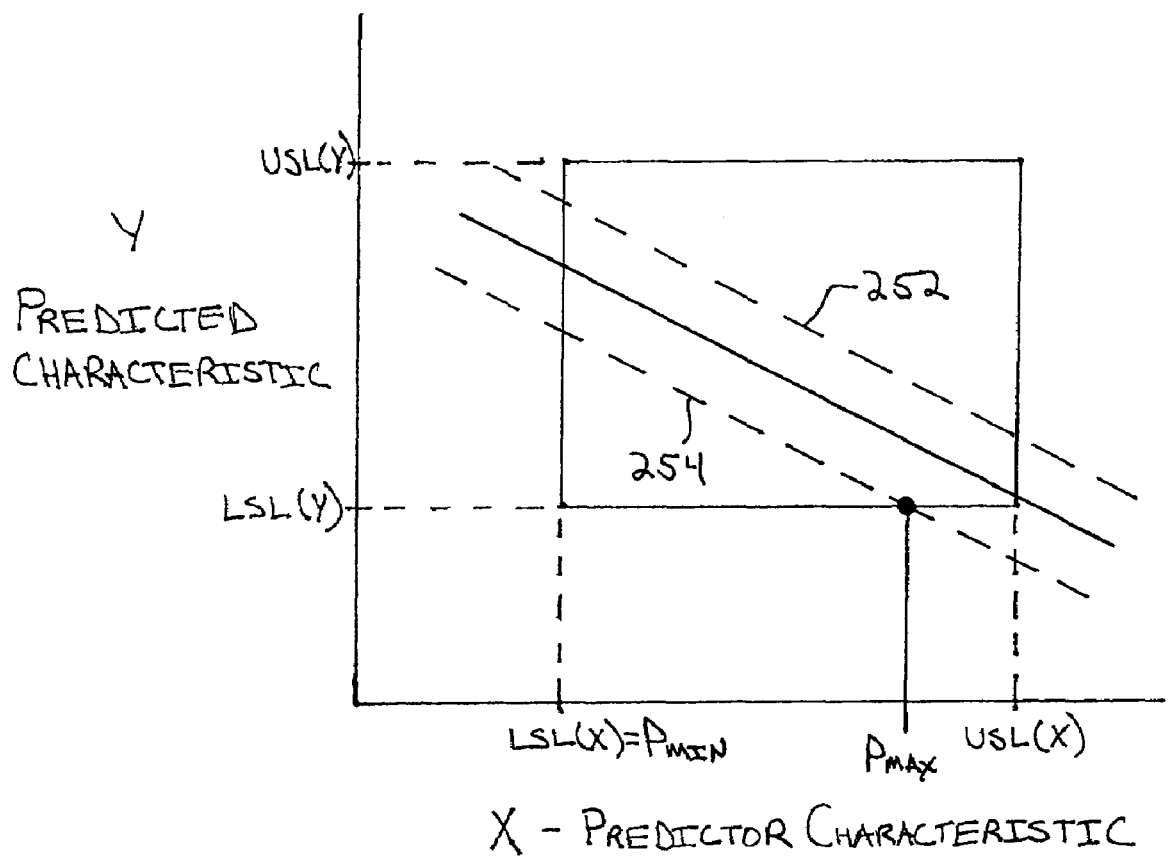
FIG._27F

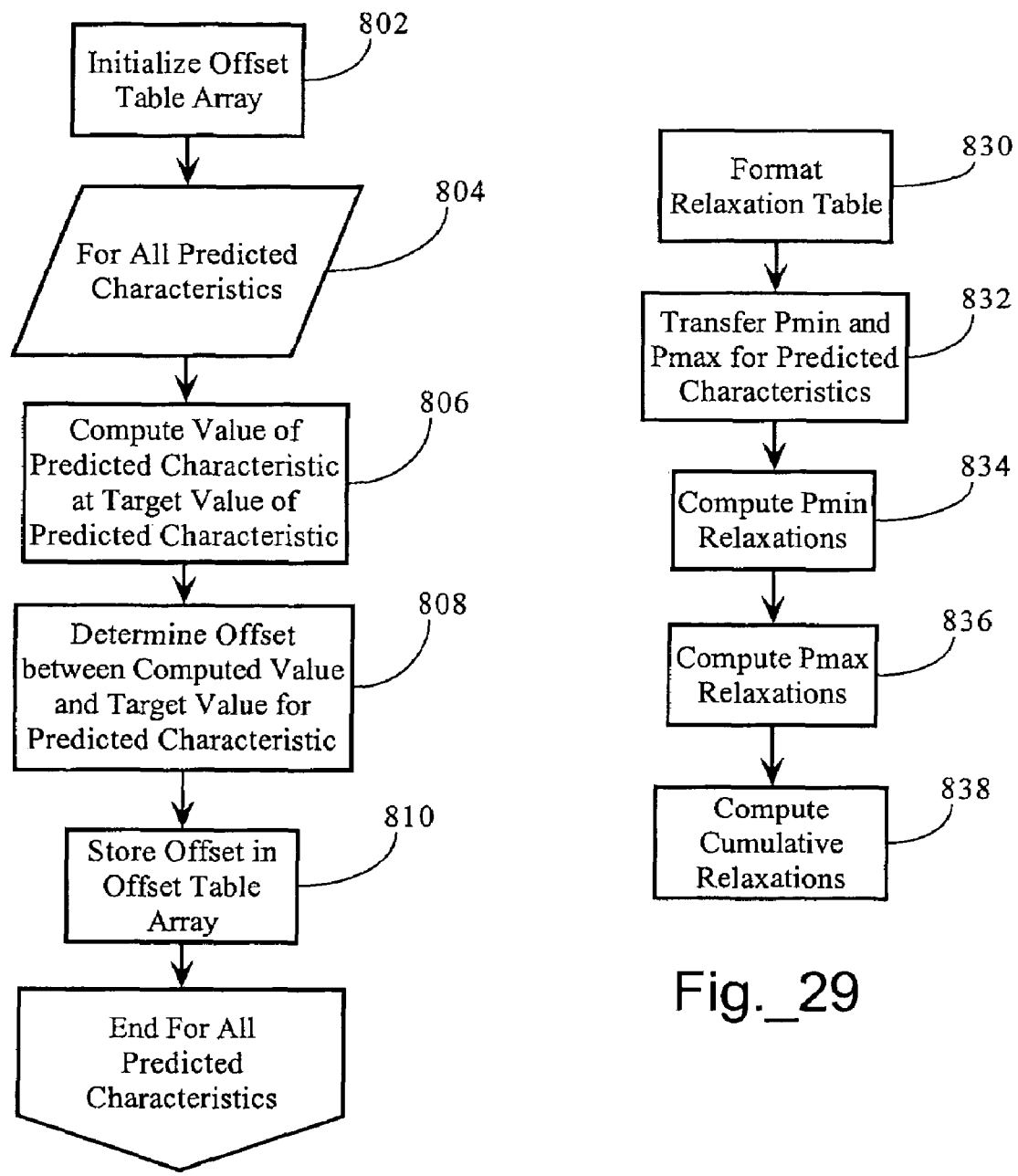

Offset Table

| Variable Name | Vertical Offset |
|---|---|
| Var1 | 0.0035 |
| Var2 | 0.0074 |
| Var3 | 0.0049 |
| Var4 | 0.0076 |
| Var5 | 0.0056 |
| Var6 | 0.0040 |
| Var7 | 0.0060 |
| Var8 | 0.0039 |
| Var9 | -0.0031 |
| Var10 | -0.0001 |
| Var11 | -0.0003 |
| Var12 | Predictor |
| Var13 | -0.0008 |
| Var14 | -0.0020 |
| Var15 | -0.0021 |
| Var16 | -0.0031 |
| Var17 | 0.0005 |
| Var18 | 0.0026 |
| Var19 | 0.0001 |
| Var20 | 0.0016 |
| Var21 | -0.0006 |
| Var22 | 0.0038 |
| Var23 | -0.0002 |
| Var24 | 0.0027 |
| Var25 | -0.0003 |
| Var26 | 0.0035 |
| Var27 | -0.0005 |
| Var28 | 0.0024 |
| Var29 | 0.0000 |
| Var30 | 0.0025 |
| Var31 | -0.0005 |
| Var32 | 0.0032 |

Fig._28B

Correlation Master Relaxation Table

| Variable Name | Ranked Pmin's | Individ. Gain | Cumul. Gain | Variable Name | Ranked P-max's | Gain. Individ. | Cumul. Gain |
|---|---|---|---|---|---|---|---|
| Var16 | 6.3771 | 0.0004 | 0.0004 | Var2 | 6.3776 | 0.0006 | 0.0006 |
| Var13 | 6.3766 | 0.0005 | 0.0010 | Var4 | 6.3782 | 0.0037 | 0.0043 |
| Var11 | 6.3761 | 0.0002 | 0.0012 | Var7 | 6.3819 | 0.0002 | 0.0045 |
| Var9 | 6.3759 | 0.0002 | 0.0014 | Var8 | 6.3821 | 0.0012 | 0.0057 |
| Var10 | 6.3757 | 0.0016 | 0.0030 | Var3 | 6.3833 | 0.0000 | 0.0058 |
| Var15 | 6.3741 | 0.0005 | 0.0035 | Var5 | 6.3833 | 0.0013 | 0.0071 |
| Var14 | 6.3736 | 0.0001 | 0.0037 | Var1 | 6.3847 | 0.0003 | 0.0074 |
| Var8 | 6.3734 | 0.0017 | 0.0054 | Var6 | 6.3849 | 0.0015 | 0.0089 |
| Var1 | 6.3717 | 0.0012 | 0.0066 | Var11 | 6.3864 | 0.0000 | 0.0089 |
| Var2 | 6.3705 | 0.0007 | 0.0073 | Var10 | 6.3864 | 0.0007 | 0.0095 |
| Var3 | 6.3698 | 0.0006 | 0.0080 | Var13 | 6.3871 | 0.0044 | 0.0139 |
| Var6 | 6.3691 | 0.0001 | 0.0081 | Var16 | 6.3915 | 0.0010 | 0.0149 |
| Var4 | 6.3690 | 0.0000 | 0.0081 | Var15 | 6.3925 | 0.0003 | 0.0152 |
| Var5 | 6.3690 | 0.0000 | 0.0081 | Var9 | 6.3928 | 0.0002 | 0.0154 |
| Var7 | 6.3690 | 0.0000 | 0.0081 | Var14 | 6.3930 | 0.0000 | 0.0154 |
| Var17 | 6.3690 | 0.0000 | 0.0081 | Var17 | 6.3930 | 0.0000 | 0.0154 |
| Var18 | 6.3690 | 0.0000 | 0.0081 | Var18 | 6.3930 | 0.0000 | 0.0154 |
| Var19 | 6.3690 | 0.0000 | 0.0081 | Var19 | 6.3930 | 0.0000 | 0.0154 |
| Var20 | 6.3690 | 0.0000 | 0.0081 | Var20 | 6.3930 | 0.0000 | 0.0154 |
| Var21 | 6.3690 | 0.0000 | 0.0081 | Var21 | 6.3930 | 0.0000 | 0.0154 |
| Var22 | 6.3690 | 0.0000 | 0.0081 | Var22 | 6.3930 | 0.0000 | 0.0154 |
| Var23 | 6.3690 | 0.0000 | 0.0081 | Var23 | 6.3930 | 0.0000 | 0.0154 |
| Var24 | 6.3690 | 0.0000 | 0.0081 | Var24 | 6.3930 | 0.0000 | 0.0154 |
| Var25 | 6.3690 | 0.0000 | 0.0081 | Var25 | 6.3930 | 0.0000 | 0.0154 |
| Var26 | 6.3690 | 0.0000 | 0.0081 | Var26 | 6.3930 | 0.0000 | 0.0154 |
| Var27 | 6.3690 | 0.0000 | 0.0081 | Var27 | 6.3930 | 0.0000 | 0.0154 |
| Var28 | 6.3690 | 0.0000 | 0.0081 | Var28 | 6.3930 | 0.0000 | 0.0154 |
| Var29 | 6.3690 | 0.0000 | 0.0081 | Var29 | 6.3930 | 0.0000 | 0.0154 |
| Var30 | 6.3690 | 0.0000 | 0.0081 | Var30 | 6.3930 | 0.0000 | 0.0154 |
| Var31 | 6.3690 | 0.0000 | 0.0081 | Var31 | 6.3930 | 0.0000 | 0.0154 |
| Var32 | 6.3690 | 0.0000 | 0.0081 | Var32 | 6.3930 | 0.0000 | 0.0154 |
| Var12 | 6.3690 | 0.0000 | 0.0081 | Var12 | 6.3930 | 0.0000 | 0.0154 |

FIG. 30

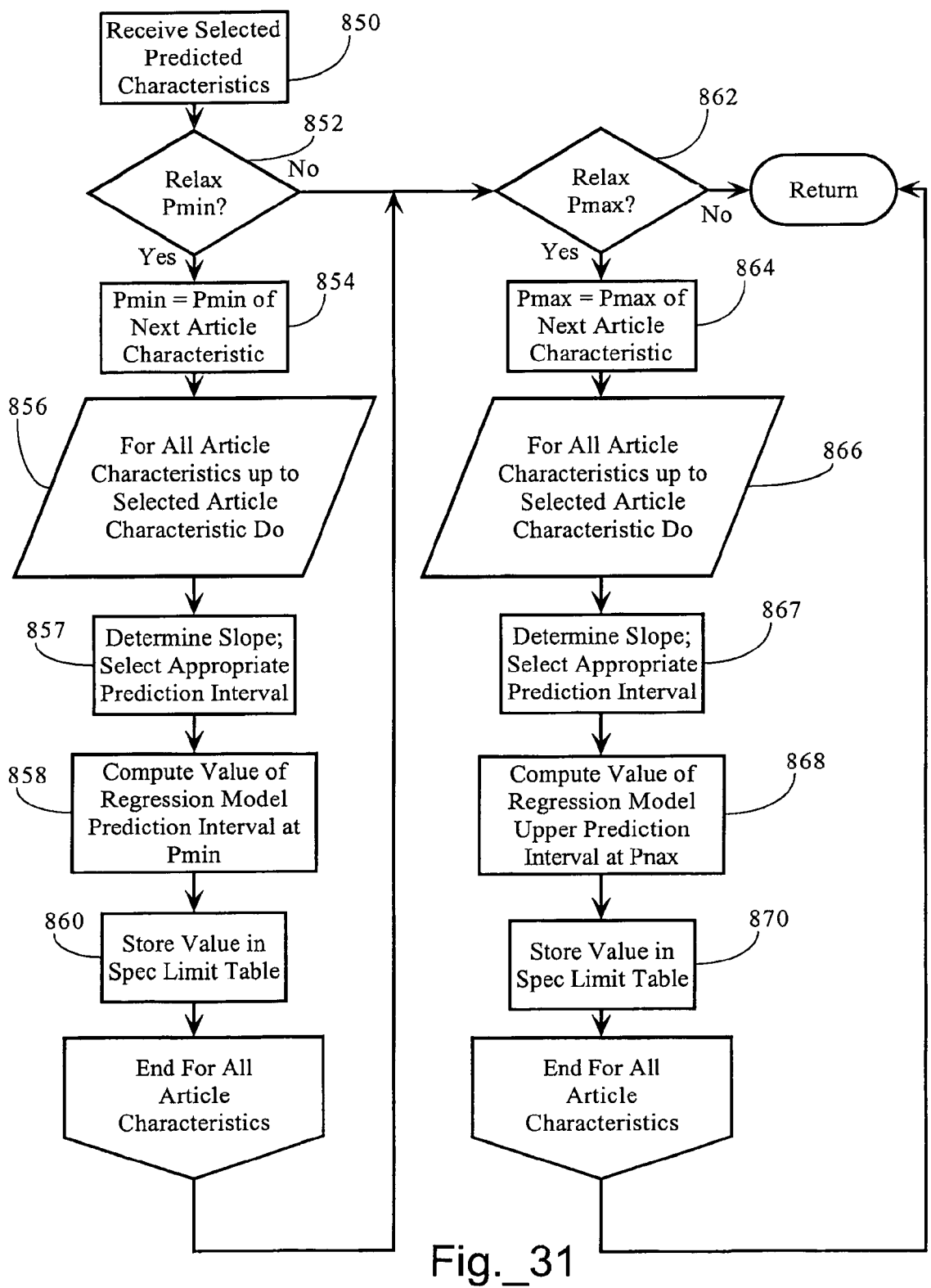
Fig._31

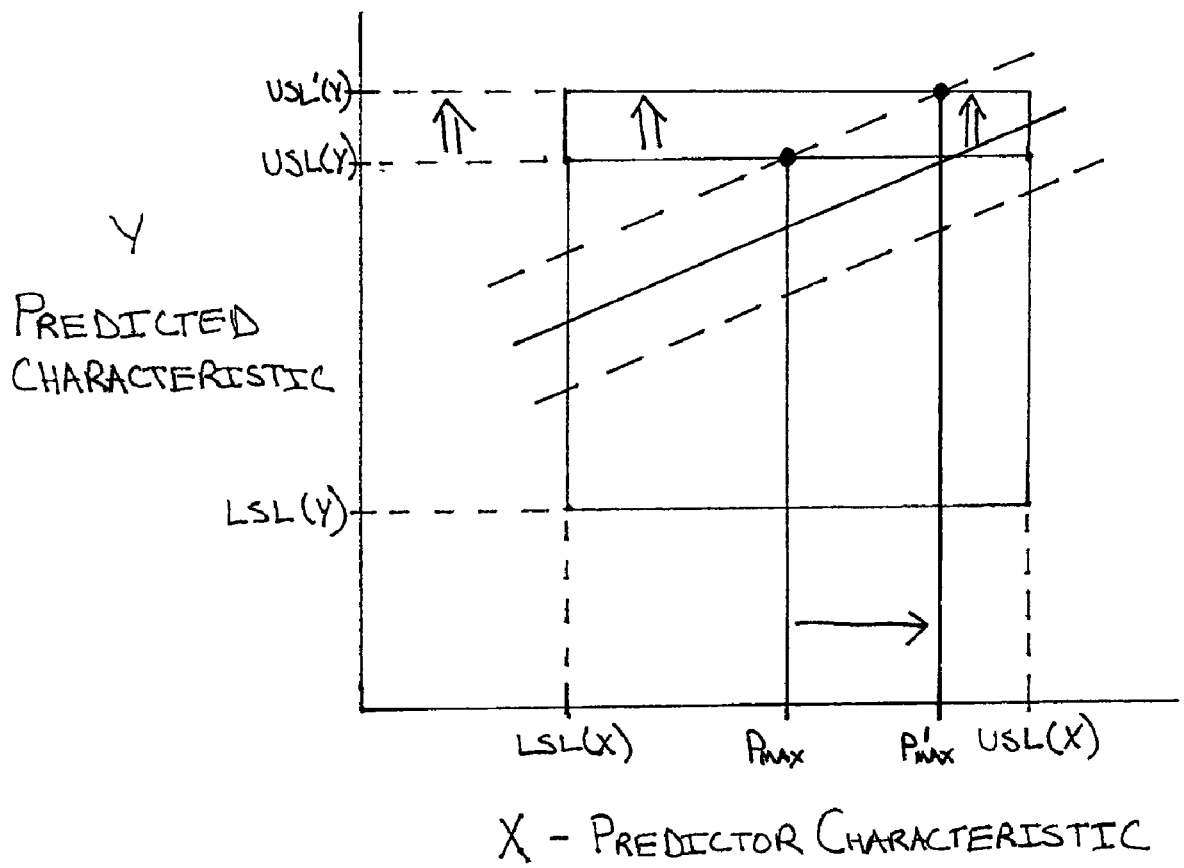
FIG._32A

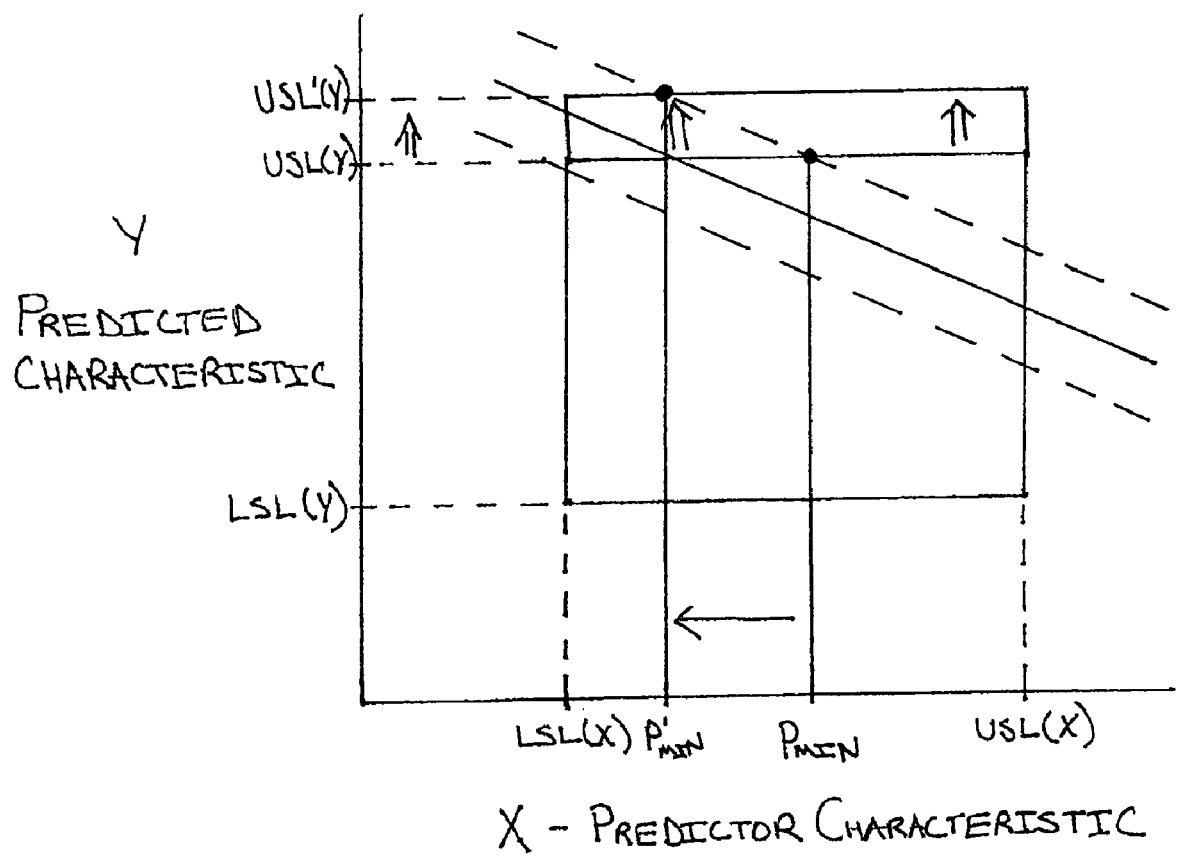
FIG._32C

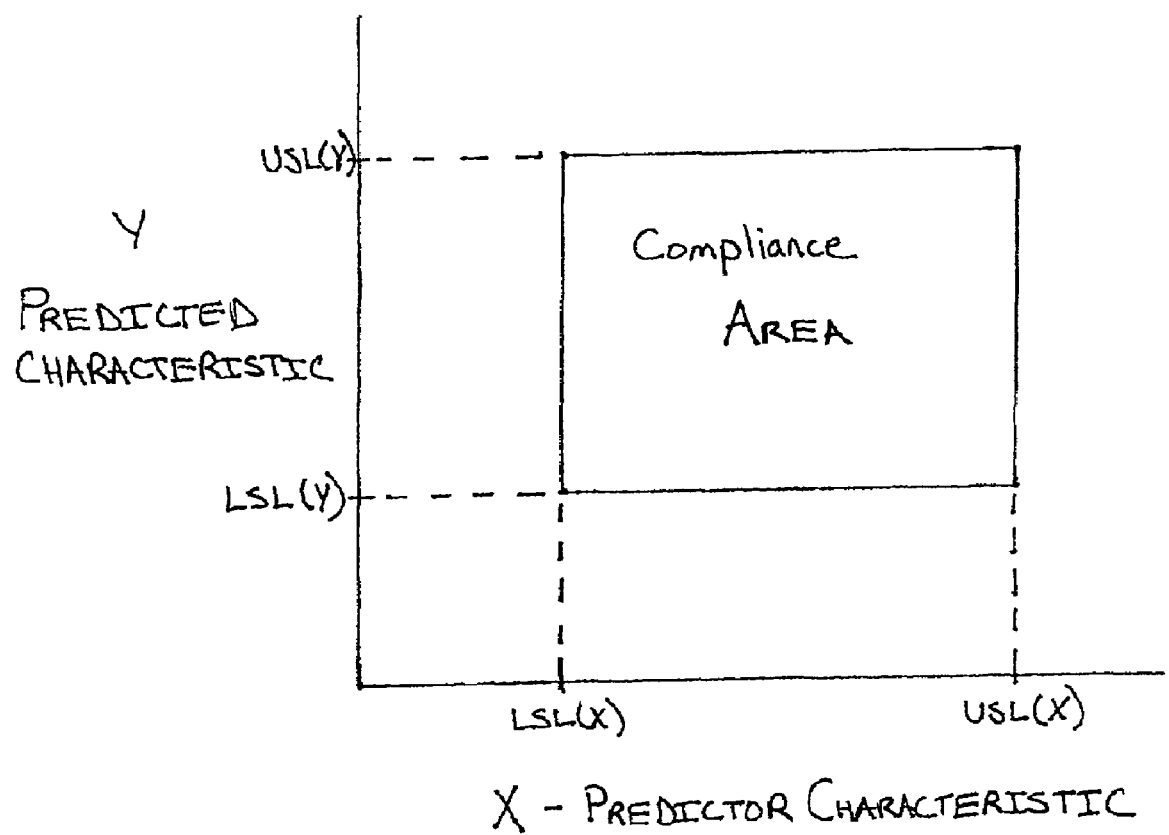
FIG. _ 33A

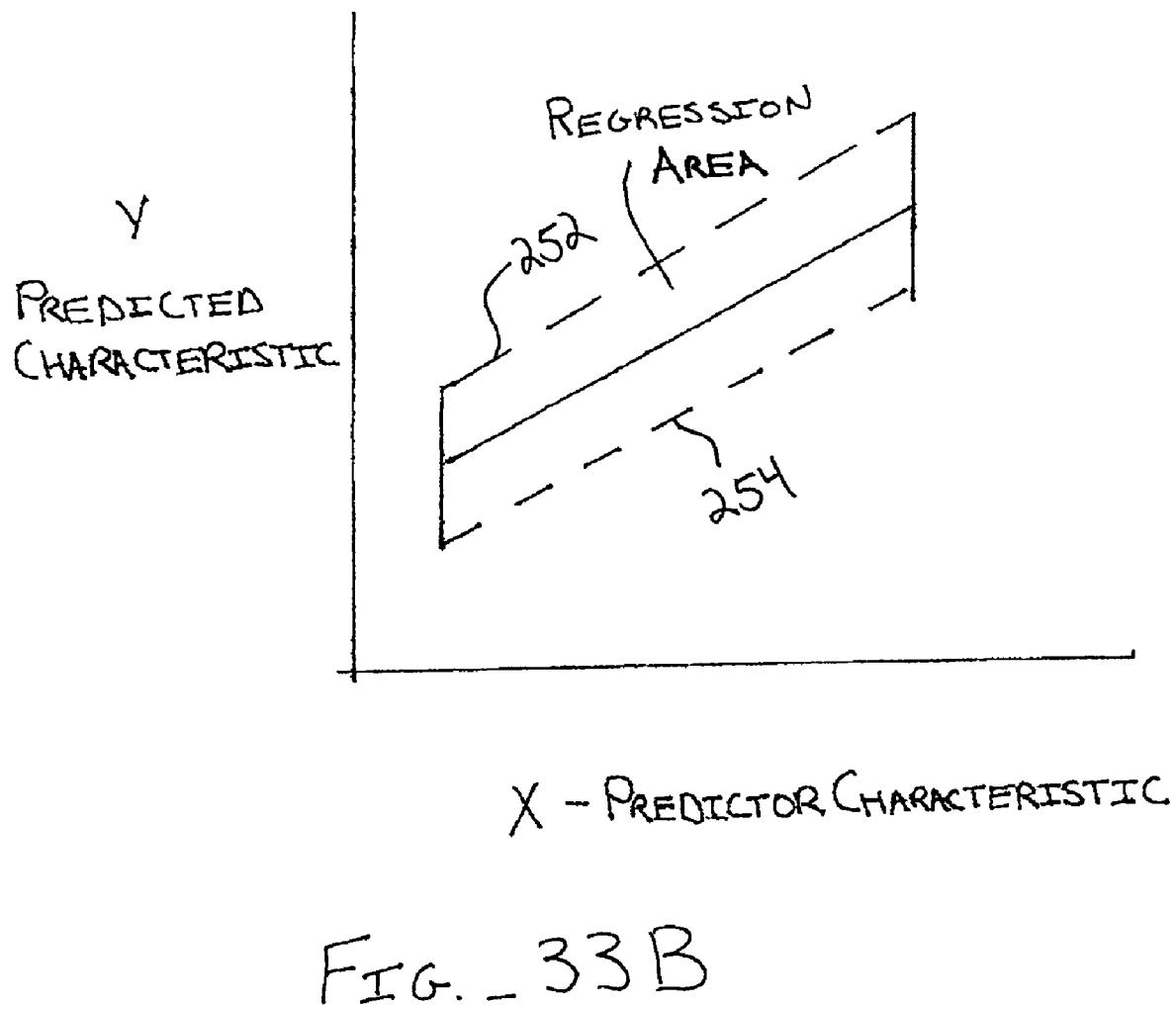
FIG._33B

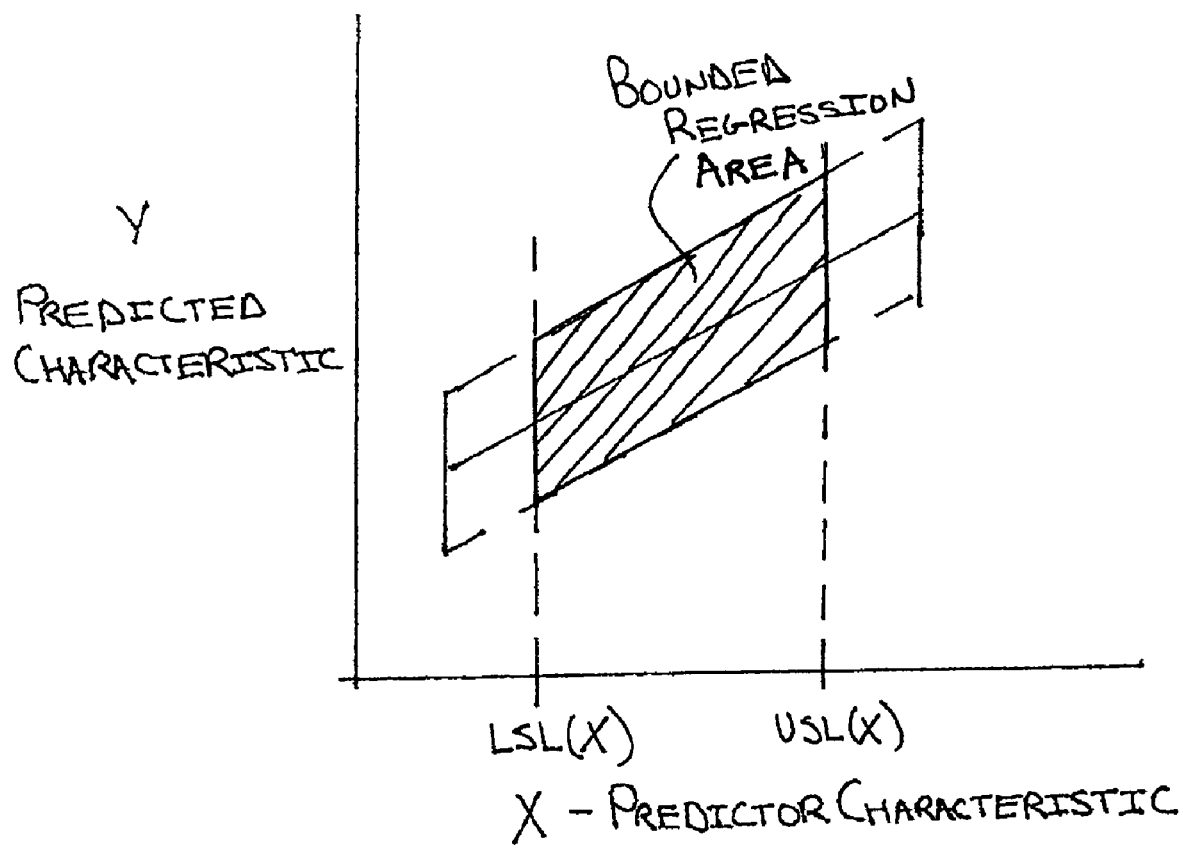
FIG. _ 33C

MANUFACTURING DESIGN AND PROCESS ANALYSIS SYSTEM

RELATED APPLICATION

The present application is a continuation application of U.S. patent application Ser. No. 10/357,690, filed Feb. 4, 2003, now U.S. Pat. No. 6,687,558, which is a continuation-in-part application of commonly-owned U.S. patent application Ser. No. 10/067,704 filed Feb. 4, 2002, now U.S. Pat. No. 7,072,808, entitled "Manufacturing Design and Process Analysis System," which is incorporated herein by reference for all purposes.

FIELD OF THE INVENTION

The present invention relates to manufacturing, design, tooling, and process engineering and, in one embodiment, to methods, apparatuses and systems facilitating the design, tooling, production and/or measurement tasks associated with manufacturing and other processes. In one embodiment, the present invention relates to decision-making and logic structures, implemented in a computer software application, that facilitate all phases of the design, development, tooling, pre-production, qualification, certification, and production process of any part or other article that is produced to specification.

BACKGROUND OF THE INVENTION

The world of manufacturing, including process engineering, has been under continuous and accelerating pressure to improve quality and reduce costs. This trend shows signs of further accelerating rather than decelerating. From a manufacturing perspective, quality refers to producing parts that 1.) are close to or at engineering design targets, and 2.) exhibit minimal variation. The realm of design engineering has also been under continuous pressure to improve quality and reduce costs. Design engineering must create nominal design targets and establish tolerance limits where it is possible for manufacturing to produce parts that are 1.) on target and 2.) that fall within the design tolerance limits. In-other-words, engineers are tasked not only with designing articles to meet form, fit and function, but with designing them for producibility.

In any manufacturing or other process that depends on the laws of engineering and physics to produce a useful result, there are five fundamental elements (see FIG. 1): 1) the process that makes the product (A); 2) Inputs into the process (B); 3) Output from the process (C); 4) Process control variables adjusted to influence the process output (D); and, 5) uncontrolled process variables that influence the process (E) (e.g., either uncontrollable variables or variables that are left uncontrolled because of time, cost or other considerations, collectively referred to as "noise.").

The traditional approach to producing articles, such as parts or other components, that meet design specifications is a logical one based on a search for causation. This approach is based on the principle that, control over the variables that influence a process yields control over the output of that process. In-other-words, if one can control the cause, then one can also control the effect. FIG. 2 illustrates this prior art principle, where an attempt is made to determine the relationships, linkages, or correlations between the control variables and the characteristics of the output (e.g., manufactured parts).

Unfortunately, many manufacturing processes act like a black box. It can be difficult in some of these cases to determine the relationship between the process control variables and the resulting article characteristic values. Furthermore, time and economic constraints can make such a determination impractical even when this might be technically possible.

Plastic injection molding is an example of this situation. With at least 22 control variables, even when these control settings have only two levels each (a high and a low temperature, a high and a low pressure, etc.), there are nevertheless over 4 million possible combinations. Indeed, there are billions of possible combinations when three levels (high, medium and low settings) are considered. Furthermore, changes to process variables may have varying effects on the resulting article characteristics; for example, increasing a pressure setting can increase a first article characteristic, decrease a second, and not affect a third. Simple interactions, complex interactions and non-linearities complicate the situation further. Further, there are usually multiple mold cavities in a single mold. Finally, there are numerous article characteristics (dimensional, performance, or other requirements) that must be met. In light of the preceding, it is often extremely difficult to establish the combination of factors from the large number of part design targets, part tolerance limits, mold design characteristics and injection molding press settings that produces acceptable articles.

Some progress has been made in this regard. Design of Experiments (DOE) methodology greatly reduces the number of experiments that must be conducted to understand the impact of a selected subset of control variables on the resulting output of a process. Unfortunately, even after performing a designed experiment, there are still a large number of control variables that can affect the resulting articles. In any event, extensive measurement of produced parts is still conducted by both the supplier and the OEM customer to ensure that acceptable articles are produced.

In addition, there are two main paths to achieving improved manufacturing quality. The first is to measure the parts after they are produced and then compare the parts to specification requirements (design targets and tolerances). This is an "on-line" process utilizing feedback. The parts are usually measured, to some extent, by both the producer and the customer (OEM, first tier manufacturer, second tier manufacturer, etc.). Measuring the parts, recording and analyzing the data, and reporting the results, however, is a very expensive and resource consuming process.

In their efforts to improve quality, many manufacturers have begun to use the techniques of Statistical Process Control (SPC) and Process Capability studies. Indeed, many customers require their suppliers to perform SPC or other equivalent measurement, recording, analysis and reporting procedures. According to this technique, samples are taken from the production line, measured and then analyzed to see if any abnormal (not normally distributed) patterns or data points emerge. If such abnormal data points are detected, the process is considered "out-of-control" (i.e., failing to yield a consistent predictable output) and production is immediately stopped to fix the process. The measurement data from manufactured parts is analyzed using sophisticated SPC statistical methods and charting tools embodied in specialized computer programs. Since most parts have many different dimensions, measurement and SPC analysis have usually been applied to a large number of part dimensions for each part, increasing the time and expense associated with production. However, SPC is far less expensive in the long run than shipping unacceptable parts and/or having to sort acceptable parts from unacceptable parts.

It has also been difficult for manufacturers (and their customers) to determine 1.) what percentage of the dimensions should be monitored using SPC and 2.) which dimensions should be measured if the full set of dimensions is not monitored. Usually, most, if not all, of the "critical" dimensions called out by the design engineer are measured and analyzed using SPC techniques. However, economic constraints can result in fewer than the desired number of dimensions being measured and analyzed. Guesswork is then frequently involved as to which dimensions to select for SPC or other analysis.

A second path to improving manufacturing quality is by reducing the natural variation in the manufactured articles. The accuracy of maintaining the process control factors can be improved and/or the "noise" factors can be eliminated or minimized. This is an "off-line" process improvement using feed-forward. Reducing natural variation is also an expensive proposition since many relatively small common causes of variation are present. The degree to which the natural variation in the parts produced must be reduced is usually determined through expensive process capability studies, usually conducted on each "critical" dimension.

In light of the foregoing, a need in the art exists for methods, apparatuses and systems facilitating design and manufacturing processes and, more particularly, addressing the problems discussed above. For example, a need in the art exists for methods and systems that allow for reductions in time and cost associated with the measurement, recording, analysis and reporting processes discussed above in connection with, for example, SPC studies, Process Capability studies, shipping inspection and receiving inspection. A need in the art exists for methods to determine how to adjust inputs to a process in order to achieve the desired outputs. A need in the art also exists for methods and systems facilitating a determination of how many article characteristics (e.g., dimensions, performance measures, etc.) should be measured for a given process. Lastly, a need in the art exists for methods and systems that enable an assessment of which article characteristics should be measured for a given process. As discussed in more detail below, embodiments of the present invention substantially fulfill these needs.

SUMMARY OF THE INVENTION

The present invention provides methods, apparatuses and systems that facilitate the design, production and/or measurement tasks associated with manufacturing and other processes. In one embodiment, the present invention relates to decision-making and logic structures, implemented in a computer software application, facilitating all phases of the design, development, tooling, pre-production, qualification, certification, and production process of any part or other article that is produced to specification. In one embodiment, the present invention provides knowledge of how the multiple characteristics of a given process output are related to each other, to specification limits and to pre-process inputs. This knowledge facilitates a reduction in measurement, analysis and reporting costs both prior to and during production. It also determines the changes needed to pre-process inputs in order to achieve production at design targets. It provides a prioritized order for relaxing design tolerances. It assesses the feasibility of producing parts that meet specification limits. It assesses the trade-off between performance and producibility and provides design targets that improve producibility. It provides a determination of when process variability needs reduction. It facilitates material comparison and selection. It provides process engineers and operators with improved operating guidelines.

The present invention uses analytical techniques to accomplish the preceding objectives and advantages. As discussed below, graphical techniques, in one embodiment, can optionally be used in place of analytical techniques. Graphical techniques, including but not limited to charts, graphs, and plots, can also be used to display analysis results. The present invention employs powerful statistical methodologies that, in one embodiment, allow for a determination of which and how many article characteristics should be measured, potentially reducing the cost and resource expenditure associated with measurement, recording, analysis and reporting. Embodiments of the present invention also assist design engineers in designing articles for producibility. Embodiments of the present invention can also be configured to provide critical information necessary for design engineers and tooling engineers to modify design requirements for process inputs in order to make it possible for manufacturing to hit design targets and stay within specification tolerance limits. Embodiments of the present invention can also be employed to identify, using a systems engineering approach, which article characteristics have the most restrictive targets and specification tolerance limits. Such information, for instance, allows for an evaluation of whether or not tolerances should be increased and, if so, which tolerances and on which article characteristic. The present invention can also be employed to reduce the cost of performing process capability studies by reducing, in some cases dramatically so, the number of process capability studies that must be conducted. These and other aspects of the present invention will be become apparent from the following description of preferred embodiments of the present invention.

In one embodiment, the present invention provides methods, apparatuses and systems that facilitate understanding and analysis of how the relationship between predicted article characteristics and one or more predictor article characteristics reflects the ability of a process to achieve a desired objective (e.g., the production of parts at target specification and/or within specification tolerances). In one embodiment, the present invention provides a process analysis system that generates a set of graphs and/or tables (such as Constraint Tables, Offset Tables and Relaxation Tables) that enable the user to understand and analyze the relationship among article characteristics to make powerful and informed decisions as to potential design or tooling, or pre-process dimensional or process changes. As discussed in more detail below, the relationship between the predictor characteristic and one or more given predicted article characteristics can be generally categorized into one of three possible situations: 1) where it is possible to produce an article outside of specification limits as to the predicted article characteristic; 2) where the predicted article characteristic is robust and will always be inside of specification limits; and 3) where the predicted article characteristic constrains the predictor article characteristic. In one embodiment, the present invention provides a methodology for analysis of the possible relationships between the predictor characteristic and the remaining article characteristics in order to determine, for example, which predicted article characteristics can be safely ignored, which predicted article characteristics will constrain the operating range or window relative to the predictor characteristic, and which predicted article characteristics could result in producing articles outside of design specification limits. With such a categorization of predicted article characteristics, users (such as design engineers, tooling engineers, process engineers, inspectors and the like) are then in position to make decisions as to how to treat each predicted article characteristic. For example, in the case where it is possible to produce defects, the user may decide to relax specification tolerances, and/or modify pre-process inputs, and/or constrain process variables. In addition, if a given predicted article characteristic is robust (within specification) for all possible values (at least within design specification limits) of the predictor article characteristic(s), the predicted article characteristic can be ignored, for example, during post-processing tasks such as part measurement and analysis associated with pre-qualification, qualification, certification and production activities. The present invention also facilitates analysis of the impact of predicted article characteristics that constrain the allowable range for the predictor article characteristic(s). As discussed in more detail below, the present invention allows a user to consider the impact of a constraining predicted article characteristic, and degree of constraint, on the producibility of the article as called out in a given design specification, and also allows for an assessment of the suitability of a given process to generate output that meets design specifications/requirements. As discussed in more detail below, embodiments of the present invention are operative to generate graphs, tables and charts, such as Scatter Charts, Constraint Tables, Offset Tables and Relaxation Tables, that support the analytical and decision-making tasks associated with manufacturing and other processes.

DESCRIPTION OF THE DRAWINGS

FIG. 1 is a process flow diagram generally applicable to manufacturing and other processes.

FIG. 2 is a process flow diagram illustrating a concept associated with application of prior art process control techniques to manufacturing processes.

FIG. 3 is a process flow diagram illustrating a concept associated with the present invention as applied to manufacturing processes.

FIG. 4 is a scatter chart setting forth a regression model between two article characteristics.

FIG. 5 is a scatter chart modeling the effect a change in process control settings has on process output.

FIG. 6 is a scatter chart illustrating the effect of changing process inputs.

FIG. 7 is a scatter chart illustrating the combined effect of changing process control settings and process inputs.

FIG. 8 is a scatter chart including prediction intervals associated with a regression model.

FIG. 9 provides a graphical user interface facilitating the input of article characteristic data used in connection with an embodiment of the present invention.

FIG. 10 is a scatter chart illustrating a simple linear regression model for two article characteristics.

FIG. 11 is a functional block diagram illustrating an embodiment of a computer hardware system suitable for use in connection with the present invention.

FIG. 12 is a scatter chart illustrating the concepts associated with an embodiment of the present invention.

FIG. 13 is a scatter chart including a linear regression model, prediction intervals, a target intersection, and upper and lower specification limits.

FIG. 19 is a spreadsheet table including a set of article characteristic values as to a plurality of article characteristics, correlation coefficients and a value indicating the predictive capability of each article characteristic.

FIG. 20 is a flow chart providing a method allowing for population of a correlation coefficient table.

FIG. 22 illustrates a Constraint Table according to an embodiment of the present invention.

FIG. 23 is a flow chart, according to one embodiment of the present invention, setting forth a method directed to the generation of a Constraint Table.

FIG. 24 is a chart illustrating the regression model for a predictor characteristic and a predicted characteristic including the boundary values associated with the regression model.

FIGS. 25A thru 25G are charts illustrating the regression models between a predictor characteristic and a predicted characteristic and illustrate various circumstances where a defect condition can exist.

FIGS. 26A and 26B are charts illustrating the regression models between a predictor characteristic and a predicted characteristic and illustrate various circumstances where the predicted characteristic is robust within the upper and lower specification limits of the predicted characteristic.

FIGS. 27A thru 27F are charts illustrating the regression models for various circumstances where either the upper, the lower, or both prediction boundaries constrain the minimum and/or maximum allowable predictor characteristic value in order to produce parts that are within specification limits.

FIG. 28A is a flow chart setting forth a method directed to the generation of an Offset Table according to one embodiment of the present invention.

FIG. 28B is an Offset Table according to one embodiment of the present invention.

FIG. 29 is a flow chart illustrating the overall process associated with generation of a Relaxation Table according to one embodiment of the, present invention.

FIG. 30 is a Relaxation Table generated by one embodiment of the present invention.

FIG. 31 is a flow chart illustrating a method directed to the determination of new specification limits resulting from the relaxation of one or both of the lower and upper specification limits of a predicted characteristic and, consequently, the associated minimum and/or maximum predictor characteristic values required to produce parts within specification limits.

FIGS. 32A, 32B, 32C and 32D are charts that graphically illustrate the increase in Pmax and the decrease in Pmin that result from relaxing the upper and lower specification limits for a predicted characteristic.

FIGS. 33A, 33B, 33C and 33D are charts that graphically illustrate the compliance area, the regression area, the bounded regression area, and a comparison of the compliance area to the bounded regression area.

DESCRIPTION OF PREFERRED EMBODIMENT(S)

I. Background and Operating Principles

A. Principles and Concepts

Figure 14:
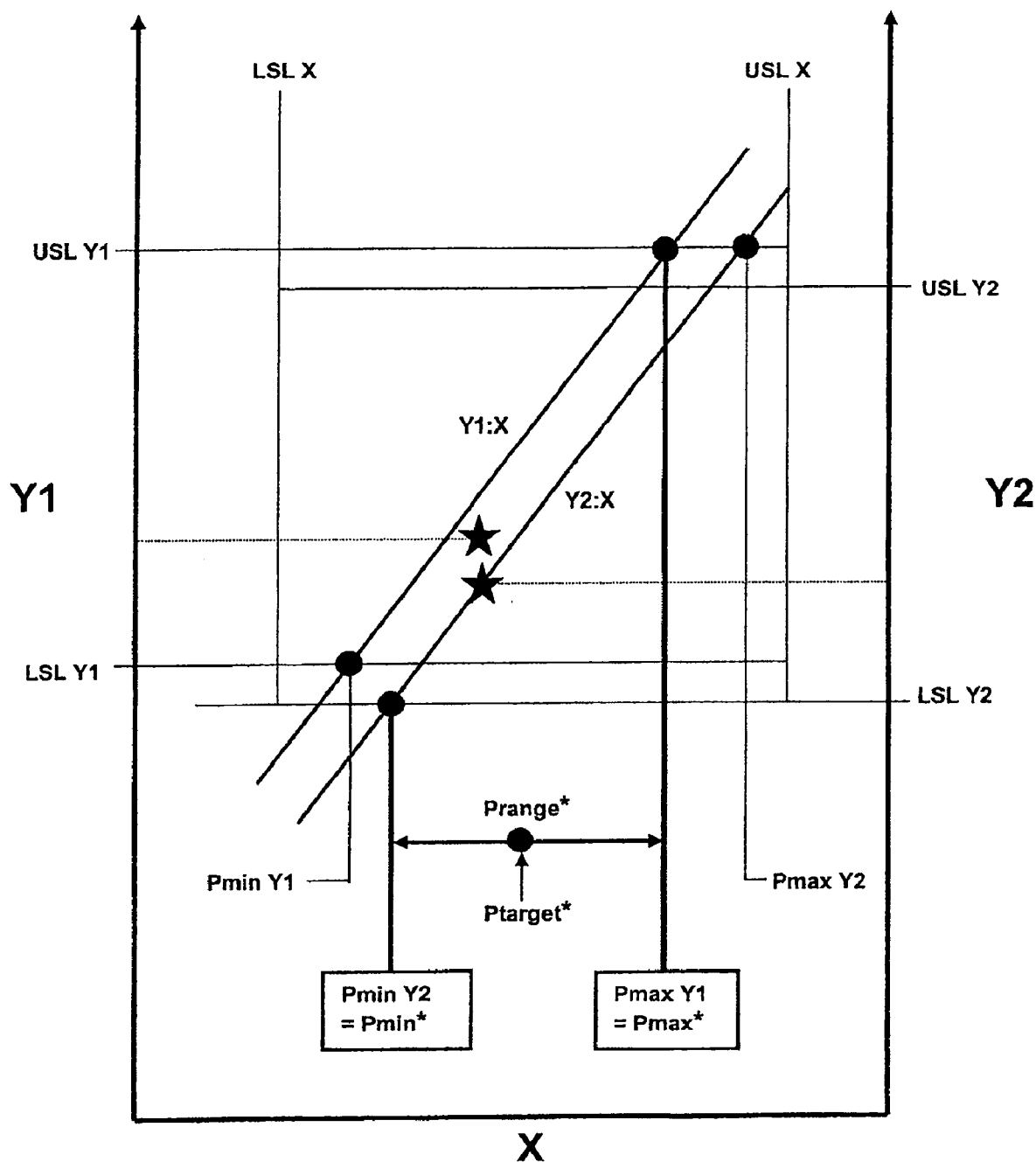
FIG. 14 is a scatter chart illustrating the determination of the allowable operating range and the operating target value for a predictor characteristic.

The present invention utilizes several graphical, statistical and mathematical techniques directed to analyzing the relationship between article characteristics to achieve a novel design and manufacturing process analysis system. Among these are scatter diagrams, correlation coefficients, coefficients of determination, linear, non-linear and multi-variate regression, prediction intervals, adjusted prediction intervals, prediction using regression, prediction using prediction intervals, DOE, averages and weighted averages. FIG. 3 is a process diagram illustrating how an aspect of the present invention differs from prior art techniques. In a wide variety of manufacturing processes, and injection molding in particular, there is often a strong relationship between article characteristics resulting from a given process. The present invention assesses the statistical strength of these relationships and, when they are sufficiently strong, capitalizes on their existence to facilitate a variety of design, production and measurement tasks associated with manufacturing processes.

In understanding the difference between the prior art exemplified in FIG. 2 and the present invention exemplified in FIG. 3, it should be noted that the primary focus of FIG. 3 is the relationship that exists between the part characteristics. In the field of injection molding, the different outputs (#1, #2, etc.) in FIG. 3 would typically refer to different part dimensions. In the present invention, the different part characteristics are not limited to dimensions, but could be any part attribute. In addition, the different part characteristics may in fact include the same dimension across different parts produced in a single cycle of a multi-cavity mold.

FIG. 4 graphically illustrates the relationship between two article characteristics as set forth on a scatter diagram. FIG. 4, in one form, illustrates the relationship between a predictor characteristic and predicted characteristic. As discussed below, the data points used to generate the regression model are typically generated using at least two different possible methods.

The first method consists of generating parts with no changes made to the process settings. This generally corresponds to a normal production run. All processes are subject to variation in control variables, environmental conditions, wear and tear, and many other factors. These influences on the process cause natural variation in the process output. The process output from this method is then measured. One problem with this method is that the process of measurement is like any other process in that the measurement process has its own source of variations which result in measurement error. If the size of the natural variation in the part characteristics is small relative to measurement error, then the measurement error will overwhelm the natural variation. In this instance, it is unlikely that any statistically significant correlations could be established between the part characteristics.

Injection molding processes typically have relatively small natural variations as compared to typical measurement error. Consequently, the first method of generating injection molded parts for evaluation of relationships can be unproductive. Consequently, the second method for generating parts is more applicable for injection molded parts. However, other processes may exhibit sufficient natural variation in order to use the above-identified method.

According to a second method, variation in part characteristics is induced. In the case of injection molding, variation is induced by deliberately changing process control settings. In this manner, the variation in part characteristic values becomes large relative to measurement error. Correlations, to the extent that they exist, then become apparent.

As previously mentioned, DOE is a method that assists in reducing an unmanageably large number of experimental conditions down to a manageable few experimental conditions. Since variation must be induced in the field of injection molding, there is utility in using DOE techniques to design an efficient experiment. Use of this method has further utility in that there are commercially available computer applications that efficiently analyze the data and report the results of the analysis. Thus, one beneficial by product of using DOE, is that useful information may be extracted from an experimental run. In particular, it is usually possible to identify at least one process control setting that can be used to significantly affect the part characteristics of resulting output. The information obtained from DOE has utility as it can be used to adjust a process control setting to achieve a desired change in the joint operating position of the part characteristic values along the regression model, as explained below.

There is a second advantage to inducing variation in an experimental run that is not connected with any efficiency measure associated with using DOE. This second advantage lies in the fact that the present invention, in one embodiment, identifies the process control settings that have the greatest impact or influence on the part characteristics. The present invention may also rely, in part, on the experience of the injection molding press operators and associated manufacturing and process personnel to select those "high impact" control settings. It should be noted that in injection molding, the usual paradigm is to minimize changes to the press settings. In contrast, the present invention seeks to maximize their impact for purposes of inducing part variation for further analysis. In-other-words, for the purpose of inducing variation, the present invention seeks out the "worst" control settings. The "worst" control settings from a production perspective become the "best" control settings from the perspective of inducing variation.

As previously noted, there are a large number, typically 22 or more, process control settings in the field of injection molding. The present invention, in one embodiment, incorporates "scientific" or "decoupled molding" principles to identify the high impact press controls. As with DOE, it is not necessary to use "scientific"/"decoupled molding" principles, but it potentially provides additional identification advantages. Thus, when several, typically 3–5, of the highest impact control settings are changed in the experimental run, the greatest amount of variation will be introduced into the part characteristics. This variation will be of two types. The first will be a translation of the joint operating position along the regression line. The second may induce scatter of the data points about the regression line. It is important to create a robust data set to yield, in turn, a robust regression model for prediction.

Finally, the use of DOE techniques provides additional information. Specifically, the use of DOE techniques to induce part variation further allows for an understanding of how the process control variables that were changed affect part characteristics and potentially how these control variables interact with each other.

As previously discussed, it is difficult to establish the relationship between injection molding control settings and part characteristics for several reasons including the large number of control variables, the potentially large number of part characteristics, simple interactions, complex interactions, non-linearities and other effects. One of the great utilities of this invention is that even though there may be many process control variables that influence a part characteristic, and those changes may influence any one part characteristic in a very complex manner, changes in these variables have a predictable effect on the relationship between the predictor characteristic and at least one remaining article characteristic. Accordingly, as discussed in more detail below, the systems and methods of the present invention allow design engineers and process operators to rely on the values of a predictor characteristic in order to determine whether one or more predicted characteristics complies with design specifications. In addition, the systems and methods of the present invention allow design engineers and process operators to focus on the predicted characteristic in efforts to adjust process output to comply with design specifications. These and other advantages will become apparent from the description provided below.

The regression model of FIG. 4 assumes a straight-line relationship between the two variables with all data points being on the straight line; however, a perfectly linear model is seldom achieved because perfect correlation is rare in the real world. FIG. 10 illustrates the scatter of data points on a scatter diagram. Although the data points exhibit scatter, they also indicate a strong trend or relationship. In other words, by knowing the value of one of the two variables, it is possible to predict the other variable with a relatively high degree of accuracy. As applied to the present invention, knowledge of the value of the predictor characteristic can yield reasonably accurate knowledge of the value of the predicted article characteristic. In practice, scatter among the data points is caused by a number of factors. These include variations caused by common cause noise, common cause fluctuations in control variables, common cause variations in the process inputs and common cause variations in the measurement system used to measure the part characteristics. FIG. 10 also illustrates two parameters that are typically used to define the regression model. These are the slope of the regression line and the Y-intercept; however, other parameters can be used. The embodiment shown in FIG. 10 also illustrates a linear regression model. The present invention, however, is not limited to the use of a linear model. A non-linear regression model, such as a multi-variate model can also be used in connection with the present invention.

FIG. 8 illustrates the addition of upper and lower prediction intervals to the regression model. The area bounded by the prediction intervals represents the feasible area of output of the process, as to the x-axis and y-axis characteristic, when natural variation and measurement error are included. In-other-words, all of the complexities of the process are "eliminated" since they show up as the bounded area of feasible output. The complexities that are "eliminated" include the aforementioned process control variable simple interactions, complex interactions, non-linearities, etc.

Analysis of process output in this manner provides a variety of useful information facilitating design and manufacturing processes. For example, FIG. 4, as well as others, also contains a representation of the intersection between the design target for the predictor characteristic and the predicted characteristic. Location of the target intersection provides a great amount of useful information to design engineers and process operators, as it illustrates that, for situation illustrated by FIG. 4, it is impossible to intersect the target intersection no matter how the process control settings are changed.

For didactic purposes, the description of preferred embodiments primarily details application of an embodiment of the present invention to injection molding processes. The present invention, however, has application to a variety of manufacturing processes, such as plating, semiconductor manufacturing, machining, and any other process where material is added, subtracted, or otherwise changed in form or structure. In addition, the present invention can be applied to aid the design of a manufactured article, the development of a process to manufacture the article, and/or the reduction of measurement costs. Moreover, the present application has application to a variety of articles, including stand-alone articles or items, as well as articles intended as components, elements or parts of a combination. Accordingly, the description of the preferred embodiments set forth herein refers to "articles" and "parts" interchangeably.

The present invention also has application in assessing the impact of sources of variation other than variation caused by changes in press control settings. Virtually any source of variation, if it causes sufficient variation in the part characteristic value, can be assessed. Selected examples could include determining the effect of setup-to-setup variation, determining the effect of press-to-press variation for injection molding, determining temporal effects such as the impact of seasonal effects and assessing the impact of different types of raw material or the impacting of purchasing either raw material or components from different suppliers.

In addition, embodiments of the present invention can be performed without the aid of a computing device, such as a personal computer, to perform various mathematical and statistical computations set forth herein. For a small number of article characteristics, it is entirely feasible to do all of the analysis and/or graphing by hand and/or with a spreadsheet. In a preferred embodiment, however, given the large amounts of data and computational requirements, various operations associated with the present invention are performed with a computing device configured to execute the operations described herein and display resulting data on a user interface display.

B. Exemplary System Architecture

Figure 15:
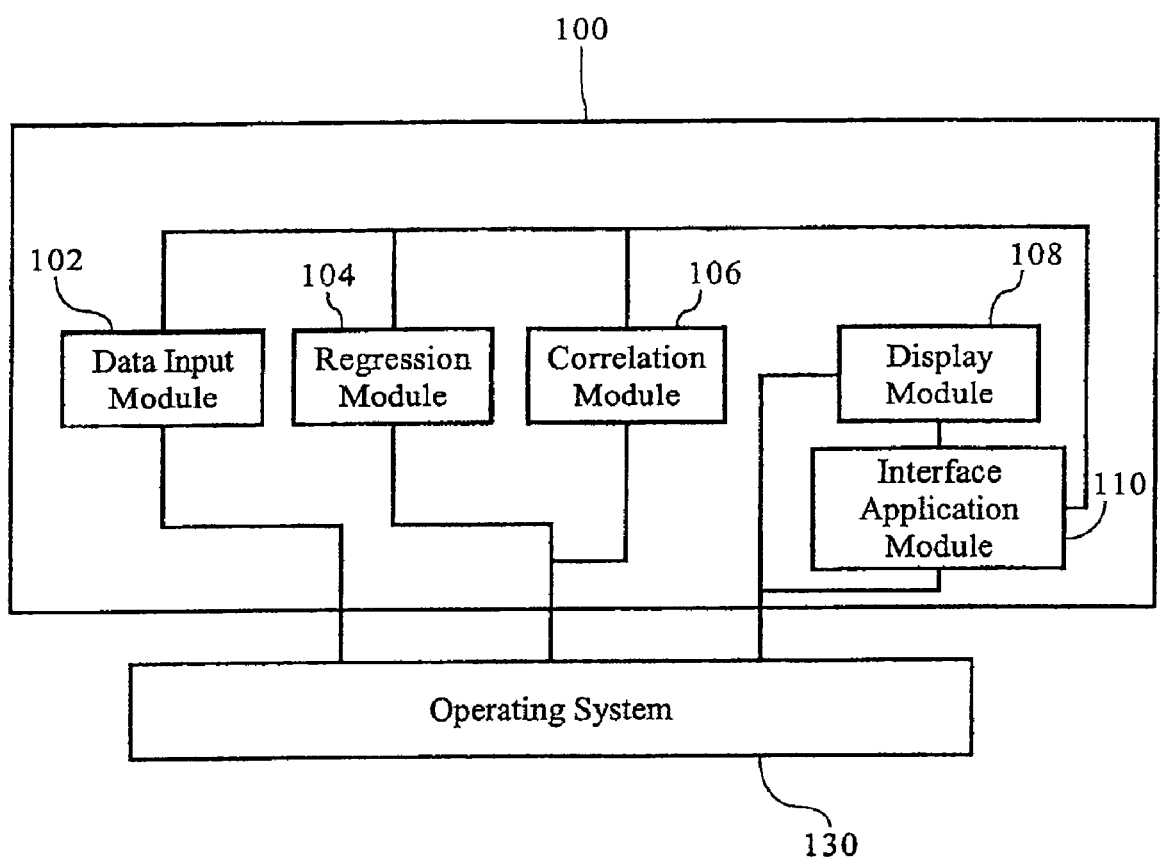
FIG. 15 illustrates a system architecture according to an embodiment of the present invention.

FIG. 15 is a simplified block diagram illustrating a system architecture according to one embodiment of the present invention. As FIG. 2 provides, a system architecture includes process analysis application 100 and operating system 130. Process analysis system 100 includes data input module 102, regression module 104, correlation module 106, display module 108, and interface application module 110. Data input module 102 is operative to receive article characteristic data, as well as format and store the data in a suitable format for operation by other modules associated with process analysis system 100. Regression module 104 is operative to compute a regression model given a set of inputs. Correlation module 106 is operative to perform operations relating to the correlations among article characteristics as more fully described below. Display module 108, in one embodiment, is operative to generate graphical displays of regression and/or correlation relationships for a given set of data, as well as other data elements as more fully described below. Interface application module 110 is operative to coordinate operation of the other modules associated with process analysis system 100 based on commands received from a user.

In one embodiment, the above-described system architecture operates in connection with computer hardware system 800 of FIG. 11. Operating system 130 manages and controls the operation of system 800, including the input and output of data to and from process analysis application 100, as well as other software applications (not shown). Operating system 130 provides an interface, such as a graphical user interface (GUI), between the user and the software applications being executed on the system. According to one embodiment of the present invention, operating system 130 is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

FIG. 11 illustrates one embodiment of a computer hardware system suitable for use with the present invention. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 800 perform their conventional functions known in the art. In particular, network/communication interface 824 is used to provide communication between system 800 and any of a wide range of conventional networks, such as an Ethernet, token ring, the Internet, etc. Mass storage 820 is used to provide permanent storage for the data and programming instructions to perform the above described functions implemented in the system controller, whereas system memory 814 is used to provide temporary storage for the data and programming instructions when executed by processor 802. I/O ports 826 are one or more serial and/or parallel communication ports used to provide communication between additional peripheral devices which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

In one embodiment, the elements of the present invention are implemented as a series of software routines run by hardware system 800 of FIG. 11. These software routines comprise a plurality or series of instructions to be executed by a processor in a hardware system, such as processor 802. Initially, the series of instructions are stored on a storage device, such as mass storage 820. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In one implementation, these software routines are written in the C++ programming language and stored in compiled form on mass storage device 820. However, these routines may be implemented in any of a wide variety of programming languages, including Visual Basic, Java, etc. In alternate embodiments, the present invention is implemented in discrete hardware or firmware. For example, an application specific integrated circuit (ASIC) could be programmed with the above described functions of the present invention.

II. Operation of Exemplary Embodiments

A. Generating a Set of Articles Having a Range of Variation as to a Plurality of Article Characteristics As described above, the present invention assesses the relationship between article characteristics associated with a set of articles having a range of variation as to the article characteristics. According to one embodiment of the present invention, a user generates a set of parts having a range of variation as to a plurality of article characteristics according to a given process. For example, a user may install an injection molding tool in an injection molding machine and produce a set of articles. The set of articles, or a sample thereof, are then measured or otherwise inspected or assessed as to the article characteristics of interest. The resulting set of data is then recorded (e.g., such as in an Excel spread sheet table) and used for subsequent analysis.

A variety of article characteristics can be measured and analyzed. For example, measured or otherwise determined article characteristics can include the dimensions of the article (e.g., length, height, width, circumference, overall diameter, etc. of the article or a given feature of the article), hardness, porosity, bowing, smoothness, void characteristics (whether voids exists and their number), color, strength, weight, and any other article characteristic, including performance characteristics such as the spray pattern of a nozzle or flow rate through a hydraulic restrictor.

As discussed above, the present invention can be applied to a set of articles where variation of the article characteristics occurs naturally or is induced by varying process control variables associated with the process that creates the article. When articles are produced with unchanged process control settings, there is typically little natural variation in the resulting article characteristics. This is particularly true for injection molded plastic parts. Measurement error may obscure or otherwise render unreliable the natural variation observed from a given set of articles. If it is not cost effective to use more precise measuring instruments, then variation should be induced in the parts by varying process settings. Accordingly, in a preferred embodiment, article variation is induced when measurement error is large compared to natural part variation.

A.1. Inducing Variation

Article variation can be induced by selecting and varying press settings based on the experience of the operator. That is, the operator can use his experience to determine which process settings to change in order to induce variation in the parts. To induce variation in a preferred form, the operator varies the process settings during the manufacturing process and allows the process to come to equilibrium between setting changes before selecting parts for measurement. In addition, the operator in a preferred embodiment of the method selects the set or subset of process settings that induce the greatest variability in the article characteristics of interest. In a preferred embodiment, the upper and lower limits for the process settings are chosen such that the process produces parts without harming the process equipment or tooling. Moreover, in a preferred form, the magnitude of the changes in process settings is chosen to induce variation across the full range between the article characteristic upper and lower specification limits for each of the article characteristics of interest.

As to injection molding processes, part variation, in one embodiment, may also be induced by selecting and varying process control settings using scientific/decoupled molding techniques. Scientific/decoupled molding techniques provide a method of reducing the large number of press settings down to three or four key variables. Furthermore, scientific/decoupled molding techniques can be used in conjunction with the experience of the mold press operator to determine which press settings should be varied. In a preferred embodiment, the set of articles produced comprises articles from an adequate number of repetitions at each set of process control variables.

In a preferred embodiment, Design of Experiments (DOE) methodology is employed to generate a set of articles having a range of variation. DOE can be used irrespective of whether the determination of which process settings to vary is made using operator experience, decoupled/scientific molding principles, or some combination thereof. DOE defines efficient experimental setups that allow the extraction of the maximum amount of information for a relatively small experimental effort. Once it has been determined which press settings to change, DOE defines efficient experimental setups that allow the extraction of the maximum amount of information for a relatively small experimental effort. This applies to both the design of the experiment (e.g., combinations of process settings, and the number of replications at each combination, etc.) and to the analysis of the data. A wide variety of known DOE techniques and available software tools can be used to design the experimental run that induces part variation.

As discussed in more detail below, the use of DOE to produce a set of articles for analysis provides "bonus" information that can be used, after analysis according to the present invention, to move a given article output closer to target and to reduce variation in the articles. For example, such information allows the operator to adjust press settings to accomplish the following during production: 1) move product output to target, and/or 2) minimize product variation, and/or 3) minimize cost, and/or 4) minimize press cycle time.

A.2. Receiving Article Characteristic Values

In one embodiment, the present invention is implemented by a computing device (such as a special-purpose or general purpose computer) configured to execute the functionality described herein. After a given set of articles is produced and article characteristics are measured, in a preferred form, a suitably configured computing device, executing data input module 102, receives the article characteristic values associated with the set of articles and stores them in memory.

FIG. 9 sets forth a graphical user interface provided by an embodiment of the present invention that allows a user to input a set of article characteristic values. As FIG. 9 illustrates, an embodiment of the present invention allows the user to open a data input database and manually provide the set of article characteristics into a table. One embodiment, however, allows the user to import article characteristic value data stored in various file formats, such as in an Excel® spread sheet table, or any other suitable file format. In one form, data input module 102 is further operative to validate the data set, such as checking for blank cells and other validation methods.

In addition, as discussed below, data input module 102 is operative to receive other data associated with operation of embodiments of the invention. For example, data input module 102 is operative to receive target values, as well as upper and lower specification limits, for all or a subset of article characteristics. In one embodiment, such data is used to provide users the ability to assess the relationship between process output and design specifications for a given set of process inputs.

B. Assessing Relationship between Article Characteristics

To allow for an assessment of the relationship between article characteristics associated with a set of articles, process analysis application 100, in one implementation, generates a set of scatter diagrams each based on a pair of article characteristics. See FIG. 10. The set of scatter diagrams can represent all possible combinations of article characteristics, or it can consist of a subset of all possible combinations.

In one embodiment, display module 108 generates graphical displays including scatter diagrams for presentation on display device 818 to allow the user to visually assess the degree of correlation between article characteristics. See FIG. 10. In one form, the graphical user interface presented on display device 818 allows the user to select, using keyboard and pointing device 822, a first article characteristic for the x-axis and successively view the scatter diagrams based on the first article characteristic and the remaining article characteristics on the y-axis. The user can use the information gleaned from this visual inspection to assess the capability of the first characteristic to be an adequate predictor of the remaining article characteristics (see below).

B.1. Determining Regression Models Between Article Characteristics

Process analysis system 100 also includes regression module 104 operative to determine the regression model between selected article characteristics. As discussed above, display module 108 is operative to generate a graphical display of regression models and present them on display device 818. See FIG. 10. As FIG. 10 shows, the regression model may be plotted and displayed with (or optionally without) the underlying data points. In a preferred embodiment, regression module 104 computes regression models using "least squares" curve fitting methods. However, other methods can also be used. Although the various figures show a linear regression model, the regression model can be a linear, a non-linear (higher order polynomial) model or multi-variate.

The display of the relationship between two article characteristics in this manner provides useful information to process operators, design engineers and others associated with the design and manufacture of the article. The slope (steepness) of the regression line can be used to determine the relative sensitivity of article characteristics to changes in process settings. In addition, the slope (steepness) of the regression line can be used to identify article characteristics that will be more restrictive on (more sensitive to) the allowable range of process settings when specification limits are considered (see below).

B.1.a. Locating the Target Intersection

As discussed above, the design of an article generally results in a target value, as well as upper and lower specification limits, for each article characteristic (or at least the critical article characteristics). In one form, process analysis system 100 is operative to determine the intersection of the target values for a pair of article characteristics relative to the corresponding regression model. FIG. 4 illustrates an exemplary regression model display including the target intersection located relative to the regression model associated with a first (predictor, see below) characteristic and a second article characteristic.

As FIG. 4 illustrates, location of a target intersection allows for a visual and/or analytical determination of the direction and magnitude that the regression line is offset from the target intersection for each article characteristic. Moreover, as the regression model essentially represents all possible combination of process settings (that is, without changing a process input, such as changing the dimensions of a mold cavity), the resulting diagram allows one to determine whether producing a part having a given pair of article characteristics at target value is achievable.

In addition, as FIGS. 5 and 6 illustrate, the information provided by FIG. 4 facilitates the process of changing an aspect of the process (e.g., process inputs or control settings) to shift output closer to design target. For example, as FIG. 5 illustrates, the operator can change the combination of process control settings to shift the joint operating position closer to a desired point along the regression model. In one embodiment of the present invention, the process control settings can be changed to optimize the joint operating positions of more than two part characteristics. In addition, by changing process inputs, the regression line can be shifted to a position closer to the target intersection or shifted to a position such that the regression line passes through the target intersection. See FIG. 6. In one embodiment of the present invention, the process inputs can be changed to optimize the position of more than one regression line. Lastly, as FIG. 7 provides, changes in both process control settings and process inputs can be used to shift the part characteristic values closer to the target intersection. In one embodiment of the present invention, changes in both process control settings and process inputs can be changed to optimize more than two part characteristic values.

In one embodiment, an Offset Table is created based on how far the regression line is located from (offset from) the target intersection for each article characteristic. The offset is presented in three formats: in the X-direction, the Y-direction and the direction perpendicular to the regression line.

B.1.b. Specification Limits

Process analysis system 100 is also configured to locate the upper and lower specification limits for the Y-axis article characteristic relative to the regression model between the Y-axis article characteristic and an X-axis article characteristic. See FIG. 12. This graphical representation allows the ability to determine whether any of the Y-axis article characteristics are robust against changes to process variables. In such cases, the regression line will generally have a small slope and/or not intersect either the upper or lower Y-axis specification limits.

In addition, process analysis system 100 is also operative to locate the upper and lower specification limits for the X-axis article characteristic relative to the regression model. This representation allows one to determine whether the regression line passes through the acceptable region bounded by the four specification limits. In other words, this representation allows for a determination as to whether it is even possible, given the current process and process inputs, to manufacture the parts within specification limits. In addition, locating the specification limits relative to the regression model allows for a determination of the maximum and minimum values (and, therefore, range) for the X-axis characteristic that will yield articles where the Y-axis characteristic is within specification limits. This range determination allows a manufacturer, for example, to determine if the part is in compliance with the specification limits for both the X- and Y-axis characteristics only by measuring the X-axis characteristic. To compute the minimum X-axis article characteristic, process analysis system 100 computes the value of the X-axis article characteristic at which the regression model intersects the lower specification limit for the Y-axis characteristic. Similarly, to compute the maximum X-axis article characteristic, process analysis system 100 computes the value of the X-axis characteristic at which the regression model intersects the upper specification limit for the Y-axis characteristic. In either case, the X-axis characteristic can be no larger than the upper specification limit for X and can also be no smaller than the lower specification limit for X.

B.1.c. Prediction Intervals

As FIG. 8 shows, process analysis system 100 may also add upper and lower prediction intervals to the regression model diagram to allow for a determination of the magnitude of the variability about the regression model. In one embodiment, regression module 104 is further operative to compute upper and lower prediction intervals based on a set of article characteristic value pairs using known statistical methods. As FIG. 8 illustrates, locating the prediction intervals also allows for an evaluation of the variability relative to the target intersection. For example, the target intersection may lie outside of the prediction intervals on either the high or low side. In this case, it is virtually impossible to ever hit the target intersection given the same process inputs. For example, assuming that FIG. 8 models the relationship between two article characteristics resulting from an injection molding process, locating the target intersection reveals that use of the mold, in its current state, will not obtain a part on target as to the two article characteristics. Further, when the target intersection lies within the prediction intervals, the percentage of parts where the article characteristic is greater than target and less than target can be determined through the use of known statistical techniques.

In addition, prediction intervals may also be used in the determination of minimum and maximum values for the X-axis characteristic (see Section II.B.1.b., supra). As FIG. 13 illustrates, to compute the minimum X-axis article characteristic, process analysis system 100 computes the value of the X-axis article characteristic at which the lower prediction interval intersects the specification limit for the Y-axis characteristic. Similarly, to compute the maximum X-axis article characteristic, process analysis system 100 computes the value of the X-axis characteristic at which the upper prediction interval intersects the upper specification limit for the Y-axis characteristic. In either case, the X-axis characteristic can be no smaller than its lower specification limit and no larger than its upper specification limit.

An embodiment of the present invention allows the user to determine the magnitude of the prediction intervals by inputting the percentage of area in the distribution that the user wants to have included in between the prediction intervals.

B.2. Predictor Characteristic

An embodiment of the present invention applies correlation and regression analysis to determine predictor characteristics in manufacturing processes. In one embodiment, a predictor characteristic is selected from the plurality of article characteristics associated with a part and used as the single X-axis characteristic. As discussed in more detail below, the predictor characteristic is chosen based on an assessment of the capability of a given article characteristic to be a predictor of other article characteristics. The selection of a predictor characteristic, therefore, reduces the number of article characteristic combinations that must be analyzed to a relatively small subset. For example, a part having 31 article characteristics would require analysis of over 900 relationships between article characteristics. The selection of a predictor characteristic reduces this to 30 combinations. In addition, the selection of a predictor characteristic can be used in a variety of ways to facilitate design, production, and measurement tasks associated with manufacturing. For example, a predictor characteristic can be used to greatly reduce the time and expense associated with measuring parts, as only the predictor characteristic needs to be measured during production to determine if all other article characteristics are within specification.

Figure 16:
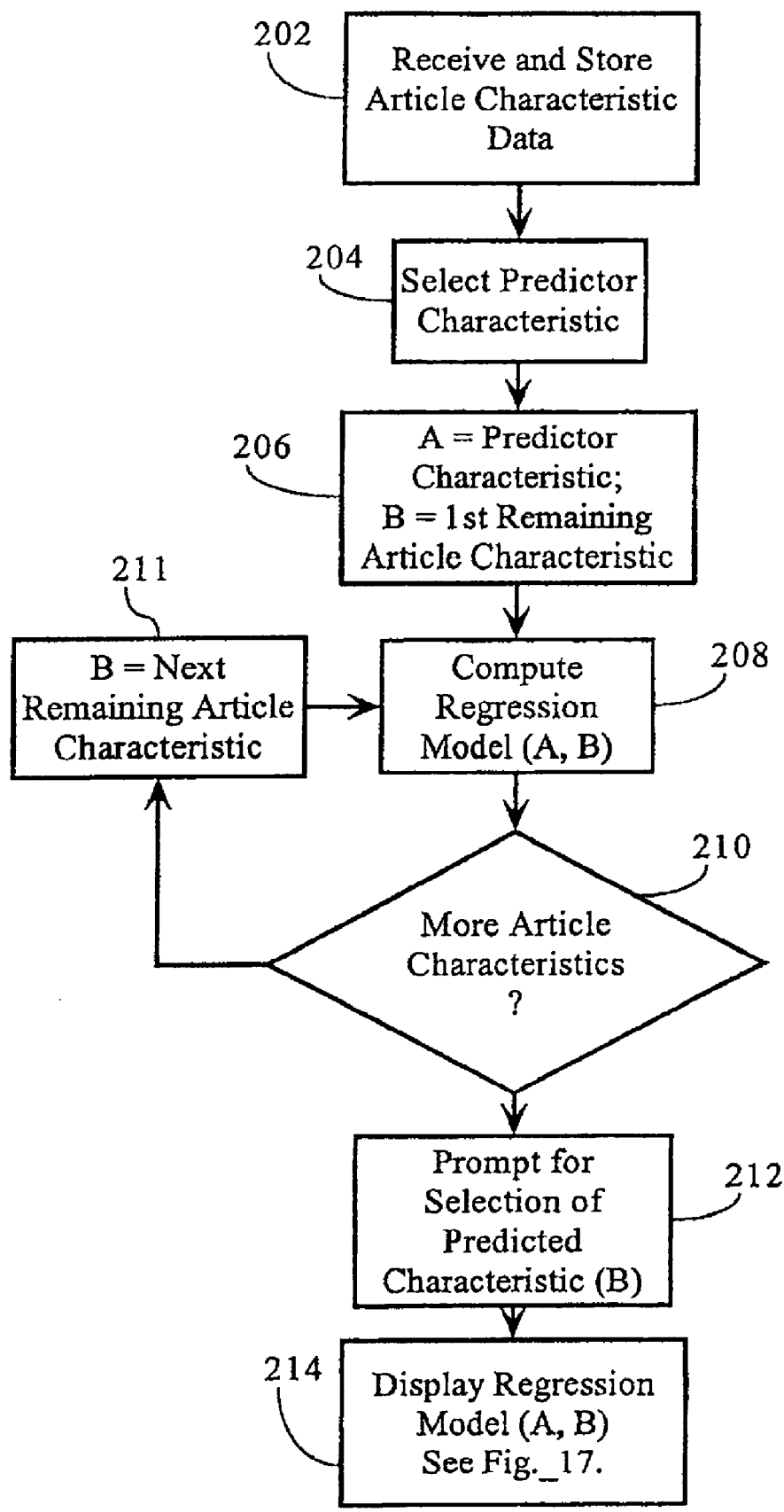
FIG. 16 is a flow chart providing a method according to an embodiment of the present invention.

FIG. 16 illustrates a method involving selection of a predictor characteristic according to an embodiment of the present invention. As discussed above, data input module 102 is operative to receive and store article characteristic data associated with a set of articles (e.g., article characteristic values and design targets/specification limits) (step 202). In one embodiment, correlation module 106, as discussed in more detail below, is operative to perform calculations (e.g., such as the determination of correlation coefficients between all combinations of article characteristics, computation of overall predictive capability of each article characteristic, etc.) to rank article characteristics according to their relative predictive capabilities. In one embodiment, display module 108 displays the ranked list of article characteristics and allows for selection of an article characteristic as the predictor characteristic (see step 204). As discussed below, a user may choose a predictor characteristic based on a number of considerations including relative predictive capability, feasibility/cost of measuring the article characteristic, etc. Still further, the selection of a predictor characteristic may be based on other methods (see below).

With a selected predictor characteristic, interface application module 110 directs regression module 104 to determine the regression model between the predictor characteristic (in one embodiment, as the x-axis characteristic) and all or a subset of the remaining article characteristics (see steps 206, 208, 210 and 211). When complete, the user is prompted to select a predicted article characteristic (step 212). Display module 108, in one embodiment, based on the equation defining the regression model, generates a graphical display of the regression model between the predictor characteristic and the selected predicted characteristic (step 214).

Figure 17:
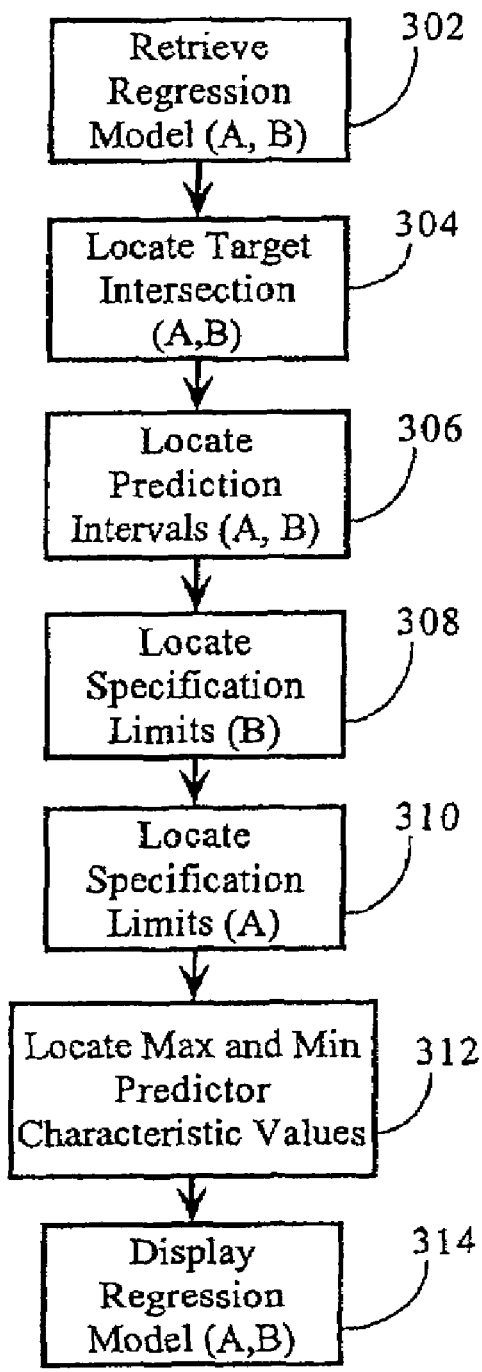
FIG. 17 is a flow chart illustrating a method associated with displaying a regression model and associated analysis elements to a user.

In addition to the regression model, display module 108 is further operative to add additional features to the graphical representation presented to users. FIG. 17 illustrates a method for generating a graphical representation illustrating the relationship between a predictor characteristic and a predicted characteristic with additional features discussed above. Display module 108 retrieves the regression model between the selected predicted characteristic and the predictor characteristic (step 302). As FIG. 17 provides, display module 108 may also locate the intersection of the target values associated with the predictor and predicted characteristics relative to the regression model (step 304) (see Section II.B.1.a., supra). Display module 108 may also locate the predictions intervals associated with the regression model on the display (step 306) (see Section II.B.1.c., supra). Still further, display module 108 may locate the upper and lower specification limits associated with the predicted characteristic (step 308), as well as the upper and lower specification limits associated with the predictor characteristic (step 310). See Section II.B.1.b., supra. Display module 108 may also graphically illustrate the minimum and maximum values for the predicted characteristic based on the specification limits and, optionally, prediction intervals (step 312). See Sections II.B.1.b. & II.B.1.c., supra.

A variety of interface displays are possible. For example, the equation defining the regression model may be displayed to the user. Moreover, the maximum and minimum predictor characteristic values may be displayed to the user, as well as any other data associated with the article characteristics and/or the relationship between them. In one embodiment, the graphical user interface presented on display device 818 allows the user to select which of the above graphical elements to display.

B.2.a. Selecting Predictor Characteristic

The predictor characteristic can be selected using either a heuristic or a statistically-based approach. Moreover, the selection of a predictor characteristic may be based on a visual assessment of the correlations between article characteristics or an analytically-based assessment.

B.2.a.1. Graphical Selection

In one embodiment, a user can use the scatter diagrams to visually assess the degree of correlation, amounting to a visual estimation of the correlation coefficient for each scatter diagram. The closer the boundary or perimeter around the data points approaches a straight line, the higher the correlation coefficient. The exception to this general rule is for situations where the regression line is horizontal, or nearly so. See Section II.B., supra. The user can assess the scatter diagrams of all possible combinations of article characteristics. However, in another embodiment, the number of scatter diagrams used could be greatly reduced by picking one article characteristic to act as the foundational variable. Using the foundational variable as the X-axis variable, a scatter diagram would be then created for each remaining article characteristic, which would be plotted on the Y-axis. Picking the "foundational" (equivalent to the predictor) article characteristic can be based on looking at the "scatter" of the data, or can be randomly picked. While a visual assessment may be practical if a small number of article characteristics are involved, larger numbers of article characteristics, resulting in combinations into the thousands, requires (at least for practical purposes) the use of a computing device to analytically select the predictor characteristic.

B.2.a.2. Analytical Selection of Predictor Characteristic

Figure 18:
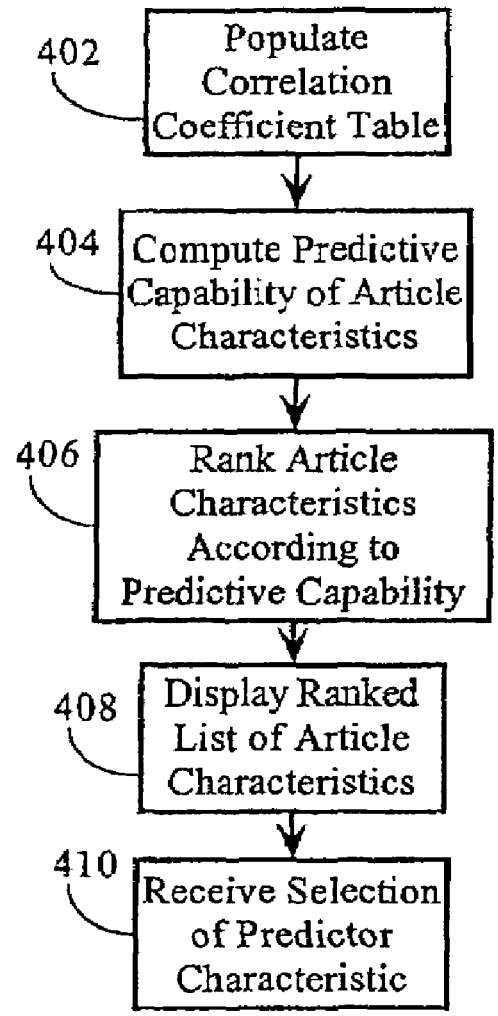
FIG. 18 is a flow chart setting forth a method allowing for selection of a predictor characteristic.

To facilitate selection of a predictor characteristic, in one embodiment, correlation module 108 calculates the correlation coefficients between all or a subset of the article characteristics; determines, based on the calculated correlation coefficients, a value indicating the predictive capability of a first article characteristic relative to all other article characteristics; and repeats this process for all or a subset of the article characteristics. FIG. 18 provides a method illustrating a process flow associated with selection of a predictor characteristic. As FIG. 18 shows, correlation module 106, as more fully described below, calculates the correlation coefficients between all or a selected subset of the article characteristics (based on a set of article characteristic values, see FIG. 19, Section A) and populates a correlation coefficient table (FIG. 19, Section B) (step 402). Correlation module 106 then computes a value indicating the relative predictive capability of each article characteristic (step 404). In one embodiment, this value is the average of the absolute values of the correlation coefficients for a given article characteristic (see FIG. 19, Section C). Of course, other methods for computing this value can be used, such as computing the average without absolute values, computing a weighted average, etc.

Correlation module 106 then ranks the article characteristics according to the values computed in step 404 (step 406). Display module 108 then displays the ranked list on display device 818 to allow the user to select a predictor characteristic based at least in part on the predictive capabilities of the article characteristics (step 408). According to one embodiment, the user makes his choice (step 410), causing interface application module 110 to direct regression module 104 to compute the regression models between the selected predictor characteristic and the remaining article (predicted) characteristics (see above).

The correlation coefficient table may be populated using any suitable process or technique. However, in a preferred embodiment, correlation module 106 executes the methodology described below.

B.2.a.3. Population of Correlation Coefficient Table

According to standard industry practice, the data for a single article characteristic (e.g., one dimension) is vertically arranged in a column. Thus, each column stores the data for one and only one article characteristic. The resulting measurement data array will, therefore, have as many columns as there are article characteristics. More often than not, the data is stored in an Excel spreadsheet, or other suitable file format.

With this convention, then, each column represents a different article characteristic. Each row represents the article characteristic data (multiple article characteristics) for a single part. In the case of injection molding, each row stores the data associated with a single press operating cycle. If the mold is a single-cavity mold, each row will contain measurement data for a single part. However, if the mold is a 4-cavity mold, each row stores the measurement data for all four parts produced during one machine cycle. Typically, the same article characteristics are measured for each part in a multi-cavity mold; however, there is no constraint that requires this.

In one embodiment, correlation module 106 includes functionality to determine the correlation coefficients (according to standard statistical methods) among all article characteristics, compute a value indicative of the predictive capability of each article characteristic, and rank the article characteristics according to their relative predictive capabilities.

FIG. 20 illustrates a method for populating the correlation coefficient table discussed above. As FIG. 20 shows, in one embodiment, correlation module 106 initializes a correlation coefficient table (step 502) and variables associated with the cell parameters of the table (A,B) (step 504) and the article characteristics (see steps 506 and 508). For didactic purposes, assume that correlation module 106 operates on the article characteristic values of FIG. 19, Section A. In one embodiment, correlation module 106 computes the correlation coefficient between the first article characteristic (X=1) and the second article characteristic (Y=2) based on the article characteristic values in the corresponding columns (step 510). Correlation module 106 then stores the computed correlation coefficient (in the example, 0.999232) in the upper left hand corner of the table (A=1, B=1) (step 512). Correlation module 106 then calculates the correlation coefficients between the first article coefficient (X=1) and the remaining coefficients (Y), increasing the row position (B) with each successive computation and store (see steps 514, 516 and 518).

After correlation module 106 reaches the last remaining article characteristic (step 514), it fetches the computed correlation coefficients in the first column (A=1), transposes the column into a row, shifts the row by one relative to the correlation coefficient table and stores the data in the appropriate cells of the table (step 518). Correlation module 106 then increments the cell column position (A=2) and the article characteristic identifiers (X=2) (step 522), (Y=3) (step 508) and sets the cell row position equal to the column position (B=2) (step 524). Correlation module 106 then computes the correlation coefficient between the second article characteristic (X=2) and the third article characteristic (Y=3; step 508) (step 510) and stores it in the appropriate cell (A=2, B=2) (step 512). Correlation module 106 repeats this process until the correlation coefficient between the second-to-last article characteristic value and the last article characteristic value has been computed and stored (see step 520). As FIG. 19 illustrates, the resulting columns of correlation coefficients, each column corresponding to an article characteristic, allows for relative easy computation of a value (e.g., an average) indicating the predictive capabilities of the article characteristics (see FIG. 19, section C).

As is apparent from the above-provided description, the process for populating the correlation coefficient table achieves a 50% reduction in the number of correlation coefficients that must be computed, because for every XY correlation, there is a corresponding YX correlation. It is also apparent that the compact notation of the correlation coefficient table greatly facilitates programming the subroutine that populates the table. If the computations were to be done with only two correlations in each row (XY and YX), there would be over 600 rows for 50 part characteristics.

The preceding method for populating the correlation coefficient table is one embodiment of the table population/compression algorithm. As previously mentioned, to maintain the usual and customary convention consistent with industry standards, the data for a single article characteristic is vertically arranged in a column. The methods described herein would function equally well if the data for a single article characteristic was horizontally arranged in a row and the algorithm was adapted for that data structure. For that case, the average correlation coefficient would be computed by taking the average of a row of correlation coefficients rather than a column.

B.2.a.4. Alternative Embodiment

In one embodiment, a user may use the functionality discussed above to complete the selection of a predictor characteristic and view the scatter diagrams with the predictor characteristic as the x-axis variable and including specification limits, and optionally prediction intervals. Based on such scatter diagrams, the user may select the predicted characteristics that are robust (insensitive to changes in process settings) and eliminate such article characteristics from the data set to eliminate "noise." This selection can also be accomplished analytically based on the slope and Y-intercept of the regression model, the location and slope of the prediction intervals and the value of the upper and lower specification limits for both the x-axis and y-axis variables. In one form, such article characteristics have prediction intervals that do not intersect the predicted article characteristic specification limits. In this context, they constitute "noise" in selection of a predictor characteristic. The user then re-runs the selection of the best predictor based on the revised (reduced) data set.

B.2.b. Minimum and Maximum Values for Predictor Characteristic

To facilitate understanding of an embodiment of the present invention, it is useful to consider a simple situation where there are only two article characteristics of interest. One of the article characteristics is selected as the predictor characteristic using methods described above. The regression model establishes the relationship between the predictor characteristic and the remaining article or predicted characteristic. This situation is illustrated in FIG. 12. The intersection of the regression model with the upper and lower specification limits of the predicted characteristic (Y) determine the values of the predictor characteristic (X) above which the predicted characteristic does not meet specification. See Section II.B.1.b., supra. The intersection between the regression model and the upper specification limit for Y is defined as P-max. See FIG. 12. The intersection between the regression model and the lower specification limit for Y is defined as P-min. It can readily be seen that as long as the predictor characteristic (X) is between the values of P-min and P-max, then the predicted characteristic must be within specification limits. For this regression model, where there is perfect correlation between the predictor characteristic and the predicted characteristic, it can definitively be said that if the predictor characteristic is greater than P-max or less than P-min, then the predicted characteristic will be outside its specification limits. Another way of expressing this is to define the distance between P-min and P-max as P-range. It can then be said that as long as the predictor characteristic is within P-range, then the predicted characteristic will be within specification.

Because the regression model seldom has a perfect degree of correlation, there is uncertainty in using one part characteristic to predict the other. The prediction intervals associated with the regression model place limits on the uncertainty associated with predicting one part characteristic given a value for the other part characteristic. FIG. 13 illustrates use of the prediction intervals associated with the regression model to remove the effect of such uncertainties. As FIG. 13 shows, two lines are shown located in the vicinity of and approximately parallel to the regression line. These lines are the upper and lower prediction intervals that more or less bound the data points around the regression line. For didactic purposes, the upper and lower prediction intervals are shown as being straight lines; in practice, however, they are generally curvilinear. As FIG. 13 provides, because of the scatter of the data points, the maximum allowable range for the predictor characteristic is more restricted. Specifically, the predictor characteristic can be no larger than the value associated with the intersection of the upper prediction interval and the upper specification limit for the predicted characteristic, or the upper specification limit for the predictor characteristic (whichever is smaller). In a similar fashion, the predictor characteristic can be no smaller than the value associated with the intersection of the lower prediction interval and the lower specification limit for the predicted characteristic, or the lower specification limit for the predictor characteristic (whichever is larger). In other words, P-max is the more constraining (smaller) of the upper specification limit for the predictor characteristic and the intersection of the upper prediction interval with the upper specification limit for the predicted characteristic. Similarly, P-min is the more constraining (larger) of the lower specification limit for the predictor characteristic or the intersection of the lower prediction interval with the lower specification limit for the predicted characteristic. As long as the predictor characteristic is between P-min and P-max, the predicted characteristic will be within its specification limits. In one embodiment, it can be a matter of judgment as to how "wide" the prediction intervals should be. In one embodiment, process analysis application 100 uses typical "width" parameters as a default setting. However, the user will have the option of overriding these default settings.

B.2.c. Constraint Table for Predictor Characteristic

As discussed above, the foregoing discussion in section II.B.2.b., supra, involved a simplified situation involving only two article characteristics. In actual practice, a given part often has a large number of article characteristics of interest. In one embodiment, process analysis system 100 is further operative to create a Constraint Table. The Constraint Table contains, for each predicted article characteristic, the minimum (P-min) and maximum (P-max) values for the predictor characteristic as determined above (see Sections II.B.1.b. & c., II.B.2.b., supra).

From the Constraint Table (see FIG. 22), the most constraining minimum (P-min*) and maximum (P-max*) values can be determined for the predictor characteristic. See FIG. 14. That is, the most constraining minimum value (P-min*) is the largest minimum value (P-min) in the Constraint Table, while the most constraining maximum value (P-max*) is the smallest maximum value (P-max) in the Constraint Table. FIG. 22 illustrates a Constraint Table according to an embodiment of the present invention, where "none" means that the upper or lower specification limit for the predictor characteristic is the most constraining value as to the corresponding article characteristic. Accordingly, with an identification of these most constraining minimum (P-min*) and maximum values (P-max*), a manufacturer can be confident that as long as the predictor characteristic lies between them, the remaining predicted characteristics will be within specification limits.

As described more fully below, process analysis system 100, in one embodiment, is operative, for each predicted article characteristic, to 1) determine whether the potential for defects exists; 2) determine whether the predicted article characteristic is robust; and, 3) if neither relationship 1) nor 2) is present, determine the maximum and minimum allowable values (Pmax and Pmin, respectively) for the predicted characteristic. In graphical and in various computational terms, process analysis system 100 locates, relative to the regression model (and the area it defines) between the predictor characteristic and the predicted article characteristic, a compliance area consisting of the area bounded by the upper and lower specification limits for both the predicted article characteristic and for the predictor characteristic (see FIG. 33A). Process analysis system 100 then identifies a bounded regression area, which is the area bounded by the upper and lower prediction boundaries of the regression model and the upper and lower specification limits for the predictor characteristic. As FIG. 33B illustrates, the regression area is the region bounded by the regression model, including the prediction intervals 252 and 254, between the predictor characteristic and a predicted characteristic. FIG. 33C illustrates, a bounded regression area, as defined above, bounded by the lower (LSL(X)) and upper (USL(X)) specification limits of the predictor characteristic.

Figure 33D:
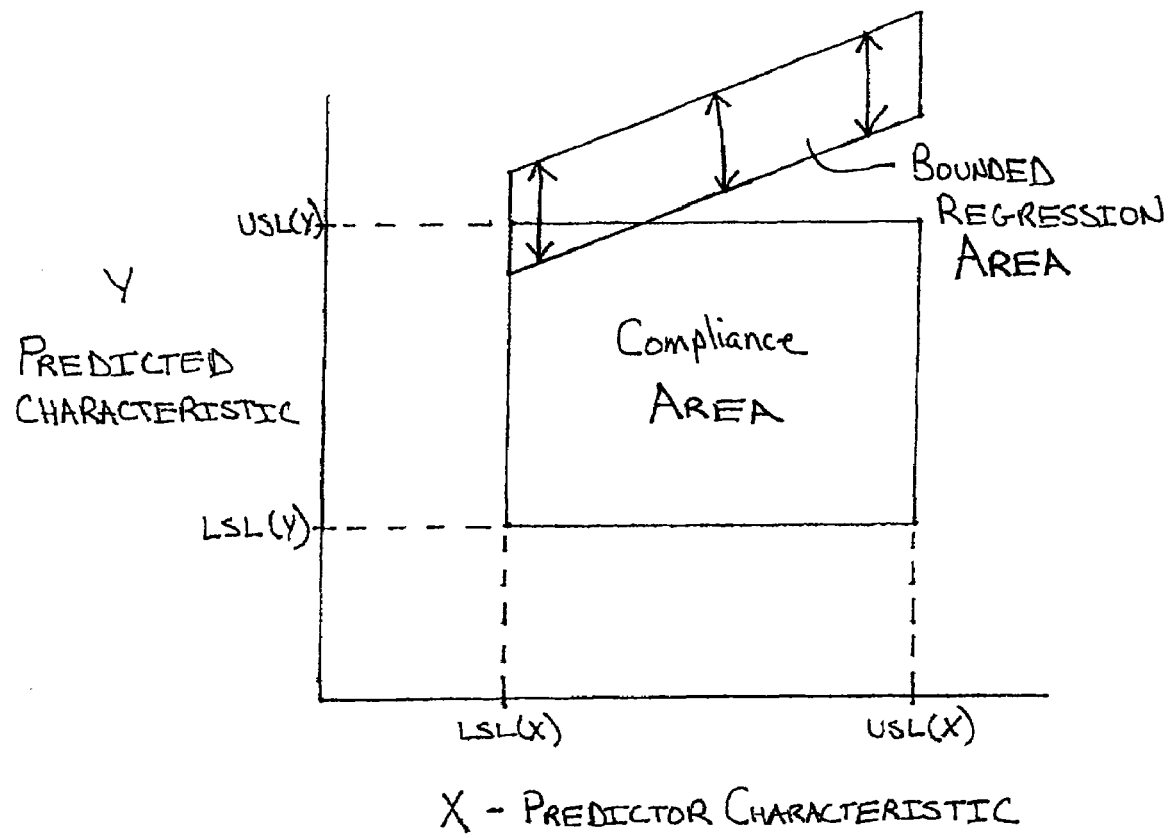

Process analysis system 100 then compares the bounded regression area to the compliance area to assess the relationship between the two areas. If the bounded regression area lies completely within the compliance region, the predicted article characteristic is robust. As to this relationship, process analysis system 100 sets the minimum and maximum predictor characteristic values associated with the first remaining article characteristic to the lower and upper specification limits, respectively, of the predictor characteristic. If any portion of the bounded regression area extends above and/or below the compliance area over the specification limit range of the predictor characteristic, a defect potential exists, causing process analysis system 100, in one embodiment, to report a defect condition. FIG. 33D illustrates a circumstance where a defect potential exists. Furthermore, if any horizontal segment of the bounded regression area extends completely within the compliance area and any second horizontal segment extends partially or completely outside of the compliance area, the predicted and predictor characteristic have a constraining relationship. In the constraining relationship, process analysis system 100 computes the minimum and maximum predictor characteristic values for the predicted characteristic.

Furthermore, one skilled in the art will recognize that 1) one of the three possible relationships (robust, defect, and constraining) discussed above must exist, 2) the three possible relationships discussed above are mutually exclusive, and 3) if two conditions are known not to exist, the third condition must exist. Accordingly, when one of the possible relationships is identified as existing, process analysis system 100 need not test for the existence of the other relationships. In addition, process analysis system 100 can test for these relationships in any desired order.

As one skilled in the art will recognize, the are many ways to test for the relationships discussed above. For example, process analysis system 100 reports a defect potential as to the predicted article characteristic, if all vertical cross-sections of the bounded regression area are fully or partially outside the compliance area. A predicted article characteristic can also be determined to be robust, if all vertical cross sections of the bounded regression area lie completely within the compliance area. Lastly, the predicted characteristic constrains the predictor characteristic when at least one vertical cross-section of the bounded regression area is fully inside the compliance area and at least one vertical cross-section of the bounded regression area is fully or partially outside the compliance area.

Process analysis system 100 can also determine whether the upper and lower prediction boundaries intersect the compliance area using known computational methods. For example, if the upper and lower boundaries of the bounded regression area lie within the compliance area, the predicted article characteristic is robust as to the predictor characteristic. If either or both of the upper and lower boundaries of the bounded regression area do not intersect the compliance area, then a defect potential exists. If the upper boundary of the bounded regression area intersects the upper boundary of the compliance area and the lower boundary of the bounded regression area lies within the compliance area, a constraining relationship exists. Lastly, if the lower boundary of the bounded regression area intersects the lower boundary of the compliance area and the upper boundary of the bounded regression area lies within the compliance area, a constraining relationship exists.

Figure 25F:
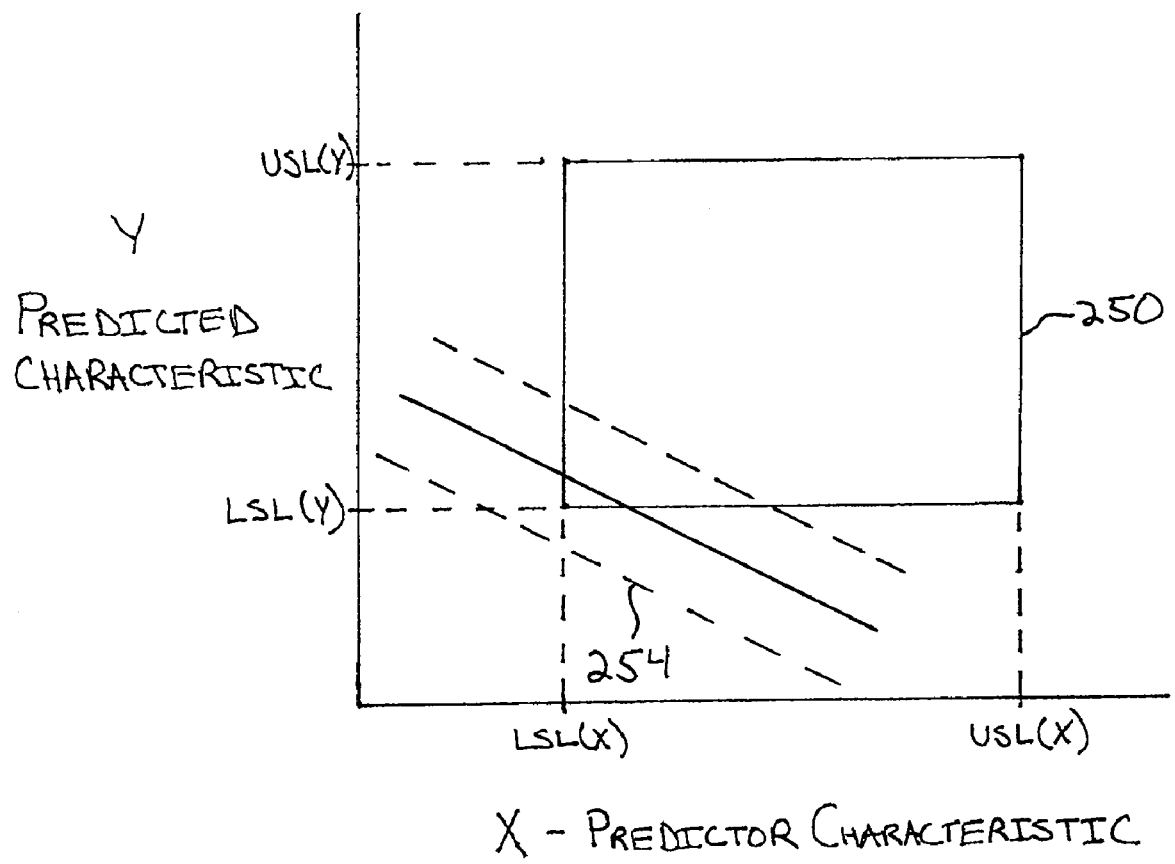
Figure 25G:
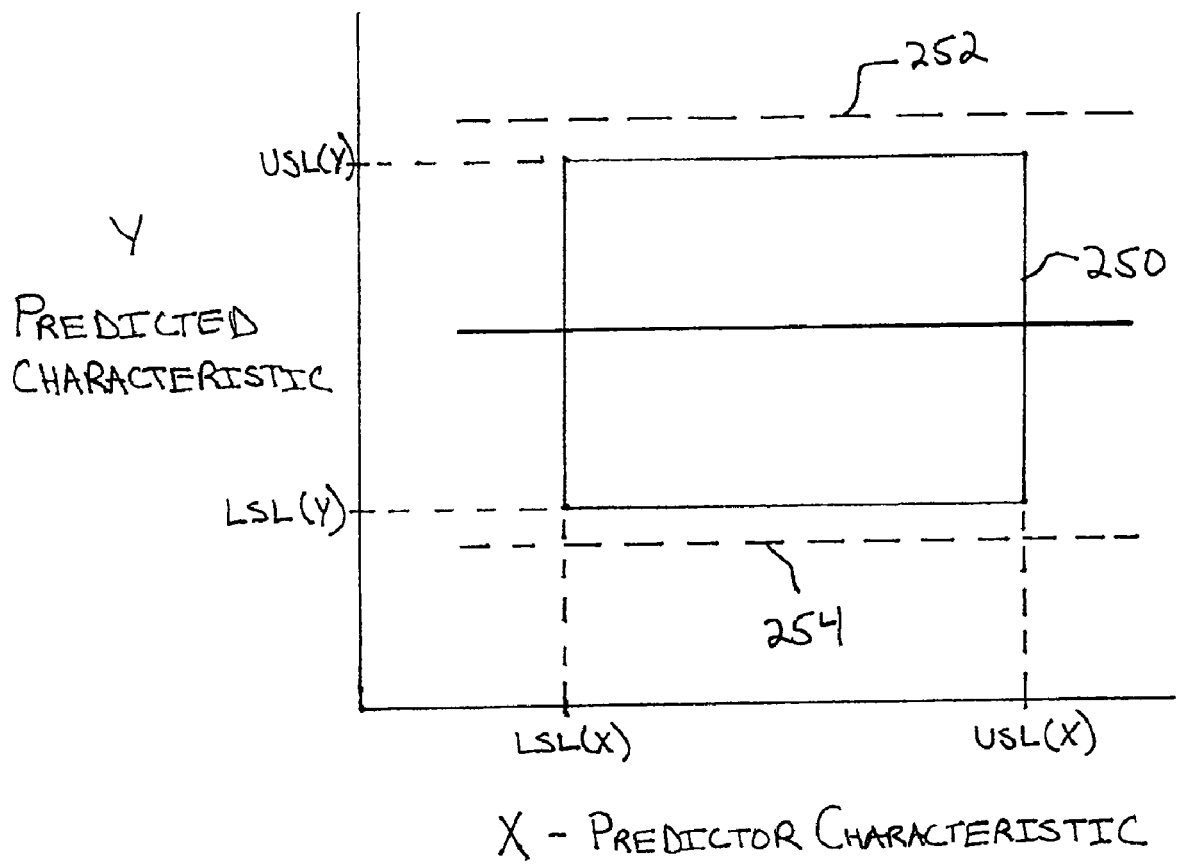

In another embodiment, process analysis system 100 can test to determine the values of the upper and lower prediction boundary values at the upper and lower specification limits of the predictor characteristic and determine whether these values (coordinates) lie within the compliance area. The following provides illustrative examples for didactic purposes. FIG. 23 is a flow chart illustrating a method for generating a Constraint Table according to one embodiment of the present invention. In one embodiment, many variables and other inputs used in computing the constraint table are taken from the output of other analytical processes. For example, a correlation package and other procedures compute the regression model and input the slope, intercept and boundary interval offsets of the regression model, in one embodiment, into an array, such as a spread sheet file. The slope, intercept and boundary interval offsets as well as other previously computed values, are used by process analysis system 100 to compute Pmin and Pmax and populate the Constraint Table. As FIG. 23 illustrates, process analysis system 100, starting with the first predicted characteristic (see step 702), computes the upper and lower prediction interval (boundary) values for the predicted characteristic at the upper (USL) and lower (LSL) specification limits of the predictor characteristic (step 704). For didactic purposes, FIG. 24 illustrates the left upper boundary value 241, the right upper boundary value 242, the left lower boundary value 243 and the right lower boundary value 244. In one embodiment, a method calculates the boundary values at the upper and lower specification limits of the predictor characteristic based on the regression model, including the upper and lower prediction intervals, between the predictor characteristic and the predicted characteristic. Process analysis system 100 then determines whether these boundary values (see FIG. 24) are within the four corners of the compliance area 250 defined by the upper and lower specification limits of the predictor and predicted characteristics. In one embodiment, a method or function is called to determine whether the boundary values computed above exceed the four corners of the compliance area 250. In one embodiment, this method returns four Boolean values corresponding to the respective corners of the compliance area 250 and indicate whether the boundary values are within their respective corners. Process analysis system 100, in one embodiment, uses these Boolean values to determine whether the potential for defects exist (step 706). FIGS. 25A–G graphically illustrate potential defect conditions between the predictor characteristic and a predicted characteristic (i.e., the potential that the predicted characteristic will exceed a specification limit within the specification limits of the predictor characteristic). FIGS. 25A–G all include a compliance area 250 defined by the upper (USL) and lower (LSL) specification limits of the predictor and predicted characteristic. As FIGS. 25A–C illustrate, a defect may result from the upper prediction interval 252 failing to fall within the region bounded by the compliance area 250. FIGS. 25D–F provide examples of where the lower prediction interval 254 associated with the regression model between the predictor and predicted characteristic does not fall within the compliance area 250. Lastly, FIG. 25G illustrates the circumstance where neither the upper prediction interval 252 nor the lower prediction interval intersects the compliance area 250. In one embodiment, process analysis system evaluates the Boolean values discussed above to determine whether a defect condition exists. In one embodiment, if the two top corners, the two bottom corners, or all four corners are exceeded, a potential for defects exists. However, if only one corner of each pair is exceeded, there will be a constraining relation (see below).

Figure 26A:
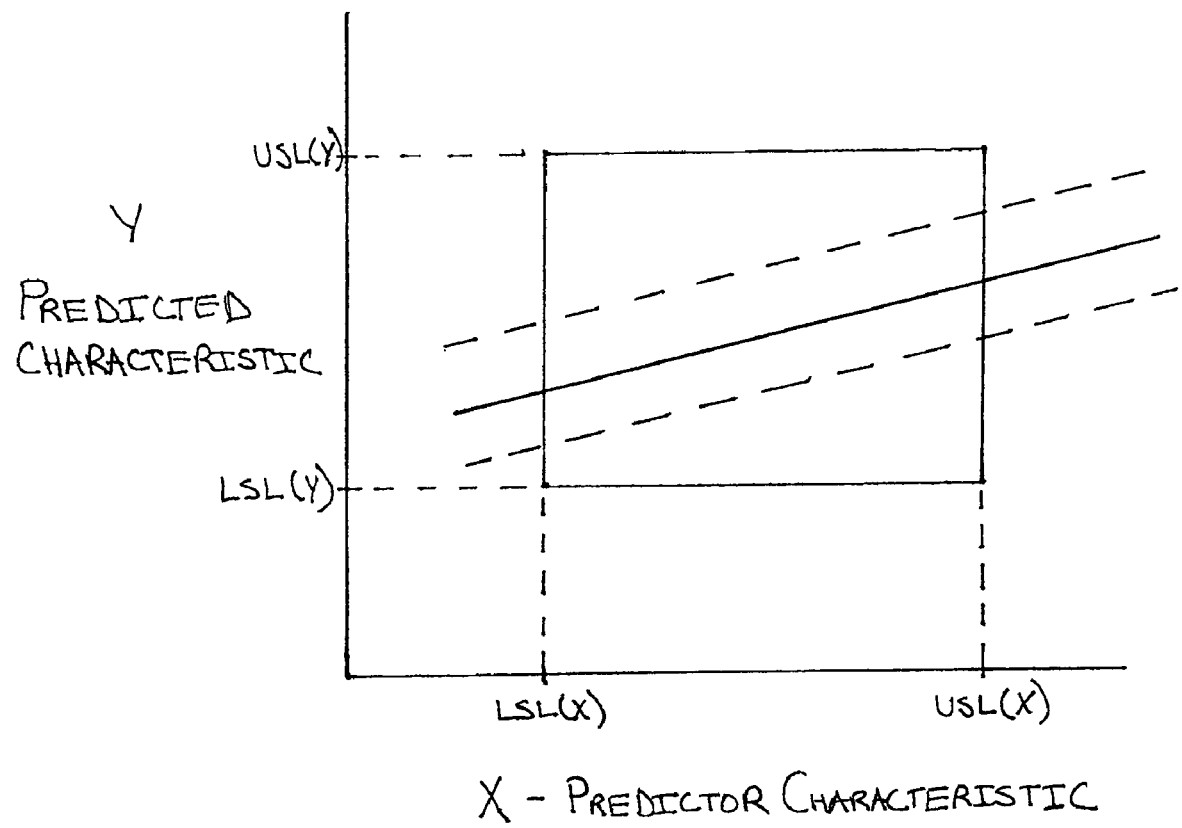

If a defect potential exists, process analysis system 100 reports, in one embodiment, the defect potential by setting Pmin and Pmax to "DEFECT" as to the instant predicted characteristic (step 708). If no defect condition is detected, process analysis system 100 then determines, in one embodiment, whether the predicted characteristic is robust at least within the specification limit box 250 (step 710). In one embodiment, a separate method or function tests for such robustness by determining whether the boundary values discussed above lie within the specification limits of the predicted characteristic. In addition, FIGS. 26A and 26B graphically illustrate circumstances where the predicted characteristic is robust relative to the predictor characteristic. If the predicted characteristic is robust, process analysis system 100 sets Pmin to the lower specification limit of the predictor characteristic and Pmax to the upper specification limit of the predictor characteristic (step 712).

Figure 27C:
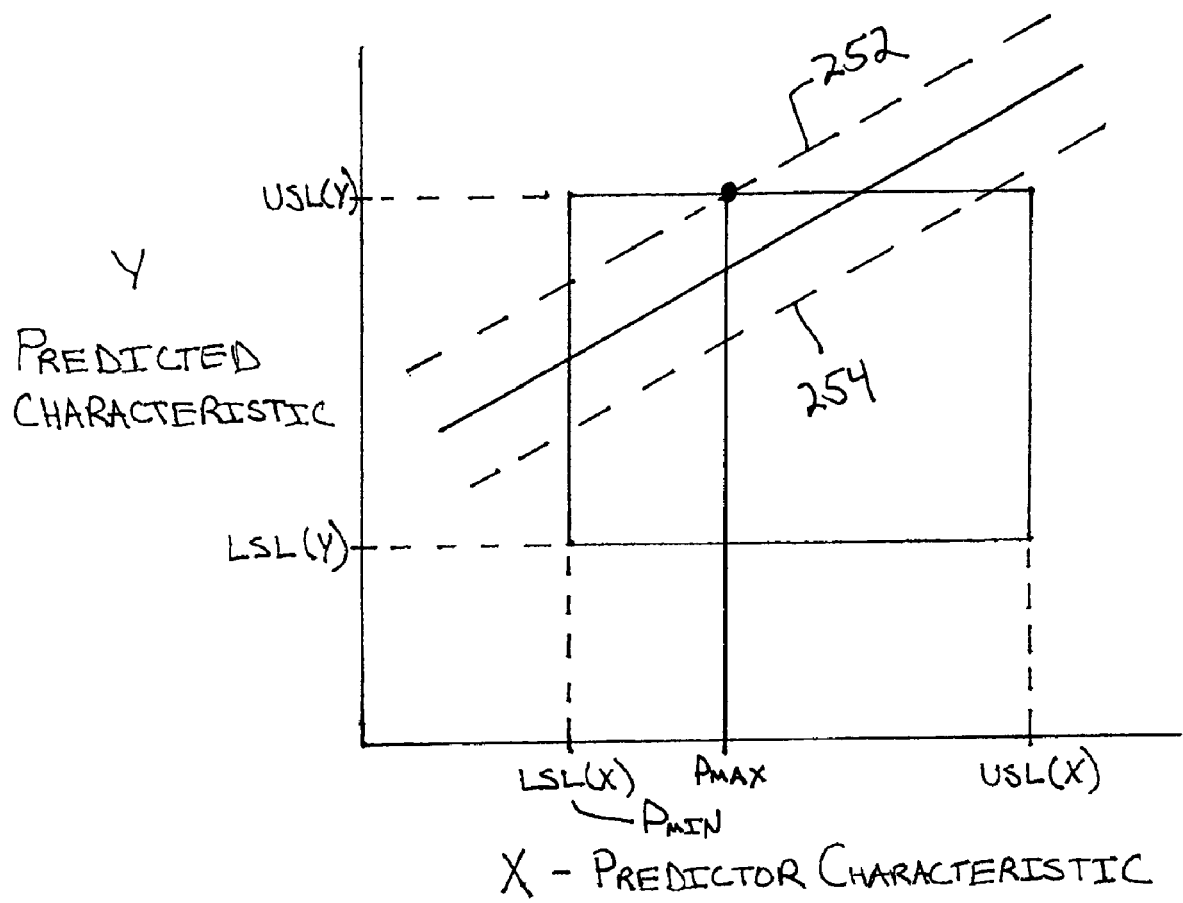
Figure 27E:
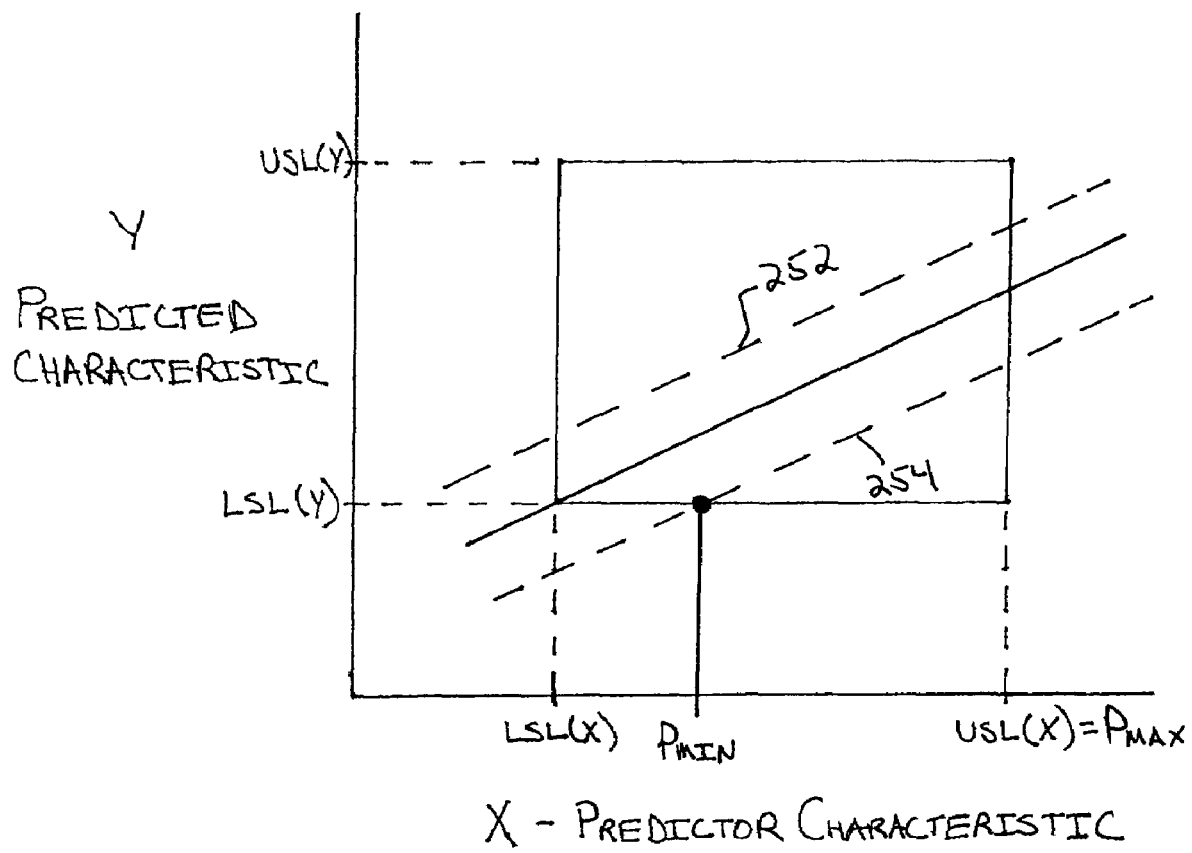

Otherwise, if no defect condition is detected and the predicted characteristic is not robust, process analysis system 100, in one embodiment, computes Pmin and Pmax (step 714). See Section II.B.2.b., supra. As FIG. 23 illustrates, process analysis system 100 then repeats the process described above for all remaining predicted characteristics (see steps 716 and 718). FIGS. 27A thru 27F graphically illustrate various circumstances where the upper and/or lower prediction intervals constrain Pmin and/or Pmax to values in between the lower and upper specification limits of the predictor characteristic. As FIGS. 27A and 27B illustrate, both the upper and lower prediction intervals associated with the regression model can constrain Pmin and Pmax. As FIGS. 27A and 27B further illustrate, the slope of the regression model can influence whether the upper or the lower prediction interval establishes or determines Pmin or Pmax. Furthermore, FIGS. 27C and 27D graphically illustrate circumstances where the upper predication interval constrains Pmin or Pmax. Similarly, FIGS. 27E and 27F graphically illustrate circumstances where the lower prediction interval constrains Pmin or Pmax. In one embodiment, process analysis system 100 first determines the sign of the slope of the regression model prediction intervals. Process analysis system 100, in one embodiment, then determines the value of the predictor characteristic at the intersection of the upper prediction interval and the upper specification limit for the predicted characteristic. Similarly, process analysis system 100, in one embodiment, also computes the value of the predictor characteristic at the intersection of the lower prediction interval and the lower specification limit for the predicted characteristic. Process analysis system 100 then determines whether the upper and/or lower prediction interval constrains Pmin and/or Pmax and, if so, computes the value of Pmin and Pmax. In one embodiment, if the slope of the prediction interval is positive, then process analysis system 100 sets the maximum predictor characteristic value associated with the first remaining article characteristic to the lesser of the upper specification limit of the predictor characteristic or the value of the predictor characteristic at which the upper prediction interval corresponding to the regression model intersects the upper specification limit for the first remaining article characteristic, and sets the minimum predictor characteristic value associated with the first remaining article characteristic to the greater of the lower specification limit of the predictor characteristic or the value of the predictor characteristic at which the lower prediction interval corresponding to the regression model intersects the lower specification limit for the first remaining article characteristic. Otherwise, if the slope of the prediction interval is negative, then process analysis system 100 sets the maximum predictor characteristic value associated with the first remaining article characteristic to the lesser of the upper specification limit of the predictor characteristic or the value of the predictor characteristic at which the lower prediction interval corresponding to the regression model intersects the lower specification limit for the first remaining article characteristic, and sets the minimum predictor characteristic value associated with the first remaining article characteristic to the greater of the lower specification limit of the predictor characteristic or the value of the predictor characteristic at which the upper prediction interval corresponding to the regression model intersects the upper specification limit for the first remaining article characteristic.

B.2.d. Determining Producibility Targets and Ranges

Further parameters can be derived from P-min* and P-max* that will be useful for facilitating design of articles and process inputs and for setting process control variables. The maximum allowable range (P-range*) can be computed by subtracting the most constraining minimum value (P-min*) from the most constraining maximum value (P-max*). FIG. 14 graphically illustrates the determination of the most constraining minimum and maximum values and range for the simplified case of two predicted characteristics.

In addition, a predictor production target (P-target*) can be determined. P-target* is the point that one would pick as the target for the average output of the process. It is, in one embodiment, the best "producibility" point that will maximize the chances of producing parts that are in compliance with specification limits. When properly selected, P-target* will minimize the percentage of data points that are outside of P-range* during production.

To avoid confusion between design target and a target for the predictor dimension (P-target*), a difference in terminology should be noted. The predictor characteristic (P) will almost always have an engineering design target (P-target). The engineering design target (or nominal value) is a value called for by a design engineer (e.g., a number on a drawing or in a specification). In contrast, P-target* is a target operating point for the process that will optimize production output, as discussed above.

In one embodiment. the predictor production target (P-target*) is selected as the midpoint of P-range*. See FIG. 14. This would be appropriate for situations where the output of the production process was symmetrical about its mean. Typical processes have a symmetrical distribution that is approximately normal. If the distribution of the article characteristic is non-symmetrical, the target predictor characteristic value can be set to the average article characteristic value.

B.2.e. Offset Table

As discussed in more detail below, process analysis system 100, in one embodiment, is further operative to generate an Offset Table indicating the amount by which a pre-process dimension would have to be adjusted to achieve a given design target. In other words, the Offset Table provides a value corresponding to the distance the regression line would have to be moved to pass through the target intersection. For example, in injection molding processes, an offset value is the amount by which a given mold dimension would have to be changed (for example, by adding steel through welding or removing steel through machining) so it would be possible to achieve the target intersection between the predictor dimension and a given predicted dimension).

This is critical information for parts manufactured for the medical industry, for instance, where molds are sometimes modified to improve a part dimension by as little as 0.001 inch. This information can be used by the mold designer and the mold manufacturer. For other processes like plating, the Offset Table can tell engineers the required changes to the pre-plating dimensions of the part.

In one embodiment of the present invention, the magnitude and direction of the offsets in the Offset Table are computed by determining the vertical distance between the target intersection and the regression model. In a second embodiment of the present invention, the magnitude and direction of the offsets in the Offset Table are computed by determining the horizontal distance between the target intersection and the regression model. In a third embodiment of the present invention, the magnitude and direction of the offsets in the Offset Table are computed by determining the distance between the target intersection and the regression model in a direction perpendicular to the regression model.

The information contained in the Offset Table is also useful from yet another perspective. Whether the predicted characteristic value is above, at, or below the design target value for that predicted characteristic depends on the specific values selected for each of the process settings. In-other-words, the offset of the achieved predicted value from the design target value is dependent on the values selected for the process settings. For one set of process settings, the decision might be made to increase a mold dimension by removing steel. For a different set of process settings, the decision might be made to decrease that same mold dimension by adding steel. As can be imagined, this is an undesirable state of affairs. Using the new technology described herein, offsets are computed by determining the distance and direction of the regression model from the target intersection. Using the methodology described herein, offsets can be determined that are independent from the values selected for the process settings.

FIG. 28A sets forth a method directed to the generation of an Offset Table according to an embodiment of the present invention. FIG. 28B provides a resulting offset table according to an embodiment of the present invention. As FIG. 28A illustrates, process analysis system 100, in one embodiment, first initializes an offset table array (step 802). In one embodiment, the offset table is a two-column array including article characteristic identifiers in one column and corresponding offset values in a second column. The inputs to the offset table method or function include the target values of the article characteristics and the respective regression models between the predictor characteristic and the remaining predicted characteristics. As FIG. 28A provides, process analysis system 100, for all predicted characteristics (see step 804), computes the value of the predicted characteristic from the regression model at the target value of the predictor characteristic (step 806). Process analysis system 100 then determines the offset value for the predicted characteristic by computing the difference between the computed value of the predicted characteristic and the target (design specification) value of the predicted characteristic (step 808). Process analysis system 100 then stores the resulting offset value in an array or other suitable data structure (step 810) and repeats the process for the next predicted characteristic.

B.2.f. Design Tolerance Relaxation Table

In many cases, it is faster and cheaper to relax the design tolerances on a given part instead of changing pre-process elements, such as the dimensions of a mold. The design engineer must, of course, make a decision as to whether or not this is feasible in light of the potential impact of tolerance relaxation for any given article characteristic on form, fit or function. Further, in some instances, the operating range (Prange*, supra) may be of such small size as to make it difficult, unlikely, or even impossible to produce parts or assemblies that have all article characteristics within specification limits. If the decision is made to increase producibility by increasing the operating range by relaxing tolerances, then one embodiment of the Design Tolerance Relaxation Table facilitates an assessment of which design tolerances to relax by providing a prioritized list of the optimal order in which tolerances should be relaxed, as well as an analysis of the increase in operating range achieved for each incremental tolerance relaxation.

In one embodiment, process analysis system 100 is operative to generate a Design Tolerance Relaxation Table which facilitates analysis of the achievable gains in operating range associated with relaxing the design tolerances of each predicted article characteristic. The most constraining predicted characteristic (i.e., having the highest Pmin or lowest Pmax) should be relaxed first. Said differently, the first tolerance to be relaxed is the tolerance on the article characteristic that most constrains the predictor characteristic. The Design Tolerance Relaxation Table then tells the engineer how much increase there would be in the operating range (the difference between P-min* and P-max*) as a result of relaxing that tolerance. The Design Tolerance Relaxation Table also tells the engineer the cumulative gain achieved by relaxing each variable in turn.

FIG. 30 provides a Design Tolerance Relaxation Table according to one embodiment of the present invention. As FIG. 30 illustrates, the Relaxation Table, in one embodiment, is divided into two main parts, namely, the ranked list of the article characteristics by most constraining Pmin value, and a ranked list of the same article characteristics by most constraining Pmax value. In this example, Var12 is the predictor characteristic and is placed in the last position in both lists. For each article characteristic in either the Pmin or Pmax column, the Relaxation table includes the following fields: 1) an article characteristic identifier; 2) the calculated Pmin/Pmax value, 3) the individual gain in operating range achieved by relaxing the tolerance of the corresponding article characteristic, and 4) the cumulative gain associated with relaxing the tolerance of the corresponding article characteristic. As one skilled in the art will recognize from the description provided herein, the individual gain associated with each article characteristic assumes that Pmin/Pmax has been relaxed to the Pmin/Pmax values associated with the following article characteristic. The cumulative gain corresponding to a given article characteristic indicates the aggregate gain in operating range achieved by relaxing Pmin/Pmax to the value associated with the following article characteristic. For example, to achieve a cumulative gain of 0.0030 inches in operating range, the specification limits corresponding to article characteristics Var16, Var13, Var11, Var9 and Var10 should be relaxed to the point where Pmin equals 6.3741 inches. Alternatively, to achieve a 0.0043 inch cumulative gain in operating range, the specification limits corresponding to article characteristics Var2 and Var4 should be relaxed to the point where Pmax equals 6.3819 inches. Alternatively, a 0.0053 inch gain in operating range could be achieved by relaxing the appropriate tolerances on Var16, Var2 and Var4. A 0.005 inch gain in operating range can be very significant and helpful in certain circumstances. For example, if the operating range was 0.005 inches prior to tolerance relaxation, then a 0.005 inch increase equates to doubling the operating range or, effectively, making it twice as easy to achieve process settings that produce article characteristics that are within specification limits.

FIG. 29 illustrates an exemplary method directed to generating a Design Tolerance Relaxation Table according to an embodiment of the present invention. As FIG. 29 illustrates, process analysis system 100, in one embodiment, formats or initializes a Design Tolerance Relaxation Table (step 830) and transfers the Pmin and Pmax values calculated above (see Sections II.B.2.b., c., above) to the relaxation table (step 832). Process analysis system 100 then calculates the individual gains achieved by relaxing Pmin for the article characteristics (step 834). In one embodiment, process analysis system 100 sorts the article characteristics from most to least constraining (highest) Pmin value and then adds the predictor characteristic identifier and associated specification limit to the end of the sorted list. Process analysis system 100 then computes the individual gain achieved by relaxing the specification limit for each article characteristic to the value corresponding to the Pmin of the next article characteristic in the sorted list. For example, the individual gain achieved by relaxing the specification limit of Var16 to the level of Pmin corresponding to Var13 is the difference between Pmin of Var16 and Pmin of Var13. In this instance, the difference is 0.0005 inches; the table of FIG. 30 shows 0.0004 inches due to computer spreadsheet round-off of the values for P-min. The succeeding individual gains for the remaining article characteristics are computed in a similar manner until the last (predictor) characteristic is reached.

Process analysis system 100 then calculates the individual gains achieved by relaxing Pmax and, hence, the specification limits for the predicted article characteristics (step 836). In one embodiment, process analysis system 100 sorts the article characteristics by most constraining (lowest) Pmax value and then adds the predictor characteristic identifier and associated upper specification limit to the end of the sorted list. Process analysis system 100 then computes the individual gain achieved by relaxing the specification limit of a given article characteristic to the value corresponding to the Pmax of the next article characteristic in the sorted list. For example, the individual gain achieved by relaxing the specification limit of Var2 to the level of Pmax corresponding to Var4 is the difference between Pmax of Var2 and Pmax of Var4. This difference is 0.0006 inches; note that there is no computer round-off in this instance for the values of Pmax. The succeeding individual gains for the remaining article characteristics are computed in a similar manner until the last (predictor) characteristic is reached. Process analysis system 100 then computes the cumulative gains associated with each successive tolerance relaxation for both the Pmin and Pmax relaxations (step 838).

As one skilled in the art will recognize, the Design Tolerance Relaxation Table does not display the lower/upper specification limits for the predicted characteristics resulting from a relaxation of these limits to a given Pmin or Pmax; rather, the Design Tolerance Relaxation Table set forth in FIG. 30 facilitates a determination of which and how many article characteristic design tolerances to relax to achieve a desired gain in operating range.

Figure 32B:
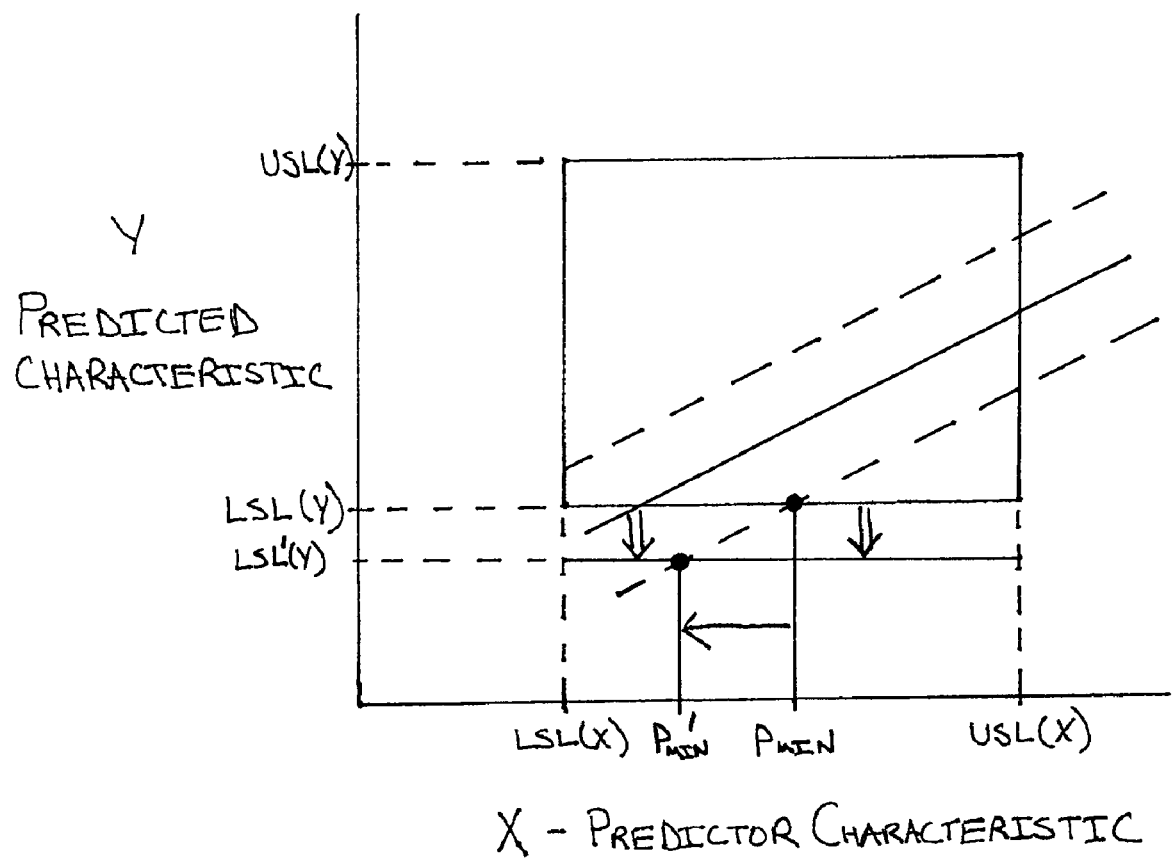
Figure 32D:
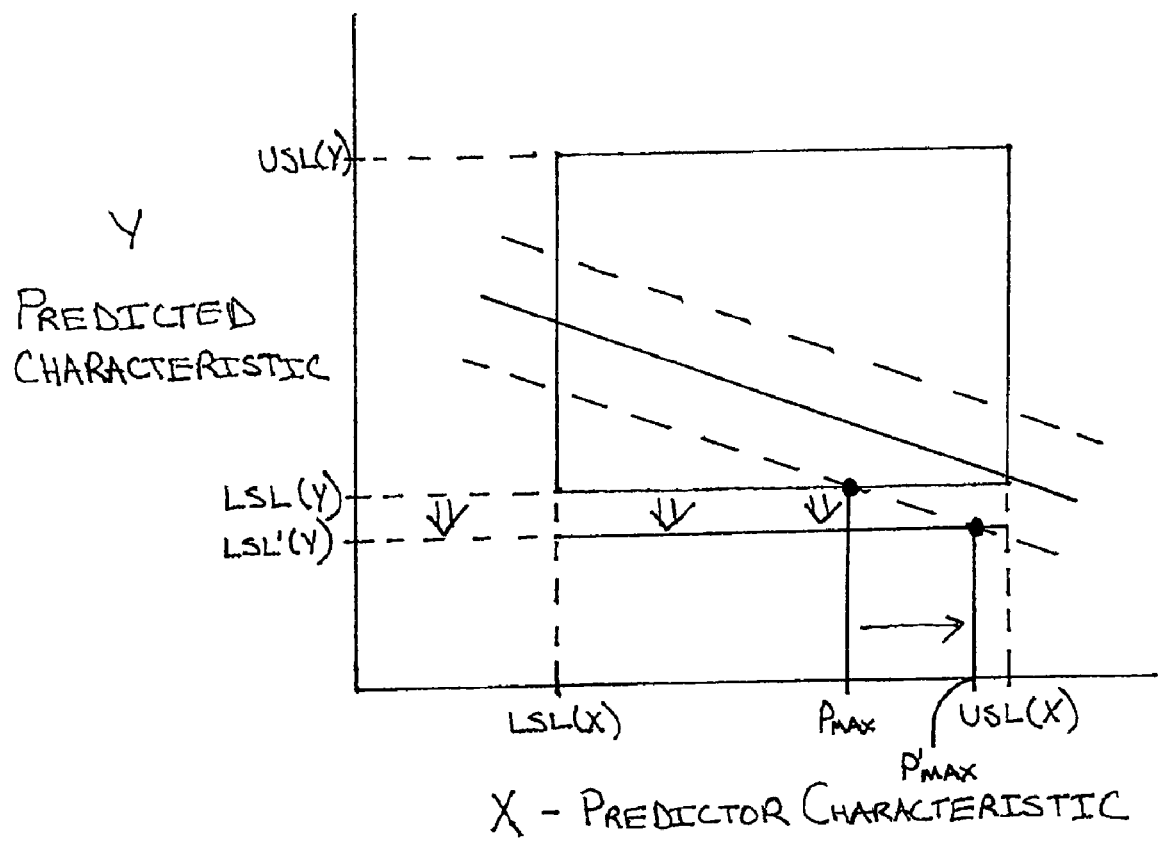

In one embodiment, process analysis system 100 is operative to calculate the resulting lower and/or upper specification limits after the user has selected which article characteristic specification limits to relax. For example, the user may elect to relax only lower specification limits, only upper specification limits, or a combination of upper and lower specification limits to increase the allowable operating range (P-range*). In one embodiment, process analysis system 100 prompts the user for a selection of an article characteristic from the Pmin column and/or an article characteristic from the Pmax column of the Design Tolerance Relaxation Table and then calculates the new lower or upper specification limits for each article characteristic in the sorted list(s) up to the selected article characteristic(s). Specifically, for each article characteristic in the sorted list up to the selected article characteristic, process analysis system 100, using the regression model, calculates the article characteristic values where the boundaries (upper and lower prediction intervals) of the regression model intersect Pmin or Pmax as appropriate. For didactic purposes, FIGS. 32A, 32B, 32C and 32D graphically illustrate the computation of new upper and lower specification limits from the relaxation of Pmin and Pmax. As these Figures illustrate, the slope of the regression model determines whether the relaxation of Pmin/Pmax results in a relaxation of the upper or the lower specification limit associated with a given article characteristic. As FIG. 32A illustrates, for a regression model with a positive slope, the relaxation of USL(Y) to USL'(Y) results in the relaxation of Pmax to Pmax'. The operating range will increase in magnitude by an amount equal to Pmax'-Pmax. Similarly, FIG. 32B illustrates, for a regression model with a positive slope, that the relaxation of LSL(Y) to LSL'(Y) results in the relaxation of Pmin to Pmin'. The operating range will increase in magnitude by an amount equal to Pmin-Pmin'. For regression models with a negative slope, the relaxation of USL(Y) to USL'(Y) results in the relaxation of Pmin to Pmin' (see FIG. 32C) and the relaxation of LSL(Y) to LSL'(Y) results in the relaxation of Pmax to Pmax' (see FIG. 32D).

As FIG. 31 illustrates, process analysis system 100, in one embodiment, receives a selected predicted characteristic from the Pmin and/or Pmax Relaxation column (step 850). If the user selects a predicted article characteristic to relax Pmin (step 852), process analysis system 100 sets Pmin to the Pmin value corresponding to the next article characteristic in the sorted list (step 854). For example and with reference to FIG. 30, Pmin would be set to 6.3761 inches (corresponding to Var11), if Var13 was the selected predictor characteristic. Process analysis system 100, for each article characteristic up to and including the selected article characteristic (see step 856), then computes the resulting new specification limits. Specifically, process analysis system 100 determines the slope of the regression model to select the lower or upper prediction interval, as appropriate (see above) (step 857) and computes the value at Pmin of the appropriate (e.g., lower or upper) prediction interval (boundary) of the regression model between the predictor characteristic and the predicted characteristic (step 858) and stores the new specification limit in a table in association with the corresponding predicted article characteristic (step 860) for ultimate display to the user.

If the user selects a predicted article characteristic to relax Pmax (step 862), process analysis system 100 sets Pmax to the Pmax value corresponding to the next article characteristic in the sorted list (step 864). Process analysis system 100, for each article characteristic up to and including the selected article characteristic (see step 866), then computes the resulting new specification limits. Specifically, process analysis system 100 determines the slope of the regression model to select the lower or upper prediction interval, as appropriate (see above) (step 867) and computes the value at Pmax of the appropriate prediction interval (boundary) of the regression model (step 868) and stores the new specification limit in a table or other data structure (step 870) for ultimate display to the user. As one skilled in the art will recognize, use of the Design Tolerance Relaxation Table in this manner will result in new Pmin* and/or Pmax* values.

C. Using the Maximum Allowable Range (P-range*) and the Predictor Production Target (P-target*)

For didactic purposes, it will be useful to clarify and define certain parameters as follows:

1. P-range* is the maximum allowable range for the predictor characteristic. It is the range within which the predictor characteristic must be to ensure that the remaining part characteristics will remain in compliance with specification limits;
2. P-target* is the value of the predictor characteristic production target value. P-target* can be set at several values within P-range*. P-target* will usually be set at the midpoint of P-range*;
3. VAR is the range of variability of the predictor characteristic associated with actual process output under production conditions. It is determined by assessing production output;
4. X-BAR is the average value of the predictor characteristic under production conditions. It is determined by assessing production output;
5. P-target is the engineering design target value for the predictor characteristic. It is determined by the design engineer to optimize form, fit and function; and,
6. USL and LSL are the upper and lower specification limits for the predictor characteristic based on the engineering design tolerances. They are determined by the design engineer and typically consider a number of factors including history tolerances used by the organization, criticality of the part, capability of the manufacturing organization, and other factors.

Knowing the maximum allowable range (P-range*) for the predictor characteristic is extremely useful. The actual process output will exhibit a certain amount of variability (VAR) and there will be a value that represents the predictor characteristic average process output (X-BAR). Having this information facilitates changing at least one process control setting in a manner that maximizes the likelihood that the process generates parts that are in compliance with the specification.

If it has been decided that P-range* is too "constrained", then a second part characteristic can be measured to "open up" the "constraints" on P-range*.

There is also great utility in comparing the size of the actual process variability (VAR) for the predictor characteristic to the maximum allowable range (P-range*). The following situations are possible:

1. If the actual process variability (VAR) is greater the maximum allowable range (P-range*), then a portion of the parts produced by the process will always be out of compliance.
2. If the actual process variability (VAR) is equal to the maximum allowable range (P-range*) and the average process output (X-BAR) is centered within the maximum allowable range, then nearly all parts produced by the process will be in compliance, but there will be no room for error or for shifts in the process output.
3. If the actual process variability (VAR) is smaller than and lies within the maximum allowable range (P-range*), then nearly all parts will be in compliance and there will be a greater margin of safety against errors or shifts in process output.

The present invention creates, for situation number 3. an excellent opportunity for the process engineer to investigate shifting the average process output (X-BAR) closer to the engineering design target (P-target) for the predictor part characteristic.

There is also great utility in comparing the average process output (X-BAR) for the predictor characteristic to its production target (P-target*). The following situations are possible, assuming that the process output distribution is symmetrical and the predictor characteristic target value (P-target*) is set at the midpoint of its maximum allowable range:

1. The closer the average process output (X-BAR) for the predictor characteristic is to the predictor production target (P-target*), the greater the likelihood that the process will produce parts that are in compliance.
2. When the average process output (X-BAR) is equal to the predictor production target (P-target*), the chances are maximized that the process will produce parts that are in compliance.

Similar conclusions can be reached even if the process output distribution is not symmetrical. In this situation, P-target* should be set at the point where the tails of the distribution have equal areas outside of P-range*.

Thus, the present invention facilitates determining the difference between the average process output (X-BAR) and the predictor production target (P-target*). This difference establishes both the magnitude and the direction that the average process output (X-BAR) should be shifted. With this knowledge, it is then possible to adjust one or more process control settings to move the average process output along the regression line to or closer to the predictor production target (P-target*).

The present invention provides further utility. It now becomes possible to determine whether the actual process variability (VAR) is too large relative to the maximum allowable range (P-range*). If this is the case, then a first option is to reduce the process variation. A second option is to increase the magnitude of the design tolerances. A third option is to do some combination of the previous two alternatives. The present invention can greatly facilitate efficiency and cost savings by requiring that the various process capability analyses discussed in this section be performed only one time for only the predictor characteristic instead of the 30 or 40, or however many total part characteristics, involved.

Moreover, the Constraint Table values provide other useful information for the design engineer. For example, if the decision is made to increase the size of the design tolerances, the Constraint Table facilitates a prioritized determination to be made as to 1.) which specification limit (upper or lower) for 2.) which article characteristic is most constraining and should be the first to be relaxed. This step can be repeated as often as desired, working "outward" from the most constraining to the least constraining part characteristic. The design engineer can also assess the impact of relaxing each tolerance on product performance and factor this information into the decision-making process.

The present invention creates still more utility. The design engineer now has information that enables a study to be conducted that evaluates the tradeoff between product performance and producibility. In addition, the design engineer may also, if circumstances permit, change the design target to the determined predictor characteristic target (P-target*), and make changes elsewhere in the system to compensate (if compensation is even required, for the change in the design target).

To condense the next series of comments, P-range*, VAR, and TOL (the difference between the upper and lower specification limits), will be represented by A, B, and C. In a similar fashion, P-target*, X-BAR and P-target will be represented by X, Y, and Z. The present invention facilitates the following comparisons:

1. A versus B;
2. A versus C;
3. B versus C;
4. X versus Y;
5. X versus Z; and,
6. Y versus Z.

As previously noted, there is exceptionally valuable information that can be gained from these comparisons.

D. Application Overview and Summary

Figure 21:
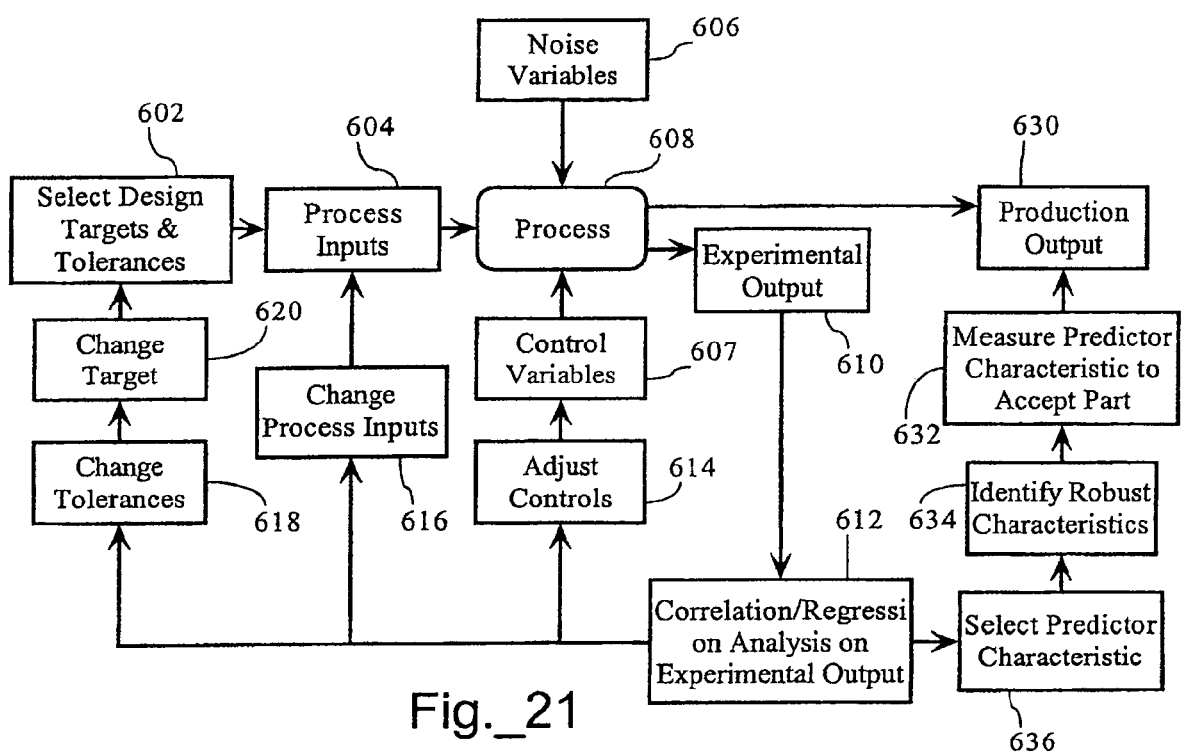
FIG. 21 is a flow chart illustrating a method associated with use of the present invention according to one embodiment.

FIG. 21 summarizes the concepts discussed above and illustrates a method according to an embodiment of the present invention. For didactic purposes, an injection molding process is described. As FIG. 21 shows, the design of a part, for example, yields various design targets and specification limits for the article characteristics (602), which yields the design and fabrication of a mold including at least one cavity defining a part (604). Other inputs to the process include noise variables (606) and process control settings (607). The process (208) yields either experimental output (610) or production output (630), as discussed below.

As FIG. 21 shows, embodiments of the present invention can be used to facilitate the design and engineering processes associated with designing a part and/or engineering a process that will ultimately yield acceptable parts for production output. As discussed above, in one embodiment, a process operator generates a set of parts having a range of variation as to a plurality of article characteristics (experimental output 610). The article characteristics associated with the experimental output 610, or a sample thereof, are assessed and analyzed using the correlation and regression analysis methods discussed above (612). With the information gleaned from these analysis methods, the user, aided by the Constraint and/or Relaxation Tables discussed above, may decide to change tolerance limits (618) and/or design targets (620). In addition, the user, aided by the information set forth in the Offset Table discussed above, may decide to change process inputs (616) and/or adjust control variables (614).

As discussed above, in one embodiment, variation is induced in the part characteristics during an experimental production run. One of the by-products of that experimental production run is that the user learns which process settings have a major impact on the part characteristics. That knowledge enables the user to adjust a small number of process settings to position product output at any predetermined point along the regression model. In the case of injection molding, for example, the user may find that changing just one pressure setting, or one temperature setting, or one speed setting will be sufficient to translate the joint output of the article characteristics along the regression line.

Furthermore, the user may select a predictor characteristic (636) based on the correlation and regression analysis (612) to facilitate measurement of production output (630). For example, by analyzing the remaining article characteristics in relation to the predictor characteristic the user may identify robust predicted characteristics (i.e., article characteristics that will always be within tolerance limits) and eliminate them from measurement (step 634). Alternatively, or in conjunction therewith, the user may determine the maximum allowable range for the predictor characteristic and determine whether production output 630 complies with specification limits by measuring a single article characteristic (the predictor characteristic) (632).

As discussed above, to shift output along the regression line, an injection mold operator can change one or more process control variables, such as pressure, temperature, speed, etc. For illustrative purposes, an example of changing process inputs in the injection molding industry would be to change an internal dimension of a mold cavity. The regression line can be shifted vertically. In FIG. 6, this would be accomplished by changing the size of the remaining article characteristic. A reduction in size would be accomplished by adding material to the inside of the mold at the location of that article characteristic. This would decrease the size of the produced article and would shift the regression line vertically downwards. The size of the required shift would be computed by determining the distance the regression line was offset from the target intersection. Thus, the location of the regression line relative to the target intersection provides information that can be used to determine which direction the regression line needs to be shifted and the magnitude of that shift.

An alternate method of shifting the regression line in FIG. 6 would be to shift it horizontally. In order for the regression line to pass through the target intersection in FIG. 6, it must be shifted to the right. This shift would be accomplished by changing the mold dimension for the predictor characteristic. A shift to the right means that the size of the predictor characteristic is increased. An increase in size requires an increase in the size of the mold cavity for the predictor characteristic (here, a dimension). This can be accomplished by removing material from the interior of the mold. The size of the required shift is determined by computing the horizontal distance between the regression line and the target intersection.

Yet another method of shifting the regression line is to create the shift by changing some combination of mold dimensions for both the predictor and at least one of the remaining article characteristics. In the specific example shown in FIG. 6, the regression line is shifted in a direction perpendicular to itself. This, in effect, is the shortest possible shift that can be done to position the regression line through the target intersection. In this case, the shift would be accomplished by a decrease in the size of the predicted characteristic and an increase in the size of the predictor characteristic. In the case of a plated part, an example of the two article characteristics could be the post-plating length and width dimensions of the part. In this case, the pre-plating length and width dimensions of the part would be considered as the process inputs.

FIG. 7 illustrates a method used to produce articles that have characteristics that are superimposed on or congruent with the target intersection. The embodiment illustrated in FIG. 7 consists of a two-step process. In step one, the regression line is shifted so that it intersects the target intersection. In this example, the regression line is shifted down and to the right. As indicated before, the regression line can be shifted horizontally, vertically, or both. In step two, the characteristic position is shifted, for this particular example, along the regression line in the direction of smaller dimensions until the position is congruent with the target intersection. In practice, of course, the direction that the characteristic position will need to be shifted will depend on the location of the initial characteristic relative to the target intersection and the slope of the regression line.

For didactic purposes, the language contained in this application refers to the use of techniques to "locate" or "position" or "determine the intersection" or "determine the range" or other terminology that might be used from a graphical perspective. Virtually all analytical techniques described herein document can be accomplished either graphically or analytically. It is to be appreciated that analytical techniques can be used when graphical techniques are described and graphical techniques can be used when analytical techniques are described. Indeed, a preferred embodiment of the present invention performs all computations, calculations, locations and determinations using analytical techniques. Graphical displays are created for the convenience and understanding of the user.

Also for didactic purposes, the language in this application refers to a regression line. It is noted above that the regression "line" need not be a straight line but may be curvilinear. It should also be noted that the regression model is frequently shown, for didactic purposes, as being a single line. It should be noted the regression model in a preferred embodiment of this invention includes use of prediction intervals.

It is to be noted, that for didactic purposes, the effect of changes in process control settings has been illustrated in terms of their effect on a single remaining (predicted) article characteristic. It is to be understood that the effect of changes in process control settings can be determined for more than two article characteristics. Similarly, it is to be understood that the effect of changes in process inputs has been illustrated in terms of their effect on a single regression model. It is to be understood that the effect of changes in process control settings can be determined for more than one regression model.

For didactic purposes, it has been assumed that the objective of introducing changes in either the process control settings and/or process inputs has been to move the joint operating position(s) and/or regression model(s) closer to one or more target intersections. It is to be further understood that these changes can be made to move the joint operating position(s) and/or regression model(s) to any desired position.

For didactic purposes, the upper and lower specification limits associated with the article characteristics have been described as being constant values, resulting in a rectangular compliance area. The present invention, however, can also be applied to circumstances where one or more of such specification limits vary based on one or more factors, resulting in a compliance area having a trapezoidal (for example) or other shape.

Finally, for didactic purposes, as noted immediately above, it has been assumed that changes have been introduced to optimize article characteristics relative to one or more criteria. It is to be understood that the algorithms, models and concepts set forth herein can be used to achieve the opposite effect. For example, it is possible to determine the required change in a joint operating point and/or regression model position needed in order to achieve a desired change in a process setting and/or process input. One objective of doing this could be to move a process control setting away from a dangerous or harmful setting. Another objective of doing this could be to match the production process and/or engineering design parameters to specific process inputs such as pre-configured raw material shapes.

Lastly, although the present invention has been described as operating in connection with injection molding processes, the present invention, as discussed above, has application to a variety of processes. For example, the present invention has application to plating and semiconductor manufacturing, as well as any other process where a material is added, removed, or changed in form or structure. The present invention has application to other non-manufacturing processes where characteristics of the output are related. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus facilitating design, manufacturing, and other processes comprising:
    a processor;
    a memory;
    a software application, physically stored in the memory, comprising instructions operable to cause the processor and the apparatus to:
        receive a plurality of article characteristic values associated with a set of articles having a range of variation as to a plurality of article characteristics;
        select a predictor characteristic from the plurality of article characteristics;
        determine the regression model between the predictor characteristic and a first remaining article characteristic in the plurality of article characteristics, wherein the regression model includes lower and upper prediction boundaries
        receive lower and upper specification limits for the predictor characteristic and the first remaining article characteristic;
        locate, relative to the regression model between the predictor characteristic and the first remaining article characteristic, the compliance area bounded by the upper and lower specification limits associated with the first remaining article characteristic and the predictor characteristic;
        locate the bounded regression area for the first remaining characteristic defined by the upper and lower prediction boundaries of the regression model and the upper and lower specification limits for the predictor characteristic; and
        identify the relationship between the bounded regression area and the compliance area.

2. The apparatus of claim 1 wherein the identified relationship characterizes the structure of the geometric relationship between the bounded regression area and the compliance area.

3. The apparatus of claim 1 wherein the identified relationship characterizes the relationship between the perimeter elements that define the bounded regression area and the perimeter elements that define the compliance area.

4. The apparatus of claim 1 wherein the identified relationship is one from the group consisting of a defect potential relationship, a robust relationship and a constraining relationship.

5. The apparatus of claim 1 wherein the software application further comprises instructions operable to cause the processor and the apparatus to
    determine whether the bounded regression area lies completely within the compliance area.

6. The apparatus of claim 1 wherein the software application further comprises instructions operable to cause the processor and the apparatus to
    if the bounded regression area lies completely within the compliance area, set the minimum and maximum predictor characteristic values associated with the first remaining article characteristic to the lower and upper specification limits, respectively, of the predictor characteristic.

7. The apparatus of claim 1 wherein the software application further comprises instructions operable to cause the processor and the apparatus to
determine whether the bounded regression area extends above, below, or both above and below the compliance area over the specification limit range of the predictor characteristic; and
if so, report a defect condition as to the first remaining article characteristic.

8. The apparatus of claim 6 wherein the software application further comprises instructions operable to cause the processor and the apparatus to
determine whether the bounded regression area extends above, below, or both above and below the compliance area over the specification limit range of the predictor characteristic; and
if so, report a defect condition as to the first remaining article characteristic.

9. The apparatus of claim 1 wherein the software application further comprises instructions operable to cause the processor and the apparatus to
determine whether any horizontal segment of the bounded regression area is contained completely within the compliance area and whether a second horizontal segment extends partially or completely outside of the compliance area; and
if so, compute the minimum and maximum predictor characteristic values for the first remaining article characteristic.

10. The apparatus of claim 9 to compute the minimum and maximum predictor characteristic values for the first remaining article characteristic, the software application further comprises instructions operable to cause the processor and the apparatus to
determine the slope and intercept of the regression model between the predictor characteristic and the first remaining article characteristic;
determine the value of the predictor characteristic at which the upper prediction boundary corresponding to the regression model intersects the upper specification limit for the first remaining article characteristic;
determine the value of the predictor characteristic at which the lower prediction boundary corresponding to the regression model intersects the lower specification limit for the first remaining article characteristic;
if the slope of the regression model is positive, then:
set the maximum predictor characteristic value associated with the first remaining article characteristic to the lesser of the upper specification limit of the predictor characteristic or the value of the predictor characteristic at which the upper prediction boundary corresponding to the regression model intersects the upper specification limit for the first remaining article characteristic; and
set the minimum predictor characteristic value associated with the first remaining article characteristic to the greater of the lower specification limit of the predictor characteristic or the value of the predictor characteristic at which the lower prediction boundary corresponding to the regression model intersects the lower specification limit for the first remaining article characteristic;
otherwise, if the slope of the regression model is negative, then
set the maximum predictor characteristic value associated with the first remaining article characteristic to the lesser of the upper specification limit of the predictor characteristic or the value of the predictor characteristic at which the lower prediction boundary corresponding to the regression model intersects the lower specification limit for the first remaining article characteristic; and
set the minimum predictor characteristic value associated with the first remaining article characteristic to the greater of the lower specification limit of the predictor characteristic or the value of the predictor characteristic at which the upper prediction boundary corresponding to the regression model intersects the upper specification limit for the first remaining article characteristic.

11. The apparatus of claim 8 wherein the software application further comprises instructions operable to cause the processor and the apparatus to
determine whether any horizontal segment of the bounded regression area is contained completely within the compliance area and whether a second horizontal segment extends partially or completely outside of the compliance area; and
if so, compute the minimum and maximum predictor characteristic values for the first remaining article characteristic.

12. The apparatus of claim 11 wherein the software application further comprises instructions operable to cause the processor and the apparatus to
store the resulting minimum and maximum predictor characteristic values in association with the corresponding remaining article characteristic in a data structure.

13. The apparatus of claim 12 wherein the data structure is an array.

14. The apparatus of claim 12 wherein, to report a defect condition, the software further comprises instructions operable to store a defect identifier in association with the corresponding remaining article characteristic.

15. The apparatus of claim 12 wherein the software application further comprises instructions operable to cause the processor and the apparatus to
display the resulting minimum and maximum predictor characteristic values and/or defect identifiers in association with the corresponding remaining article characteristic.

16. The apparatus of claim 1 wherein to identify the relationship between the bounded regression area and the compliance area, the software application further comprises instructions operable to cause the processor and the apparatus to
determine whether all vertical cross sections of the bounded regression area lie within the compliance area.

17. The apparatus of claim 16 wherein the software application further comprises instructions operable to cause the processor and the apparatus to
if all vertical cross sections of the bounded regression area lie within the compliance area, set the minimum and maximum predictor characteristic values associated with the first remaining article characteristic to the lower and upper specification limits, respectively, of the predictor characteristic.

18. The apparatus of claim 1 wherein to identify the relationship between the bounded regression area and the compliance area, the software application further comprises instructions operable to cause the processor and the apparatus to
- determine whether all vertical cross-sections of the bounded regression area are fully or partially outside of the compliance area; and
- if so, report a defect condition as to the first remaining article characteristic.

19. The apparatus of claim 1 wherein to identify the relationship between the bounded regression area and the compliance area, the software application further comprises instructions operable to cause the processor and the apparatus to
- determine whether at least one vertical cross section of the bounded regression area is completely within the compliance region and whether at least one vertical cross section is partially or completely outside the compliance area; and
- if so, compute the minimum and maximum predictor characteristic values for the first remaining article characteristic.

20. The apparatus of claim 19 wherein to compute the minimum and maximum predictor characteristic values for the first remaining article characteristic, the software application further comprises instructions operable to cause the processor and the apparatus to
- determine the slope of the regression model between the predictor characteristic and the first remaining article characteristic;
- determine the value of the predictor characteristic at which the upper prediction boundary corresponding to the regression model intersects the upper specification limit for the first remaining article characteristic;
- determine the value of the predictor characteristic at which the lower prediction boundary corresponding to the regression model intersects the lower specification limit for the first remaining article characteristic;
- if the slope of the regression model is positive, then:
  - set the maximum predictor characteristic value associated with the first remaining article characteristic to the lesser of the upper specification limit of the predictor characteristic or the value of the predictor characteristic at which the upper prediction boundary corresponding to the regression model intersects the upper specification limit for the first remaining article characteristic; and
  - set the minimum predictor characteristic value associated with the first remaining article characteristic to the greater of the lower specification limit of the predictor characteristic or the value of the predictor characteristic at which the lower prediction boundary corresponding to the regression model intersects the lower specification limit for the first remaining article characteristic;
- otherwise, if the slope of the regression model is negative, then
  - set the maximum predictor characteristic value associated with the first remaining article characteristic to the lesser of the upper specification limit of the predictor characteristic or the value of the predictor characteristic at which the lower prediction boundary corresponding to the regression model intersects the lower specification limit for the first remaining article characteristic; and
  - set the minimum predictor characteristic value associated with the first remaining article characteristic to the greater of the lower specification limit of the predictor characteristic or the value of the predictor characteristic at which the upper prediction boundary corresponding to the regression model intersects the upper specification limit for the first remaining article characteristic.

21. The apparatus of claim 1 wherein to identify the relationship between the bounded regression area and the compliance area, the software application further comprises instructions operable to cause the processor and the apparatus to
- determine whether the lower and upper boundaries of the bounded regression area are completely within the compliance region.

22. The apparatus of claim 21 wherein the software application further comprises instructions operable to cause the processor and the apparatus to
- if the lower and upper boundaries of the bounded regression area are completely within the compliance region, set the minimum and maximum predictor characteristic values associated with the first remaining article characteristic to the lower and upper specification limits, respectively, of the predictor characteristic.

23. The apparatus of claim 1 wherein to identify the relationship between the bounded regression area and the compliance area, the software application further comprises instructions operable to cause the processor and the apparatus to
- determine whether either of the lower and upper boundaries of the bounded regression area fail to intersect the compliance area; and
- if so, report a defect condition as to the first remaining article characteristic.

24. The apparatus of claim 1 wherein to identify the relationship between the bounded regression area and the compliance area, the software application further comprises instructions operable to cause the processor and the apparatus to
- determine whether the upper boundary of the bounded regression area intersects the upper boundary of the compliance area and the lower boundary of the bounded regression area intersects the compliance area; and, if so, compute the minimum and maximum predictor characteristic values for the first remaining article characteristic;
- else, determine whether the lower boundary of the bounded regression area intersects the lower boundary of the compliance area and the upper boundary of the bounded regression area intersects the compliance area; and, if so, compute the minimum and maximum predictor characteristic values for the first remaining article characteristic.

25. The apparatus of claim 24 wherein to compute the minimum and maximum predictor characteristic values for the first remaining article characteristic, the software application further comprises instructions operable to cause the processor and the apparatus to
- determine the slope of the regression model between the predictor characteristic and the first remaining article characteristic;
- determine the value of the predictor characteristic at which the upper prediction boundary corresponding to the regression model intersects the upper specification limit for the first remaining article characteristic;
- determine the value of the predictor characteristic at which the lower prediction boundary corresponding to the regression model intersects the lower specification limit for the first remaining article characteristic;

if the slope of the regression model is positive, then:
set the maximum predictor characteristic value associated with the first remaining article characteristic to the lesser of the upper specification limit of the predictor characteristic or the value of the predictor characteristic at which the upper prediction boundary corresponding to the regression model intersects the upper specification limit for the first remaining article characteristic; and set the minimum predictor characteristic value associated with the first remaining article characteristic to the greater of the lower specification limit of the predictor characteristic or the value of the predictor characteristic at which the lower prediction boundary corresponding to the regression model intersects the lower specification limit for the first remaining article characteristic;

otherwise, if the slope of the regression model is negative, then
set the maximum predictor characteristic value associated with the first remaining article characteristic to the lesser of the upper specification limit of the predictor characteristic or the value of the predictor characteristic at which the lower prediction boundary corresponding to the regression model intersects the lower specification limit for the first remaining article characteristic; and set the minimum predictor characteristic value associated with the first remaining article characteristic to the greater of the lower specification limit of the predictor characteristic or the value of the predictor characteristic at which the upper prediction boundary corresponding to the regression model intersects the upper specification limit for the first remaining article characteristic.

26. The apparatus of claim 1 wherein to identify the relationship between the bounded regression area and the compliance area, the software application further comprises instructions operable to cause the processor and the apparatus to compute the upper and lower prediction boundary values for the first remaining article characteristic at the upper and lower specification limits of the predictor characteristic;

determine whether the upper prediction boundary values are both less than the upper specification limit for the first remaining article characteristic, and whether the lower prediction boundary values are both greater than the lower specification limit for the first remaining article characteristic.

27. The apparatus of claim 26 wherein the software application further comprises instructions operable to cause the processor and the apparatus to if the upper prediction boundary values are both less than the upper specification limit for the first remaining article characteristic, and the lower prediction boundary values computed by the apparatus are both greater than the lower specification limit for the first remaining article characteristic, then set the minimum and maximum predictor characteristic values associated with the first remaining article characteristic to the lower and upper specification limits, respectively, of the predictor characteristic.

28. The apparatus of claim 1 wherein to identify the relationship between the bounded regression area and the compliance area, the software application further comprises instructions operable to cause the processor and the apparatus to compute the upper and lower prediction boundary values for the first remaining article characteristic at the upper and lower specification limits of the predictor characteristic;

if the upper prediction boundary values are both greater than the upper specification limit for the first remaining article characteristic, then report a defect condition as to the first remaining article characteristic; and if the lower prediction boundary values are both less than the lower specification limit for the first remaining article characteristic, then report a defect condition as to the first remaining article characteristic.

29. The apparatus of claim 1 wherein to identify the relationship between the bounded regression area and the compliance area, the software application further comprises instructions operable to cause the processor and the apparatus to compute the upper and lower prediction boundary values for the first remaining article characteristic at the upper and lower specification limits of the predictor characteristic;

determine whether one of the upper prediction boundary values is less than, and the other of the upper prediction boundary values is greater than, the upper specification limit of the first remaining article characteristic, and both of the lower prediction boundary values are greater than the upper specification limit for the first remaining article characteristic; and if so, compute the minimum and maximum predictor characteristic values for the first remaining article characteristic;

else, determine whether one of the lower prediction boundary values is less than, and the other of the lower prediction boundary values is greater than, the lower specification limit for the first remaining article characteristic, and whether the upper prediction boundary values, are both less than the upper specification limit of the first remaining article characteristic; and, if so, compute the minimum and maximum predictor characteristic values for the first remaining article characteristic;

else, determine whether one of the upper prediction boundary values is less than, and the other of the upper prediction boundary values is greater than, the upper specification limit of the first remaining article characteristic, and whether one of the lower prediction boundary values is less than, and the other of the lower prediction boundary values is greater than, the lower specification limit for the first remaining article characteristic; and, if so, compute the minimum and maximum predictor characteristic values for the first remaining article characteristic.

30. The apparatus of claim 29 wherein to compute the minimum and maximum predictor characteristic values for the first remaining article characteristic, the software application further comprises instructions operable to cause the processor and the apparatus to determine the slope of the regression model between the predictor characteristic and the first remaining article characteristic;

determine the value of the predictor characteristic at which the upper prediction boundary corresponding to the regression model intersects the upper specification limit for the first remaining article characteristic;

determine the value of the predictor characteristic at which the lower prediction boundary corresponding to the regression model intersects the lower specification limit for the first remaining article characteristic;

if the slope of the regression model is positive, then:
  set the maximum predictor characteristic value associated with the first remaining article characteristic to the lesser of the upper specification limit of the predictor characteristic or the value of the predictor characteristic at which the upper prediction boundary corresponding to the regression model intersects the upper specification limit for the first remaining article characteristic; and
  set the minimum predictor characteristic value associated with the first remaining article characteristic to the greater of the lower specification limit of the predictor characteristic or the value of the predictor characteristic at which the lower prediction boundary corresponding to the regression model intersects the lower specification limit for the first remaining article characteristic;

otherwise, if the slope of the regression model is negative, then
  set the maximum predictor characteristic value associated with the first remaining article characteristic to the lesser of the upper specification limit of the predictor characteristic or the value of the predictor characteristic at which the lower prediction boundary corresponding to the regression model intersects the lower specification limit for the first remaining article characteristic; and
  set the minimum predictor characteristic value associated with the first remaining article characteristic to the greater of the lower specification limit of the predictor characteristic or the value of the predictor characteristic at which the upper prediction boundary corresponding to the regression model intersects the upper specification limit for the first remaining article characteristic.

31. The apparatus of claim 1 wherein the software application further comprises instructions operable to cause the processor and the apparatus to
  repeat the determine the regression model, receive the specification limits, locate the compliance area, locate the bounded regression area, and identify the relationship operations for all desired remaining article characteristics.

32. The apparatus of claim 31 wherein the software application further comprises instructions operable to cause the processor and the apparatus to display the identified relationships.

33. The apparatus of claim 31 wherein the software application further comprises instructions operable to cause the processor and the apparatus to store the identified relationships in a data structure.

34. An apparatus facilitating a determination of the magnitude and direction by which a pre-process characteristic would have to be adjusted to achieve a given design target comprising:
  a processor;
  a memory;
  a software application, physically stored in the memory, comprising instructions operable to cause the processor and the apparatus to:
  receive a plurality of article characteristic values associated with a set of articles having a range of variation as to a plurality of article characteristics;
  select a predictor characteristic from the plurality of article characteristics;
  determine the regression model between the predictor characteristic and a first remaining article characteristic in the plurality of article characteristics,
  receive the target values for the predictor characteristic and the first remaining article characteristic;
  compute, based on the regression model, the value of the first remaining article characteristic at the target value of the predictor characteristic;
  determine the magnitude and direction of the offset for the first remaining article characteristic by computing the difference between the computed value of the first remaining article characteristic and the target value of the first remaining article characteristic;
  store the magnitude and direction of the offset in a data structure in association with an identifier for the first remaining article characteristic; and
  repeat the computing, determining and storing operations for all desired remaining characteristics.

35. The apparatus of claim 34 wherein the software application further comprises instructions operable to cause the processor and the apparatus to display the resulting magnitudes and directions of the offsets in association with the corresponding remaining article characteristics.

36. An apparatus facilitating analysis of the achievable gains in operating range associated with relaxing design tolerances corresponding to at least one article characteristic, comprising
  a processor;
  a memory;
  a software application, physically stored in the memory, comprising instructions operable to cause the processor and the apparatus to:
  receive a plurality of article characteristic values associated with a set of articles having a range of variation as to a plurality of article characteristics;
  select a predictor characteristic from the plurality of article characteristics;
  determine the regression model between the predictor characteristic and a first remaining article characteristic in the plurality of article characteristics, wherein the regression model includes lower and upper prediction boundaries;
  receive lower and upper specification limits for the predictor characteristic and the first remaining article characteristic;
  compute, based on the regression model, the minimum and maximum predictor characteristic values at which the first remaining article characteristic remains within the lower and upper specification limits of the first remaining article characteristic;
  repeat the determining, receiving, and computing operations for all desired remaining article characteristics;
  create a most constraining minimum predictor characteristic list by ranking the remaining article characteristics by the respective minimum predictor characteristic values associated therewith; and
  starting with the remaining article characteristic associated with the greatest minimum predictor characteristic value:
    compute the individual gain in operating range achieved by relaxing the applicable specification limit of the remaining article characteristic to the value corresponding to the minimum predictor characteristic value associated with the next remaining article characteristic in the ranked list;

compute the cumulative gain associated with relaxing the applicable specification limit of the corresponding article characteristic; and repeat the first and second computing operations for all desired remaining article characteristics.

37. The apparatus of claim 36 wherein the software application further comprises instructions operable to cause the processor and the apparatus to create a most constraining maximum predictor characteristic list by ranking the remaining article characteristics by the respective maximum predictor characteristic values associated therewith; and starting with the remaining article characteristic associated with the lowest maximum predictor characteristic value:

compute the individual gain in operating range achieved by relaxing the applicable specification limit of the remaining article characteristic to the value corresponding to the maximum predictor characteristic value associated with the next remaining article characteristic in the ranked list, compute the cumulative gain associated with relaxing the applicable specification limit of the corresponding article characteristic; and, repeat the first and second computing operations for all desired remaining article characteristics.

38. The apparatus of claim 37 wherein the software application further comprises instructions operable to cause the processor and the apparatus to receive a selection of at least one remaining article characteristic from either or both of the most constraining minimum or maximum predictor characteristic list;

if the selection includes a remaining article characteristic from the most constraining minimum predictor characteristic list, then:

set the minimum predictor characteristic value to the minimum predictor characteristic value corresponding to the next article characteristic in the most constraining minimum predictor characteristic list, and for all article characteristics in the most constraining minimum predictor characteristic list up to the selected article characteristic, compute the new lower or upper specification limit for the article characteristic; and if the selection includes a remaining article characteristic from the most constraining maximum predictor characteristic list, then:

set the maximum predictor characteristic value to the maximum predictor characteristic value corresponding to the next article characteristic in the most constraining maximum predictor characteristic list, and for all article characteristics in the most constraining maximum predictor characteristic list up to the selected article characteristic, determine the new lower or upper specification limit for the article characteristic.

39. A computer program product, physically stored on a machine-readable medium, for facilitating design, manufacturing, and other processes, comprising instructions operable to cause a programmable processor to:

receive a plurality of article characteristic values associated with a set of articles having a range of variation as to a plurality of article characteristics;

select a predictor characteristic from the plurality of article characteristics;

determine the regression model between the predictor characteristic and a first remaining article characteristic in the plurality of article characteristics, wherein the regression model includes lower and upper prediction boundaries receive lower and upper specification limits for the predictor characteristic and the first remaining article characteristic;

locate, relative to the regression model between the predictor characteristic and the first remaining article characteristic, the compliance area bounded by the upper and lower specification limits associated with the first remaining article characteristic and the predictor characteristic;

locate the bounded regression area for the first remaining characteristic defined by the upper and lower prediction boundaries of the regression model and the upper and lower specification limits for the predictor characteristic; and identify the relationship between the bounded regression area and the compliance area.

40. The computer program product of claim 39 wherein the identified relationship characterizes the structure of the geometric relationship between the bounded regression area and the compliance area.

41. The computer program product of claim 39 wherein the identified relationship characterizes the relationship between the perimeter elements that define the bounded regression area and the perimeter elements that define the compliance area.

42. The computer program product of claim 39 wherein the identified relationship is one from the group consisting of a defect potential relationship, a robust relationship and a constraining relationship.

43. The computer program product of claim 39 wherein the instructions are further operable to cause the programmable processor to:

determine whether the bounded regression area lies completely within the compliance area.

44. The computer program product of claim 39 wherein the instructions are further operable to cause the programmable processor to:

if the bounded regression area lies completely within the compliance area, set the minimum and maximum predictor characteristic values associated with the first remaining article characteristic to the lower and upper specification limits, respectively, of the predictor characteristic.

45. The computer program product of claim 39 wherein the instructions are further operable to cause the programmable processor to:

determine whether the bounded regression area extends above, below, or both above and below the compliance area over the specification limit range of the predictor characteristic; and if so, report a defect condition as to the first remaining article characteristic.

46. The computer program product of claim 39 wherein the instructions are further operable to cause the programmable processor to:

determine whether the bounded regression area extends above, below, or both above and below the compliance area over the specification limit range of the predictor characteristic; and if so, report a defect condition as to the first remaining article characteristic.

47. The computer program product of claim 39 wherein the instructions are further operable to cause the programmable processor to:
  determine whether any horizontal segment of the bounded regression area is contained completely within the compliance area and whether a second horizontal segment extends partially or completely outside of the compliance area; and
  if so, compute the minimum and maximum predictor characteristic values for the first remaining article characteristic.

48. The computer program product of claim 47 wherein to compute the minimum and maximum predictor characteristic values for the first remaining article characteristic, the instructions operable to cause the programmable processor to
  determine the slope and intercept of the regression model between the predictor characteristic and the first remaining article characteristic;
  determine the value of the predictor characteristic at which the upper prediction boundary corresponding to the regression model intersects the upper specification limit for the first remaining article characteristic;
  determine the value of the predictor characteristic at which the lower prediction boundary corresponding to the regression model intersects the lower specification limit for the first remaining article characteristic;
  if the slope of the regression model is positive, then:
    set the maximum predictor characteristic value associated with the first remaining article characteristic to the lesser of the upper specification limit of the predictor characteristic or the value of the predictor characteristic at which the upper prediction boundary corresponding to the regression model intersects the upper specification limit for the first remaining article characteristic; and
    set the minimum predictor characteristic value associated with the first remaining article characteristic to the greater of the lower specification limit of the predictor characteristic or the value of the predictor characteristic at which the lower prediction boundary corresponding to the regression model intersects the lower specification limit for the first remaining article characteristic;
  otherwise, if the slope of the regression model is negative, then
    set the maximum predictor characteristic value associated with the first remaining article characteristic to the lesser of the upper specification limit of the predictor characteristic or the value of the predictor characteristic at which the lower prediction boundary corresponding to the regression model intersects the lower specification limit for the first remaining article characteristic; and
    set the minimum predictor characteristic value associated with the first remaining article characteristic to the greater of the lower specification limit of the predictor characteristic or the value of the predictor characteristic at which the upper prediction boundary corresponding to the regression model intersects the upper specification limit for the first remaining article characteristic.

49. The computer program product of claim 46 wherein the instructions are further operable to cause the programmable processor to:
  determine whether any horizontal segment of the bounded regression area is contained completely within the compliance area and whether a second horizontal segment extends partially or completely outside of the compliance area; and
  if so, compute the minimum and maximum predictor characteristic values for the first remaining article characteristic.

50. The computer program product of claim 49 wherein the instructions are further operable to cause the programmable processor to:
  store the resulting minimum and maximum predictor characteristic values in association with the corresponding remaining article characteristic in a data structure.

51. The computer program product of claim 50 wherein the data structure is an array.

52. The computer program product of claim 49 wherein, to report a defect condition, the instructions are further operable to cause the programmable processor to store a defect identifier in association with the corresponding remaining article characteristic.

53. The computer program product of claim 50 wherein the instructions are further operable to cause the programmable processor to:
  display the resulting minimum and maximum predictor characteristic values and/or defect identifiers in association with the corresponding remaining article characteristic.

54. The computer program product of claim 39 wherein, to identify the relationship between the bounded regression area and the compliance area, the instructions are further operable to cause the programmable processor to:
  determine whether all vertical cross sections of the bounded regression area lie within the compliance area.

55. The computer program product of claim 54 wherein the instructions are further operable to cause the programmable processor to:
  if all vertical cross sections of the bounded regression area lie within the compliance area, set the minimum and maximum predictor characteristic values associated with the first remaining article characteristic to the lower and upper specification limits, respectively, of the predictor characteristic.

56. The computer program product of claim 39 wherein to identify the relationship between the bounded regression area and the compliance area, the instructions are further operable to cause the programmable processor to:
  determine whether all vertical cross-sections of the bounded regression area are fully or partially outside of the compliance area; and
  if so, report a defect condition as to the first remaining article characteristic.

57. The computer program product of claim 39 wherein to identify the relationship between the bounded regression area and the compliance area, the instructions are further operable to cause the programmable processor to:
  determine whether at least one vertical cross section of the bounded regression area is completely within the compliance region and whether at least one vertical cross section is partially or completely outside the compliance area; and
  if so, compute the minimum and maximum predictor characteristic values for the first remaining article characteristic.

58. The computer program product of claim 57 wherein to compute the minimum and maximum predictor characteristic values for the first remaining article characteristic, the instructions are further operable to cause the programmable processor to:

determine the slope of the regression model between the predictor characteristic and the first remaining article characteristic;

determine the value of the predictor characteristic at which the upper prediction boundary corresponding to the regression model intersects the upper specification limit for the first remaining article characteristic;

determine the value of the predictor characteristic at which the lower prediction boundary corresponding to the regression model intersects the lower specification limit for the first remaining article characteristic;

if the slope of the regression model is positive, then:

set the maximum predictor characteristic value associated with the first remaining article characteristic to the lesser of the upper specification limit of the predictor characteristic or the value of the predictor characteristic at which the upper prediction boundary corresponding to the regression model intersects the upper specification limit for the first remaining article characteristic; and set the minimum predictor characteristic value associated with the first remaining article characteristic to the greater of the lower specification limit of the predictor characteristic or the value of the predictor characteristic at which the lower prediction boundary corresponding to the regression model intersects the lower specification limit for the first remaining article characteristic;

otherwise, if the slope of the regression model is negative, then set the maximum predictor characteristic value associated with the first remaining article characteristic to the lesser of the upper specification limit of the predictor characteristic or the value of the predictor characteristic at which the lower prediction boundary corresponding to the regression model intersects the lower specification limit for the first remaining article characteristic; and set the minimum predictor characteristic value associated with the first remaining article characteristic to the greater of the lower specification limit of the predictor characteristic or the value of the predictor characteristic at which the upper prediction boundary corresponding to the regression model intersects the upper specification limit for the first remaining article characteristic.

59. The computer program product of claim 39 wherein to identify the relationship between the bounded regression area and the compliance area, the instructions are further operable to cause the programmable processor to:

determine whether the lower and upper boundaries of the bounded regression area are completely within the compliance region.

60. The computer program product of claim 57 wherein the instructions are further operable to cause the programmable processor to:

if the lower and upper boundaries of the bounded regression area are completely within the compliance region, set the minimum and maximum predictor characteristic values associated with the first remaining article characteristic to the lower and upper specification limits, respectively, of the predictor characteristic.

61. The computer program product of claim 39 wherein to identify the relationship between the bounded regression area and the compliance area, the instructions are further operable to cause the programmable processor to:

determine whether either of the lower and upper boundaries of the bounded regression area fail to intersect the compliance area; and if so, report a defect condition as to the first remaining article characteristic.

62. The computer program product of claim 39 wherein to identify the relationship between the bounded regression area and the compliance area, the instructions are further operable to cause the programmable processor to:

determine whether the upper boundary of the bounded regression area intersects the upper boundary of the compliance area and the lower boundary of the bounded regression area intersects the compliance area; and, if so, compute the minimum and maximum predictor characteristic values for the first remaining article characteristic;

else, determine whether the lower boundary of the bounded regression area intersects the lower boundary of the compliance area and the upper boundary of the bounded regression area intersects the compliance area; and, if so, compute the minimum and maximum predictor characteristic values for the first remaining article characteristic.

63. The computer program product of claim 62 wherein to compute the minimum and maximum predictor characteristic values for the first remaining article characteristic, the instructions are further operable to cause the programmable processor to:

determine the slope of the regression model between the predictor characteristic and the first remaining article characteristic;

determine the value of the predictor characteristic at which the upper prediction boundary corresponding to the regression model intersects the upper specification limit for the first remaining article characteristic;

determine the value of the predictor characteristic at which the lower prediction boundary corresponding to the regression model intersects the lower specification limit for the first remaining article characteristic;

if the slope of the regression model is positive, then:

set the maximum predictor characteristic value associated with the first remaining article characteristic to the lesser of the upper specification limit of the predictor characteristic or the value of the predictor characteristic at which the upper prediction boundary corresponding to the regression model intersects the upper specification limit for the first remaining article characteristic; and set the minimum predictor characteristic value associated with the first remaining article characteristic to the greater of the lower specification limit of the predictor characteristic or the value of the predictor characteristic at which the lower prediction boundary corresponding to the regression model intersects the lower specification limit for the first remaining article characteristic;

otherwise, if the slope of the regression model is negative, then set the maximum predictor characteristic value associated with the first remaining article characteristic to the lesser of the upper specification limit of the predictor characteristic or the value of the predictor characteristic at which the lower prediction boundary corresponding to the regression model intersects the lower specification limit for the first remaining article characteristic; and set the minimum predictor characteristic value associated with the first remaining article characteristic to the greater of the lower specification limit of the predictor characteristic or the value of the predictor characteristic at which the upper prediction boundary corresponding to the regression model intersects the upper specification limit for the first remaining article characteristic.

64. The computer program product of claim 39 wherein to identify the relationship between the bounded regression area and the compliance area, the instructions are further operable to cause the programmable processor to:

compute the upper and lower prediction boundary values for the first remaining article characteristic at the upper and lower specification limits of the predictor characteristic;

determine whether the upper prediction boundary values are both less than the upper specification limit for the first remaining article characteristic, and whether the lower prediction boundary values are both greater than the lower specification limit for the first remaining article characteristic.

65. The computer program product of claim 64 wherein the instructions are further operable to cause the programmable processor to:

if the upper prediction boundary values are both less than the upper specification limit for the first remaining article characteristic, and the lower prediction boundary values computed by the apparatus are both greater than the lower specification limit for the first remaining article characteristic, then set the minimum and maximum predictor characteristic values associated with the first remaining article characteristic to the lower and upper specification limits, respectively, of the predictor characteristic.

66. The computer program product of claim 39 wherein to identify the relationship between the bounded regression area and the compliance area, the instructions are further operable to cause the programmable processor to:

compute the upper and lower prediction boundary values for the first remaining article characteristic at the upper and lower specification limits of the predictor characteristic;

if the upper prediction boundary values are both greater than the upper specification limit for the first remaining article characteristic, then report a defect condition as to the first remaining article characteristic; and if the lower prediction boundary values are both less than the lower specification limit for the first remaining article characteristic, then report a defect condition as to the first remaining article characteristic.

67. The computer program product of claim 39 wherein to identify the relationship between the bounded regression area and the compliance area, the instructions are further operable to cause the programmable processor to:

compute the upper and lower prediction boundary values for the first remaining article characteristic at the upper and lower specification limits of the predictor characteristic;

determine whether one of the upper prediction boundary values is less than, and the other of the upper prediction boundary values is greater than, the upper specification limit of the first remaining article characteristic, and both of the lower prediction boundary values are greater than the upper specification limit for the first remaining article characteristic; and if so, compute the minimum and maximum predictor characteristic values for the first remaining article characteristic;

else, determine whether one of the lower prediction boundary values is less than, and the other of the lower prediction boundary values is greater than, the lower specification limit for the first remaining article characteristic, and whether the upper prediction boundary values, are both less than the upper specification limit of the first remaining article characteristic; and, if so, compute the minimum and maximum predictor characteristic values for the first remaining article characteristic;

else, determine whether one of the upper prediction boundary values is less than, and the other of the upper prediction boundary values is greater than, the upper specification limit of the first remaining article characteristic, and whether one of the lower prediction boundary values is less than, and the other of the lower prediction boundary values is greater than, the lower specification limit for the first remaining article characteristic; and, if so, compute the minimum and maximum predictor characteristic values for the first remaining article characteristic.

68. The computer program product of claim 67 wherein to compute the minimum and maximum predictor characteristic values for the first remaining article characteristic, the instructions are further operable to cause the programmable processor to:

determine the slope of the regression model between the predictor characteristic and the first remaining article characteristic;

determine the value of the predictor characteristic at which the upper prediction boundary corresponding to the regression model intersects the upper specification limit for the first remaining article characteristic;

determine the value of the predictor characteristic at which the lower prediction boundary corresponding to the regression model intersects the lower specification limit for the first remaining article characteristic;

if the slope of the regression model is positive, then:

set the maximum predictor characteristic value associated with the first remaining article characteristic to the lesser of the upper specification limit of the predictor characteristic or the value of the predictor characteristic at which the upper prediction boundary corresponding to the regression model intersects the upper specification limit for the first remaining article characteristic; and set the minimum predictor characteristic value associated with the first remaining article characteristic to the greater of the lower specification limit of the predictor characteristic or the value of the predictor characteristic at which the lower prediction boundary corresponding to the regression model intersects the lower specification limit for the first remaining article characteristic;

otherwise, if the slope of the regression model is negative, then set the maximum predictor characteristic value associated with the first remaining article characteristic to the lesser of the upper specification limit of the predictor characteristic or the value of the predictor characteristic at which the lower prediction boundary corresponding to the regression model intersects the lower specification limit for the first remaining article characteristic; and set the minimum predictor characteristic value associated with the first remaining article characteristic to the greater of the lower specification limit of the predictor characteristic or the value of the predictor characteristic at which the upper prediction boundary corresponding to the regression model intersects the upper specification limit for the first remaining article characteristic.

69. The computer program product of claim 39 wherein the instructions are further operable to cause the programmable processor to:

repeat the determine the regression model, receive the specification limits, locate the compliance area, locate the bounded regression area, and identify the relationship operations for all desired remaining article characteristics.

70. The computer program product of claim 69 wherein the instructions are further operable to cause the programmable processor: to display the identified relationships.

71. The computer program product of claim 69 wherein the instructions are further operable to cause the programmable processor to: store the identified relationships in a data structure.

72. A computer program product, physically stored on a machine-readable medium, for facilitating a determination of the magnitude and direction by which a pre-process characteristic would have to be adjusted to achieve a given design target, comprising instructions operable to cause a programmable processor to:

receive a plurality of article characteristic values associated with a set of articles having a range of variation as to a plurality of article characteristics;

select a predictor characteristic from the plurality of article characteristics;

determine the regression model between the predictor characteristic and a first remaining article characteristic in the plurality of article characteristics, receive the target values for the predictor characteristic and the first remaining article characteristic;

compute, based on the regression model, the value of the first remaining article characteristic at the target value of the predictor characteristic;

determine the magnitude and direction of the offset for the first remaining article characteristic by computing the difference between the computed value of the first remaining article characteristic and the target value of the first remaining article characteristic;

store the magnitude and direction of the offset in a data structure in association with an identifier for the first remaining article characteristic; and repeat the computing, determining and storing operations for all desired remaining characteristics.

73. The computer program product of claim 72 wherein the instructions are further operable to cause the programmable processor to: display the resulting magnitudes and directions of the offsets in association with the corresponding remaining article characteristics.

74. A computer program product, physically stored on a machine-readable medium, for facilitating analysis of the achievable gains in operating range associated with relaxing design tolerances corresponding to at least one article characteristic, comprising instructions operable to cause a programmable processor to:

receive a plurality of article characteristic values associated with a set of articles having a range of variation as to a plurality of article characteristics;

select a predictor characteristic from the plurality of article characteristics;

determine the regression model between the predictor characteristic and a first remaining article characteristic in the plurality of article characteristics, wherein the regression model includes lower and upper prediction boundaries;

receive lower and upper specification limits for the predictor characteristic and the first remaining article characteristic;

compute, based on the regression model, the minimum and maximum predictor characteristic values at which the first remaining article characteristic remains within the lower and upper specification limits of the first remaining article characteristic;

repeat the determining, receiving, and computing operations for all desired remaining article characteristics;

create a most constraining minimum predictor characteristic list by ranking the remaining article characteristics by the respective minimum predictor characteristic values associated therewith; and starting with the remaining article characteristic associated with the greatest minimum predictor characteristic value:

compute the individual gain in operating range achieved by relaxing the applicable specification limit of the remaining article characteristic to the value corresponding to the minimum predictor characteristic value associated with the next remaining article characteristic in the ranked list;

compute the cumulative gain associated with relaxing the applicable specification limit of the corresponding article characteristic; and repeat the first and second computing operations for all desired remaining article characteristics.

75. The computer program product of claim 74 wherein the instructions are further operable to cause the programmable processor to:

create a most constraining maximum predictor characteristic list by ranking the remaining article characteristics by the respective maximum predictor characteristic values associated therewith; and starting with the remaining article characteristic associated with the lowest maximum predictor characteristic value:

compute the individual gain in operating range achieved by relaxing the applicable specification limit of the remaining article characteristic to the value corresponding to the maximum predictor characteristic value associated with the next remaining article characteristic in the ranked list, compute the cumulative gain associated with relaxing the applicable specification limit of the corresponding article characteristic; and, repeat the first and second computing operations for all desired remaining article characteristics.

76. The computer program product of claim 75 wherein the instructions are further operable to cause the programmable processor to:

receive a selection of at least one remaining article characteristic from either or both of the most constraining minimum or maximum predictor characteristic list;

if the selection includes a remaining article characteristic from the most constraining minimum predictor characteristic list, then:

set the minimum predictor characteristic value to the minimum predictor characteristic value corresponding to the next article characteristic in the most constraining minimum predictor characteristic list, and for all article characteristics in the most constraining minimum predictor characteristic list up to the selected article characteristic, compute the new lower or upper specification limit for the article characteristic; and if the selection includes a remaining article characteristic from the most constraining maximum predictor characteristic list, then:

set the maximum predictor characteristic value to the maximum predictor characteristic value corresponding to the next article characteristic in the most constraining maximum predictor characteristic list, and for all article characteristics in the most constraining maximum predictor characteristic list up to the selected article characteristic, determine the new lower or upper specification limit for the article characteristic.

* * * * *